(12) United States Patent
Zenoff

(10) Patent No.: US 10,452,105 B2
(45) Date of Patent: Oct. 22, 2019

(54) MOBILE DEVICE CASE FOR HOLDING A DISPLAY DEVICE

(71) Applicant: Beam Authentic, Inc., San Anselmo, CA (US)

(72) Inventor: Andrew Zenoff, San Anselmo, CA (US)

(73) Assignee: BEAM Authentic Inc., San Anselmo, CA (US)

( * ) Notice: Subject to any disclaimer, the term of this patent is extended or adjusted under 35 U.S.C. 154(b) by 0 days.

(21) Appl. No.: 15/410,492

(22) Filed: Jan. 19, 2017

(65) Prior Publication Data

US 2017/0205854 A1    Jul. 20, 2017

Related U.S. Application Data

(60) Provisional application No. 62/280,429, filed on Jan. 19, 2016.

(51) Int. Cl.
| | | |
|---|---|---|
| G06F 3/147 | (2006.01) | |
| G06F 1/16 | (2006.01) | |
| G06F 3/0346 | (2013.01) | |
| G09G 3/20 | (2006.01) | |
| G06F 1/26 | (2006.01) | |
| G06F 1/3206 | (2019.01) | |

(52) U.S. Cl.
CPC ............ *G06F 1/1654* (2013.01); *G06F 1/163* (2013.01); *G06F 1/1639* (2013.01); *G06F 1/1643* (2013.01); *G06F 1/1647* (2013.01); *G06F 1/1649* (2013.01); *G06F 1/1652* (2013.01); *G06F 1/1684* (2013.01); *G06F 1/1692* (2013.01); *G06F 1/26* (2013.01); *G06F 1/3206* (2013.01); *G06F 3/0346* (2013.01); *G09G 3/2096* (2013.01); *G06F 2200/1633* (2013.01); *G09G 2320/10* (2013.01); *G09G 2354/00* (2013.01); *G09G 2370/04* (2013.01)

(58) Field of Classification Search
CPC ....... G06F 1/1649; G06F 1/165; G06F 1/1654
USPC ......................................................... 345/520
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 6,842,633 B1 * | 1/2005 | Deo .................... H04M 1/0252 379/433.01 |
| 7,614,008 B2 | 11/2009 | Ording |
| 7,653,883 B2 | 1/2010 | Hotelling et al. |
| 7,657,849 B2 | 2/2010 | Chaudhri et al. |

(Continued)

OTHER PUBLICATIONS

PCT International Search Report and Written Opinion for PCT/US17/14120, dated Apr. 6, 2017, 14 Pages.

*Primary Examiner* — Martin Mushambo

(57) ABSTRACT

The present disclosure provides a system for displaying or projecting media selected by a user, comprising: a mobile device case that is removably mountable on a mobile device; and a visual curvilinear display coupled to said mobile device case, wherein the visual curvilinear display is configured to display or project the media selected by the user in a manner that is viewable by one or more observers, which media includes at least one of digital text, image or video, wherein the visual curvilinear display displays or projects said media according to a display and/or location preference or schedule of the user.

16 Claims, 46 Drawing Sheets

(56) References Cited

U.S. PATENT DOCUMENTS

| | | | |
|---|---|---|---|
| 7,663,607 B2 | 2/2010 | Hotelling et al. | |
| 7,844,914 B2 | 11/2010 | Andre et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,600,430 B2 | 12/2013 | Herz et al. | |
| 8,634,873 B2 * | 1/2014 | Jones | H04M 1/0235 455/41.2 |
| 8,805,439 B2 * | 8/2014 | Kim | H04M 1/72577 455/556.1 |
| 9,300,347 B1 * | 3/2016 | Coverstone | H04B 1/3888 |
| 9,348,458 B2 | 5/2016 | Hotelling et al. | |
| 9,442,519 B2 * | 9/2016 | Shin | H04M 1/185 |
| 10,057,495 B2 * | 8/2018 | Okamoto | H04N 5/23293 |
| 2002/0015024 A1 | 2/2002 | Westerman et al. | |
| 2002/0102866 A1 * | 8/2002 | Lubowicki | H04M 1/0235 439/1 |
| 2004/0264173 A1 * | 12/2004 | Vanderschuit | A42B 1/062 362/103 |
| 2006/0033724 A1 | 2/2006 | Chaudhri et al. | |
| 2006/0061663 A1 * | 3/2006 | Park | H04N 5/232 348/211.2 |
| 2006/0197753 A1 | 9/2006 | Hotelling | |
| 2009/0111508 A1 * | 4/2009 | Yeh | G06F 1/1624 455/552.1 |
| 2010/0033916 A1 * | 2/2010 | Douglas | G06F 1/1616 361/679.28 |
| 2010/0250794 A1 * | 9/2010 | Hanks | G06F 1/3265 710/33 |
| 2011/0143769 A1 * | 6/2011 | Jones | G06F 1/1624 455/456.1 |
| 2011/0157036 A1 * | 6/2011 | Yang | G06F 1/1624 345/173 |
| 2012/0256585 A1 | 10/2012 | Partoyi et al. | |
| 2013/0222270 A1 | 10/2013 | Winkler et al. | |
| 2014/0184471 A1 * | 7/2014 | Martynov | G06F 3/1423 345/1.2 |
| 2014/0267015 A1 * | 9/2014 | Saatchi | G09G 5/006 345/156 |
| 2014/0376192 A1 * | 12/2014 | Park | H05K 5/03 361/728 |
| 2015/0309762 A1 | 10/2015 | Augustine | |
| 2016/0013829 A1 * | 1/2016 | Battle | H04B 1/3888 455/575.8 |
| 2016/0018846 A1 | 1/2016 | Zenoff | |
| 2016/0018978 A1 | 1/2016 | Zenoff | |
| 2016/0026423 A1 | 1/2016 | Zenoff | |
| 2016/0048369 A1 | 2/2016 | Zenoff | |
| 2016/0048370 A1 | 2/2016 | Zenoff | |
| 2017/0134549 A1 * | 5/2017 | Del Toro | H04M 1/0266 |
| 2017/0180523 A1 * | 6/2017 | Fernandes | H04B 1/3888 |

* cited by examiner

Modular Band – multi use / adjustable
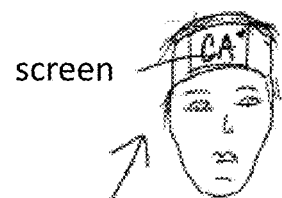
FIG. 7A
FIG. 7B  FIG. 7C
Modular Hat
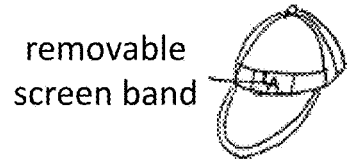
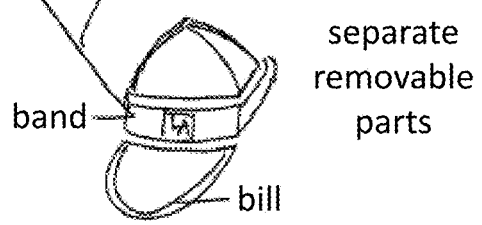
FIG. 8A  FIG. 8B

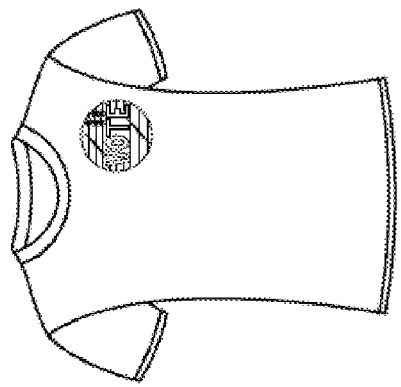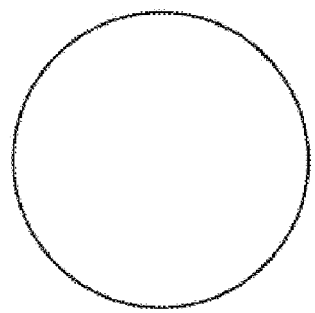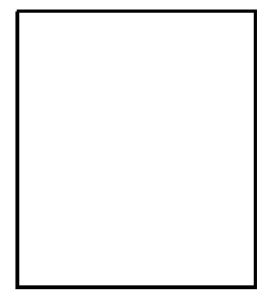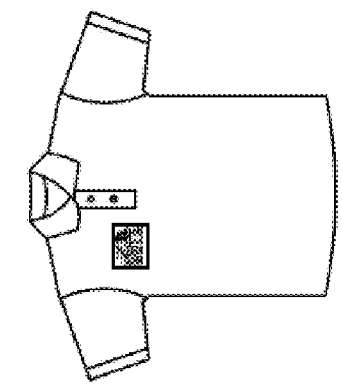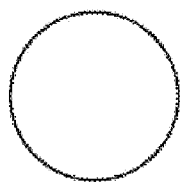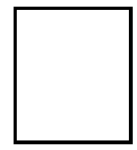
FIG. 10K

MOBILE DEVICE CASE FOR HOLDING A DISPLAY DEVICE

CROSS-REFERENCE

This application claims priority to U.S. Provisional Patent Application Ser. No. 62/280,429, filed Jan. 19, 2016, which is entirely incorporated herein by reference.

BACKGROUND

People experience and create all kinds of intentions and expressions which yield different energies and results that affect and impact what their experience of life is like and the results they yield how they feel and what they accomplish throughout their day, week, month and lifetime. Some intentions, expressions and energies are powerful and easily recognizable, while others are more subtle and often only intuitively felt.

The things one says, thinks and expresses do produce energy and results that impact a person and the people around a person. Creating more positive intentions, expressions and energy leads to improvements, and favorable results in a person's life and to society as a whole.

Negative outcomes and negative and/or not thought out intentions, and negative energy, come in many forms. Developing more positive and focused intentions and expressions, of these intentions and positive energy can take many forms including but not limited to being around positive people, self-talk, uplifting music, inspirational messages, and inspirational books, being around positive people, communicating with positive people, practicing positive affirmations and the like.

When we emit positive intentions and expressions energy, including but not limited to communications, messages, thoughts, feelings, vibrations and the like, we attract more positives to us. Newton's law of action and reaction may be at play here. When we dwell on the negatives, or do not focus on what positive outcomes we want to have happen, we attract negatives, we also are victim to chance circumstance the collective consciousness, and this creates endless cycles of suffering and repetition that sap our energy strength in the process.

There are various ways of increasing our positive outcomes as a society and as an individual. The first thing is becoming clear about how our intentions and expressions impact our lives. The second thing is, creating vehicles and methods to support positive intentions, collective conscious expressions, reducing the experience of feeling powerless, having a voice, sharing, feeling connected to the greater whole and a relationship with something bigger than ones small self. Others include, love and accept yourself as you are, free yourself from past resentments and disappointments, letting go of any and all resentment you're hanging onto about everyone and everything else, stop looking for reasons to criticize and blame others for their acts and omissions, letting go of your desire to control others, using your time, energy, and vitality wisely, using creative visualization and imagination to your advantage, not your detriment, developing an attitude of gratitude, being happy, appreciating the moment, and the like.

With consciousness evolving and a need for its evolution, we as people have the ability and power to impact the outcomes that serve our lives and the greater community in which we live. Be it self, family, group affiliations, neighborhood, city, state, country, globe.

It may be important to share, give back, feel connected, feel heard, counted and considered while being of service to self and others.

SUMMARY

The present disclosure provides wearable devices with or without sensors worn on a user, such as on or near the head of a user. Wearable devices of the present disclosure may provide, individual, customizable, creative self-expression, in the form of images and/or words to be worn or shared by the user. Wearable devices may be charged via wireless charging (e.g., inductive charging). Furthermore, a wearable device may comprise a microphone and a speaker so that when the wearable device is paired with a phone, the wearable device may be used for answering/making phone calls.

The present disclosure provides a wearable device that may enable a user to have self-expression. The self-expression may be changeable. The self-expression may be in the form of words, images and combinations thereof. The wearable device may also provide a user with the ability to have dynamic individual creative self-expression, in the form of words, images and combinations thereof. The wearable device may enable connection between the user and one or more other individuals, and may provide other uses, such as being counted, collective expressions and possible manifestation in a variety of different forms.

A wearable device of the present disclosure may be a dynamic life strong band that may be connected to a platform which allows the user to connect socially to the things the user may care about, learn more about things the user may not have known about, take action by donating or offering resources to organizations, charities and events, and become an individual philanthropist. The wearable device may be a customizable button or band for self-expression and a customizable dynamic live strong band for expression and social engagement, which may allow for social impact.

In some examples, the wearable device is usable by a user for self-expression. The wearable device can be a button, such as a smart button for self-expression connection, which can enable action and impact. The wearable device can be worn on an article of clothing of the user, such as a shirt jacket or cap, or other object, such as a bag. The wearable device can be placed at the rear of a vehicle, such as a car. The wearable device can be a bumper sticker, such as a digital bumper sticker, on the vehicle.

The wearable device can allow for instantaneous customizable self-expression. The wearable device can be connected to a platform that can allow for social connection, learning and taking action, which may result in social impact.

The wearable device may be equipped with a geolocation unit, which can enable the location of the wearable device to be determined. The geolocation unit can include a global positioning system (GPS) or wireless receiver (e.g., WiFi) for wireless triangulation. This may enable the wearable device to be used in various locations, such as stadiums, and other settings, such as group events as well as individual everyday life.

The wearable device may be connectable to an application (app) on an electronic device of the user. The app can support self-expression and social opportunities around expression, and flowing resources to charities and organizations.

The wearable device can have a touchscreen, such as a capacitive touchscreen or a resistive touchscreen. The touchscreen can enable scrolling and creating expressions, animation opportunities for a queue, and for video and full animation.

The wearable device can have a display with power management capabilities. The display can be dimmable. For example, the display can dim or turn off and turn on per a schedule, such as a schedule selected by the user, or upon a trigger event, such as upon achieving a given goal (e.g., donation goal).

The wearable device can be module to an article of clothing (e.g., cap) or a vehicle. In some examples, the wearable device is module for a cap or a car.

In some cases, the wearable device is not a watch. For example, the wearable device may not have a primary function of telling time or browsing the internet. The wearable device may not have a band, such as a wristband.

An aspect of the present disclosure provides a system for displaying or projecting media selected by a user, comprising a support member that is removably mountable on a body of a user; a visual curvilinear display mounted on the support member, wherein the visual curvilinear display is configured to display or project the media selected by the user in a manner that is viewable by one or more observers, which media includes at least one of text, image and video; a wireless charging unit configured to wirelessly charge the visual curvilinear display; and a controller in communication with the visual curvilinear display, wherein the controller is programmed to direct the visual curvilinear display to display or project the media according to a display and/or location preference or schedule of the user. The visual curvilinear display may be continuously circular and substantially planar.

In some embodiments, the support member is a button. In some embodiments, the visual curvilinear display is modular. In some embodiments, the visual curvilinear display is flexible. In some embodiments, the support member includes a pin, clip, hook, loop, lanyard or magnetically attractable lock. In some embodiments, the system further comprises an inductively chargeable battery operatively coupled to the visual curvilinear display.

In some embodiments, the visual curvilinear display is a circular display. In some embodiments, the visual curvilinear display is removable from the support member.

In some embodiments, the system further comprises a communications bus for bringing the visual curvilinear display in communication with the controller. In some embodiments, the communications bus is mounted on the support member. In some embodiments, the communications bus includes a communications interface that brings the visual curvilinear display in wireless communication with the controller.

In some embodiments, the controller is mounted on the support member. In some embodiments, the visual curvilinear display is a light emitting diode screen. In some embodiments, the visual curvilinear display is a projector.

In some embodiments, the system further comprises an optical, pressure or proximity sensor in communication with the controller. In some embodiments, the system further comprises a camera in communication with the controller.

In some embodiments, the system further comprises an additional visual curvilinear display. In some embodiments, the additional visual curvilinear display is in communication with the visual curvilinear display.

In some embodiments, the controller is programmed to orient the media such that it is displayed or projected through the visual curvilinear display at an orientation selected by the user. In some embodiments, the controller is programmed to orient the media such that it is displayed or projected through the visual curvilinear display along a direction that is parallel to the gravitational acceleration vector. In some embodiments, the system further comprises a gyroscope, and wherein the controller is programmed to determine an orientation of the visual curvilinear display using the gyroscope.

In some embodiments, the support member is mountable on a head or torso of the user. In some embodiments, the support member is not mountable on a wrist of the user. In some embodiments, the support member is mountable and removable from the body with a single hand of the user.

Another aspect of the present disclosure provides a method for displaying or projecting media selected by a user, comprising (a) providing (i) a support member that is removably mounted on a body of a user, and (ii) a visual curvilinear display mounted on the support member, wherein the visual curvilinear display is configured to display or project the media selected by the user in a manner that is viewable by one or more observers, which media includes at least one of text, image and video; and (b) accessing a display and/or location preference or schedule of the user in computer memory; and (c) using the visual curvilinear display to display or project the media according to the display and/or location preference or schedule of the user.

In some embodiments, the method further comprises orienting the media such that it is displayed or projected through the visual curvilinear display at an orientation selected by the user. In some embodiments, the method further comprises orienting the media such that it is displayed or projected through the visual curvilinear display along a direction that is parallel to the gravitational acceleration vector.

In some embodiments, the method further comprises receiving input from the user to display or project the media. In some embodiments, the input is received on the visual curvilinear display or an electronic device of the user. In some embodiments, the method further comprises receiving the display and/or location preference or schedule from the user, and storing the display and/or location preference or schedule in the computer memory.

In some embodiments, the display and/or location preference or schedule is received from a mobile electronic device of the user. In some embodiments, the method further comprises detecting motion of the user and displaying or projecting the media upon detecting the motion.

Another aspect of the present disclosure provides a system for analyzing response to media from a user, comprising a support member that is removably mountable on a body of a user; a display member mounted on the support member, wherein the display member is configured to display or project the media selected by the user, which media includes at least one of text, image and video; a sensor that collects one or more signals that are indicative of a response of at least one individual to the media displayed or projected by the display member; and a controller in communication with the display member and the sensor, wherein the controller is programmed to (i) direct the display member to display or project the media, (ii) receive the one or more signals from the sensor and (iii) determine the response based at least in part on the one or more signals received from the sensor.

In some embodiments, the support member is removably mountable on a hat or a shirt of the user. In some embodiments, the display member is a display screen. In some embodiments, the display screen is curvilinear or flexible. In some embodiments, the system further comprises a camera in communication with the controller.

In some embodiments, the controller is programmed to determine a score indicative of a quality of a relationship value between the user and the at least one other individual based at least in part on the response. In some embodiments, the controller is programmed to determine one or more waypoints between transitions from one quality of relationship value to another quality of relationship value. In some embodiments, the quality of relationship value is selected from the group consisting of trust, confidence, engagement, value creation, breakdown, lethargy, apathy and compliance.

In some embodiments, the at least one individual includes the user. In some embodiments, the controller is programmed with a relationship analysis engine that determines or quantifies a quality of one or more relationships between the user and one or more other persons or entities.

Another aspect of the present disclosure provides a method for analyzing response to media from a user, comprising (a) providing (i) a support member that is removably mounted on a body of a user, (ii) a display member mounted on the support member, wherein the display member is configured to display or project the media selected by the user, which media includes at least one of text, image and video, and (iii) a sensor that collects one or more signals that are indicative of a response of at least one individual to the media displayed or projected by the display member; (b) using the display member to display or project the media; (c) receiving the one or more signals from the sensor; and (d) determining the response based at least in part on the one or more signals received from the sensor.

In some embodiments, the method further comprises determining a score indicative of a quality of a relationship value between the user and the at least one individual based at least in part on the response. In some embodiments, the method further comprises determining one or more waypoints between transitions from one quality of relationship value to another quality of relationship value.

Another aspect of the present disclosure provides a computer-readable medium comprising machine executable code that, upon execution by one or more computer processors, implements any of the methods above or elsewhere herein.

Another aspect of the present disclosure provides a system for displaying or projecting media selected by a user. In some embodiments, the system comprises a mobile device case that is removably mountable on a mobile device; and a visual curvilinear display mountable on the mobile device case, the visual curvilinear display is configured to display or project the media selected by the user in a manner that is viewable by one or more observers, which media includes at least one of a digital text, image or video; and said visual curvilinear display is configured to receive a control signal, wherein said control signal: (i) comprises said media and (ii) directs said visual curvilinear display to display or project said media according to a display and/or location preference or schedule of said user.

In some embodiments, the visual curvilinear display is modular or is removable from the mobile device case. In some embodiments, the visual curvilinear display is a circular, square or rectangular and the visual curvilinear display is a light emitting diode screen.

In some embodiments, the system further comprises a controller in communication with the visual curvilinear display. In some cases, the system further comprises an accelerometer in communication with the controller to determine an orientation of said visual curvilinear display. In some cases, the controller and the visual curvilinear display are integrally combined as a substantially unitary body. In some cases, the system further comprises a camera in communication with said controller.

In some embodiments, the system further comprises an additional visual curvilinear display and the additional visual curvilinear display is in communication with the visual curvilinear display.

In some embodiments, the system further comprises an inductively chargeable battery operatively coupled to the visual curvilinear display. In some cases, the mobile device case comprises one or more batteries in electrical communication with said visual curvilinear display.

In a separate yet related aspect, a method for displaying or projecting media selected by a user is provided. The method comprises: (a) providing (i) a mobile device case that is removably mountable on a mobile device, and (ii) a visual curvilinear display mountable on the mobile device case, wherein the visual curvilinear display is configured to display or project the media selected by said user in a manner that is viewable by one or more observers, which media includes at least one of a digital text, image or video; (b) accessing a display and/or location preference or schedule of the user in memory; and (c) using said visual curvilinear display to display or project the media according to said display and/or location preference or schedule of the user.

In some embodiments, the method further comprises receiving input from the user to display or project the media, wherein the input is received on the visual curvilinear display or on the mobile device. In some embodiments, the method further comprises receiving the display and/or location preference or schedule from the user, and storing said display and/or location preference or schedule in the memory, wherein the display and/or location preference or schedule is received from the mobile electronic device. In some embodiments, the method further comprises orienting the media such that it is displayed or projected through the visual curvilinear display at an orientation selected by the user or along a direction that is parallel to the gravitational acceleration vector.

Another aspect of the present disclosure provides a system for displaying or projecting media selected by a user. The system comprises: a support member that is removably mountable on a body of a user; a visual curvilinear display mounted on said support member, wherein the visual curvilinear display is configured to display or project the media selected by the user in a manner that is viewable by one or more observers, which media includes at least one of a digital text, image or video; a wireless charging unit configured to wirelessly charge the visual curvilinear display; and wherein the visual curvilinear display is configured to receive a control signal, wherein the control signal: (i) comprises the media and (ii) directs the visual curvilinear display to display or project the media according to a display and/or location preference or schedule of the user.

In some embodiments, the support member includes a mobile device case, button, a pin, clip, hook, loop, lanyard or magnetically attractable lock. In some cases, the support member is mountable on a head, torso or a mobile device of the user.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 7A schematically illustrates a modular band that can have multi use in various embodiments of the present disclosure; FIG. 7B schematically illustrates a modular band that is adjustable and worn around a wrist of a user; FIG. 7C schematically illustrates a modular band that is adjustable and worn as a headband;

FIG. 8A schematically illustrates a modular hat with a removable screen band; FIG. 8B schematically illustrates a modular hat and separate removable parts in various embodiments of the present disclosure;

FIG. 10K shows a support member can have a pin that allows the support member to be mounted on an article of clothing;

DETAILED DESCRIPTION

Figure 1:
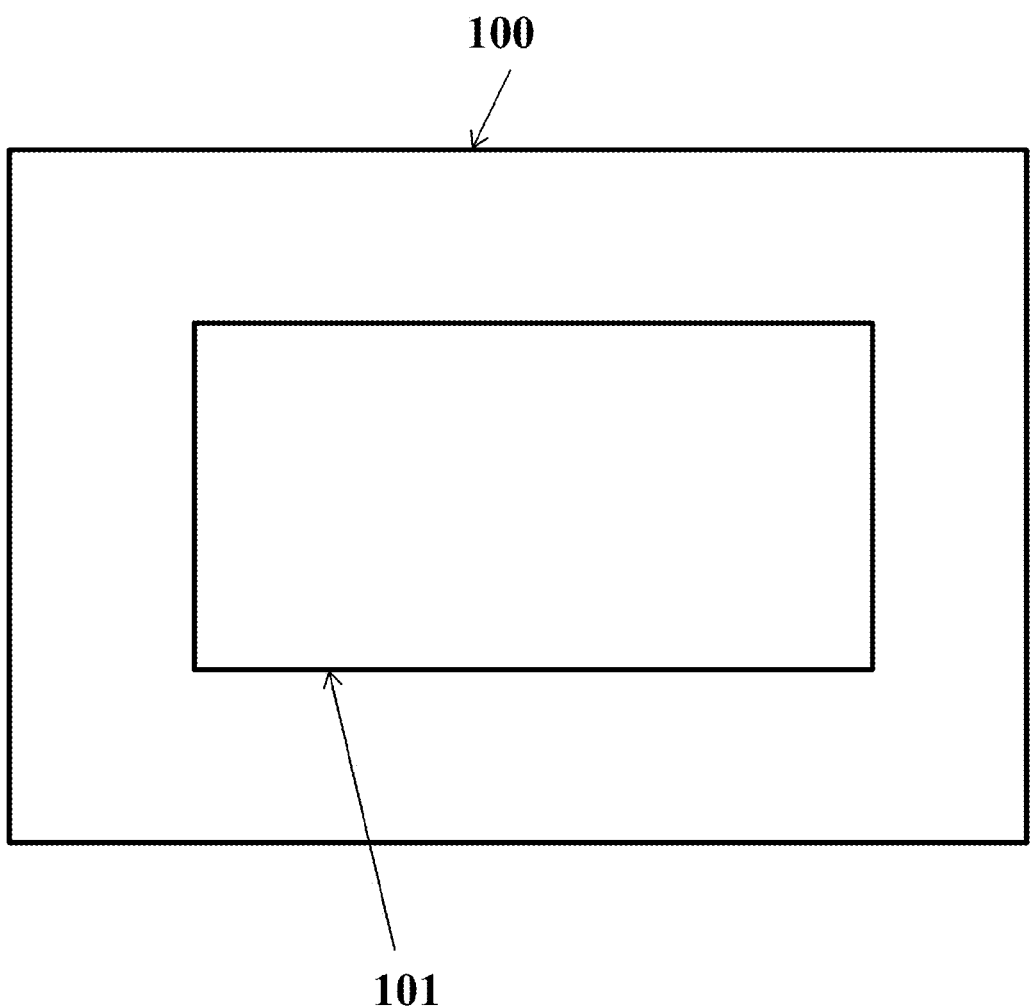
FIG. 1 shows a display device with a display screen.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "media," as used herein, generally refers to text, sounds, image or video. Media can include a combination of text, sounds, image and/or video. Media can include text and image, text and video, or video. Examples of media include text files, audio files, images files, or video files. Media may be editable by a user.

As used herein, the term "engine" refers to software, firmware, hardware, or other component that can be used to effectuate a purpose. The engine will typically include software instructions that are stored in non-volatile memory (also referred to as secondary memory). When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term "database" is used broadly to include any known or convenient approach for storing data, whether centralized or distributed, relational or otherwise.

As used herein, a "mobile device" includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving the signal, decoding if needed, exchanging information with a transaction server to verify the buyer and/or seller's account information, conducting the transaction, and generating a receipt. Typical components of mobile device may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device.

As used herein, the terms "social network" and "SNET" comprise a grouping or social structure of devices and/or individuals, as well as connections, links and interdependencies between such devices and/or individuals. Members or actors (including devices) within or affiliated with a SNET may be referred to herein as "nodes", "social devices", "SNET members", "SNET devices", "user devices" and/or "modules". In addition, the terms "SNET circle", "SNET group" and "SNET sub-circle" generally denote a social network that comprises social devices and, as contextually appropriate, human SNET members and personal area networks ("PANs").

As used herein, the term "wearable device" is anything that can be worn by an individual, it can include a back side that in some embodiments contacts a user's skin and a face side. Examples of wearable device include a head display/ head covering display regardless of form, including but not limited to a cap, hat, crown, arm band, wristband, garment, belt, t-shirt, a screen which can show words and/or images on it attached to or mounted on a user's head and/or other parts of the body, a holographic display for words or images that can float in front of the forehead, a projected display where the image or words are projected from the bill of the forehead by a projector on a bill, and the like. A wearable device can also include a bag, backpack, or handbag. The term "wearable device" can also be a monitoring device if it includes monitoring elements.

As used herein, the term "computer" is a device that can be programmed to carry out a finite set of arithmetic or logical operations. The computer can be programmed for a tailored function or purpose. Since a sequence of operations can be readily changed, the computer can solve more than one kind of problem. A computer can include of at least one processing element, typically a central processing unit (CPU) with one form of memory. The processing element carries out arithmetic and logic operations. A sequencing and control unit can be included that can change the order of operations based on stored information. Peripheral devices allow information to be retrieved from an external source, and the result of operations saved and retrieved.

As used herein, the term "Internet" is a global system of interconnected computer networks that use the standard Internet protocol suite (TCP/IP) to serve billions of users worldwide. It may be a network of networks that may include millions of private, public, academic, business, and government networks, of local to global scope, that are linked by a broad array of electronic, wireless and optical networking technologies. The Internet carries an extensive range of information resources services, such as the interlinked hypertext documents of the World Wide Web (WWW) and the infrastructure to support email. The communications infrastructure of the Internet may include its hardware components and a system of software layers that control various aspects of the architecture.

As used herein, the term "extranet" is a computer network that allows controlled access from the outside. An extranet can be an extension of an organization's intranet that is extended to users outside the organization that can be partners, vendors, suppliers, in isolation from all other Internet users. An extranet can be an intranet mapped onto the public Internet or some other transmission system not accessible to the general public, but managed by more than one company's administrator(s). Examples of extranet-style networks include but are not limited to: LANs or WANs belonging to multiple organizations and interconnected and accessed using remote dial-up; LANs or WANs belonging to multiple organizations and interconnected and accessed using dedicated lines; Virtual private network (VPN) that is comprised of LANs or WANs belonging to multiple organizations, and that extends usage to remote users using special "tunneling" software that creates a secure, in some cases encrypted network connection over public lines, sometimes via an ISP.

As used herein, the term "Intranet" is a network that is owned by a single organization that controls its security policies and network management. Examples of intranets include but are not limited to: a local area network (LAN); wide-area network (WAN) that may be comprised of a LAN that extends usage to remote employees with dial-up access; WAN that is comprised of interconnected LANs using dedicated communication lines; virtual private network (VPN) that is comprised of a LAN or WAN that extends usage to remote employees or networks using special "tunneling" software that creates a secure, in some cases encrypted connection over public lines, sometimes via an Internet Service Provider (ISP).

For purposes of the present disclosure, the Internet, extranets and intranets collectively are referred to as ("Network Systems").

As used herein, the term "user" includes, but is not limited to, a person that uses devices, systems and methods of the present disclosure. A user may be a person interested in maintaining health, interested in maintaining a healthy lifestyle and/or physiologic balance, interested in monitoring lifestyle conditions, including but not limited to, the way a person goes about daily living including but not limited to, habits, exercise, diet, medical conditions and treatments, career, financial, emotional status, and the like. The user may be under a physician's care.

As used herein, the term "sensors" include those devices used for collecting data, such as from a user or an environment of the user. For example, a sensor can be for cardiac monitoring, which generally refers to continuous electrocardiography with assessment of the user's condition relative to their cardiac rhythm. A small monitor worn by an ambulatory user for this purpose is known as a Holter monitor. Cardiac monitoring can also involve cardiac output monitoring via an invasive Swan-Ganz catheter. As another example, a sensor can be used for Hemodynamic monitoring, which monitors the blood pressure and blood flow within the circulatory system. Blood pressure can be measured either invasively through an inserted blood pressure transducer assembly, or noninvasively with an inflatable blood pressure cuff. As another example, a sensor can be used for respiratory monitoring, such as pulse oximetry which involves measurement of the saturated percentage of oxygen in the blood, referred to as SpO2, and measured by an infrared finger cuff, capnography, which involves $CO_2$ measurements, referred to as $EtCO_2$ or end-tidal carbon dioxide concentration. The respiratory rate monitored as such is called AWRR or airway respiratory rate). As another example, a sensor can be used for respiratory rate monitoring through a thoracic transducer belt, an ECG channel or via capnography, and/or neurological monitoring, such as of intracranial pressure. Special user monitors can incorporate the monitoring of brain waves electroencephalography, gas anesthetic concentrations, and bispectral index (BIS), blood glucose monitoring using glucose sensors and the like. As another example, a sensor can be used for child-birth monitoring. This can be performed using sensors that monitor various aspects of childbirth. As another example, a sensor can be used for body temperature monitoring which in one embodiment is through an adhesive pad containing a thermoelectric transducer, and/or stress monitoring to provide warnings when stress levels signs are rising before a human can notice it and provide alerts suggestions. As another example, a sensor can be used for epilepsy monitoring, toxicity monitoring, and/or monitoring general lifestyle parameters.

Visual Displays

An aspect of the present disclosure provides a system for displaying or projecting media selected by a user, comprising a support member that is removably mountable on a body of a user, and a display mounted on the support member. The display can be configured to display or project the media selected by the user in a manner that is viewable by one or more observers. The media can include at least one of text, image and video. The support member can be removably mountable on an article of clothing on the body of the user (e.g., shirt, pants or hat), or other object mounted on the body of the user, such as, for example, a strap or bag. The system can comprise a controller in communication with the display. The controller can be programmed to direct the display to display or project the media according to a display and/or location preference or schedule of the user. The display, when mounted on the support member, can yield a display device.

The display device can receive content remotely, such as through a wireless connection. In some examples, the display device can include an infrared port or infrared receiver that may enable the display device to be controlled or receive content remotely, such as, for example, in a social event, entertainment event (e.g., theater or concert) or sporting event. The display device can include an input controller coupled with the infrared port or infrared receiver, which may enable the display device to communicate with one or more infrared emitters, in some cases to display one or more media on the display device concurrently.

In some examples, a plurality of display devices can receive content or be controller concurrently, such as, for example, in a social event, entertainment event (e.g., theater or concert) or sporting event. This may be implemented using an infrared receiver on each of the display devices and one or more remote infrared emitters.

The display and/or location preference or schedule of the user can be a display schedule, location schedule, or both. The user may use the display and/or location preference or schedule to set the manner in which media is displayed or projected. For example, the user may wish media to be displayed or projected during the day, at night, or at other times during the day, week, month, or year. The user may wish media to be displayed or projected at random points, upon manual input by the user, or both. The user may wish the media to be displayed or projected in response to an action or trigger, such as the user receiving electronic mail (email), a text message, having a meeting, or other action or trigger. The media may be displayed based on a context of the user.

The user may wish media to be displayed or projected when the user is at a given location, as may be determined by a geolocation device of the user. The geolocation device may be part of the system or display device.

The display can have various shapes and sizes. The display can be triangular, circular, oval, square, rectangular, or partial shapes or combinations of shapes thereof.

In some examples, the display is a visual curvilinear display with circular or oval, or has circular or oval features. The visual curvilinear display may be continuously circular and substantially planar. For example, the display is circular or substantially circular, or is of another shape (e.g., square or rectangular) with sides or corners that are partially or fully circular.

The support member can have various shapes and sizes. The support member can be triangular, circular, oval, square, rectangular, or partial shapes or combinations of shapes thereof. The support member can be a button. The support member can include a pin, clip, hook, loop, lanyard or magnetically attractable lock.

The support member can be a cap, hat, screen, pin, belt, belt buckle, arm band, wristband, necklace, choker necklace, headband, visor, visor protective flap(s), screen camera, phone case, or band. The support member can be a surface or support object that is mountable (e.g., removably mountable) on a cap, hat, screen, pin, belt, belt buckle, arm band, wristband, necklace, choker necklace, headband, visor, visor protective flap(s), screen camera, or band.

The support member can be mountable on a head or torso of the user. In some cases, the support member is not mountable on a wrist, hand and/or arm of the user. The support member can be mountable and removable from the body with a single hand of the user. In an example, the user can mount or remove the support member solely with the user's left or right hand, thus enabling the support member to be readily mounted or removed with little or minimal effort by the user. The supporting member can be mountable on an object such as a cell phone, a tablet, a laptop and the like. The supporting member can be a protection case to the various objects as mentioned above.

The display can have a thickness that is less than or equal to about 100 millimeter (mm), 50 mm, 40 mm, 30 mm, 20 mm, 10 mm, 5 mm, or 1 mm. The support member can have a thickness that is less than or equal to about 100 mm, 50 mm, 40 mm, 30 mm, 20 mm, 10 mm, 5 mm, or 1 mm. When the display is mounted on the support member to yield the display device, the overall thickness of the device can be less than or equal to about 100 mm, 50 mm, 40 mm, 30 mm, 20 mm, 10 mm, 5 mm, or 1 mm. In some examples, the overall thickness is from 2 mm to 15 mm, or 5 mm to 10 mm. As an example, the overall thickness is less than or equal to 15 mm, 14 mm, 13 mm, 12 mm, 11 mm or 10 mm.

The display can have a cover glass with a substantially small curvature. The display can be formed of sapphire glass. The display can be circular, oval, triangular, square or rectangular, for example. The display can include a backlight and/or a masked front glass. The display can be flexible.

The display can be a touchscreen, such as a capacitive or resistive touchscreen. This can enable the user to select media, scroll through media, or access other features or functions of the device.

The device can include one or more buttons to enable a user to access various features or functions of the device. The one or more buttons can be on a side portion of the display or the support member. The one or more buttons can be coupled to the controller.

The support member can include a pin that pierces an article of clothing (e.g., shirt or hat) or other object (e.g., bag), which can enable the support member to secure against the article of clothing or other object. The pin can have a lock that secures the pin and support member in place. The pin can enable the support member to rotate. As an alternative, the support member can include a magnetically attractable lock. For example, the support member can include a metallic plate that is polarized with one pole of a permanent magnet and a lock that is polarized with another pole of a magnet). When the metallic plate and lock are brought in proximity to one another, a magnetic field force can draw them together, holding the support member in place, such as, for example, against an article of clothing. As an alternative, the support member can be mountable on an inanimate object, such as a vehicle. This can enable the display device to display or project the medial on the vehicle. For example, the display device can be a bumper sticker, such as a digital bumper sticker.

The display can be modular. This can enable the display to couple with other components, such as other displays. In some cases, the system can include one or more additional displays. The one or more additional displays can be in communication with the display. For example, each additional display can be mountable on the support member or a separate support member. If a separate support member is employed, the separate support member may be mountable on the support member, or vice versa. For example, support members can include mounting members (e.g., clips or interlocks) on their sides that enable the support members to be coupled to one another to form larger display devices. Once coupled, the individual display devices can provide separate media or communicate with one another to provide the same media or portions of the same media. For example, portions of a single image can be displayed through the individual devices.

Modular displays can be coupled to various support members. FIGS. 7A-7C illustrate various modular bands that can have multi use and be adjustable. FIGS. 8A-8B illustrate modular hats with a removable screen band and separate removable parts.

The display and/or support member can be flexible. This can enable a user to bend or twist the display and/or support member, as desired. The user can shape the display and/or support member into any desired or predetermined shape or configuration.

Figure 3:
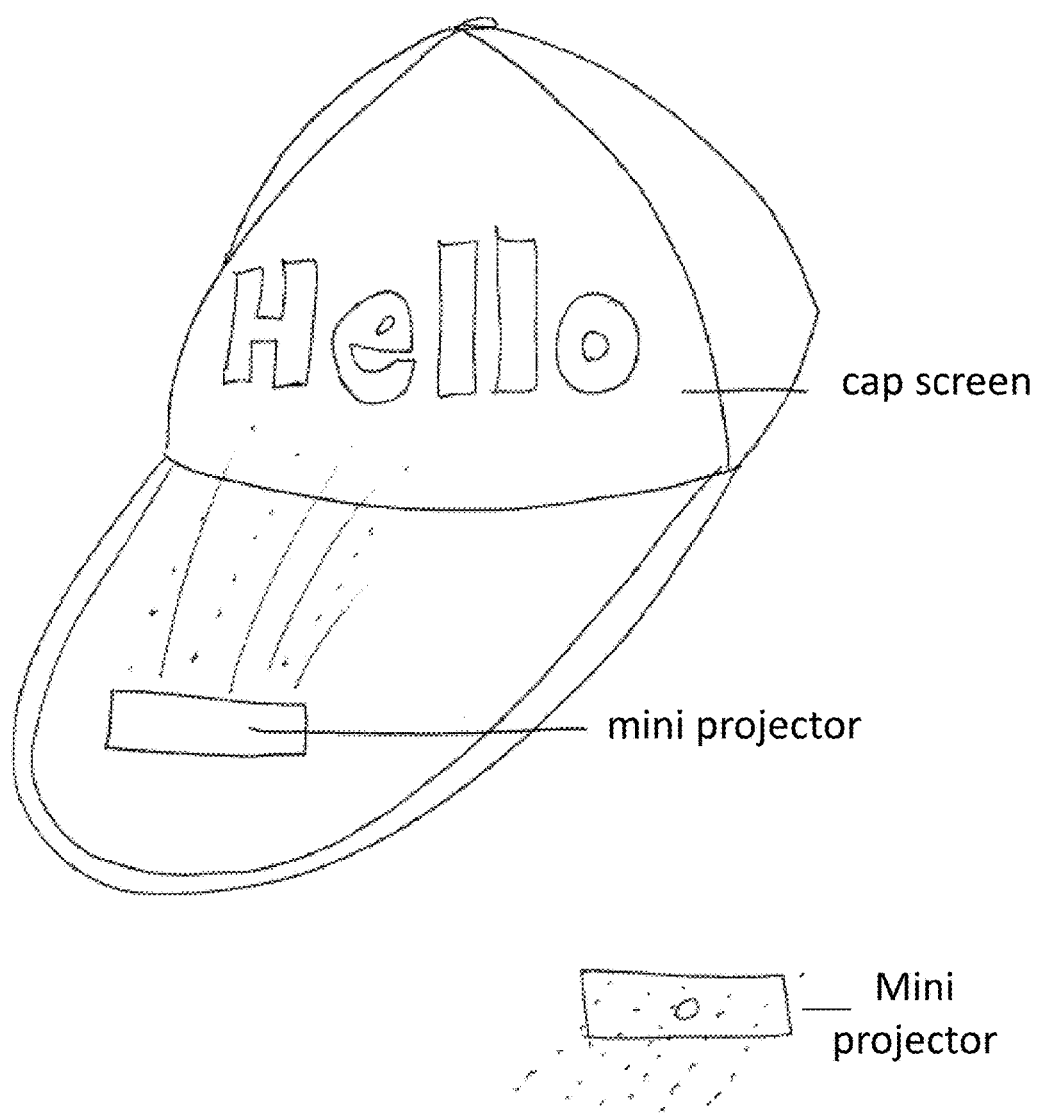
FIG. 3 illustrates a projector bill on a cap.

In some examples, the support member is formed of a polymeric material, such as a thermoplastic. The display can be formed of a light emitting diode (LED), such as an organic LED (OLED). The controller can include a printed circuit board (PCB) that can be flexible. As an alternative, the display is a projector that can project the media to a display surface, such as an article of clothing or other object (e.g., display screen). For example, the display can include a projector bill on a cap, as shown in FIG. 3.

The system can include an energy storage device, such as a battery, operatively coupled to the display and/or the controller. The battery can be a solid state battery, such as a lithium ion battery. The battery can be chargeable, such as through a charging port of the system, e.g., through a universal serial bus (USB) port. As an alternative or in addition to, the battery can be inductively chargeable.

The display can be removable from the support member. As an alternative, the display is not removable from the support member.

The system can include a communications bus for bringing the display in communication with the controller. The communications bus can be a circuit board, such as a PCB. The communications bus can be mounted on the support member. In some examples, the communications bus includes a communications interface (e.g., Bluetooth or WiFi) that brings the display in wireless communication with the controller.

The controller can be mounted on the support member. In some examples, the controller is unitary or integrated with the support member. As an alternative, the controller can be separable from the support member.

The system can include one or more sensors. A sensor among the one or more sensors can be an optical, pressure or proximity sensor. The sensor can be in communication with the controller.

The system can include a camera in communication with the controller. The camera can be a charge-coupled camera (CCD). The camera can enable capture of images or video of the user or other objects, such other individuals. This can enable the system to gauge response to the media.

The controller can be programmed to orient the media such that it is displayed or projected through the display at an orientation selected by the user. This can enable the user to mount the support member on a body of the user without concern for the media being displayed or projected in an intended manner. As an alternative or in addition to, the controller can be programmed to orient the media such that it is displayed or projected through the display along a direction that is parallel to the gravitational acceleration vector.

The system can include a gyroscope. The gyroscope can enable the controller to determine the orientation of the display.

The system can include an acceleration member that measures proper acceleration. The acceleration member can be an accelerometer. The acceleration member can be operatively coupled (e.g., in communication with) the controller.

The system can enable the user to create media. For example, the user can select a picture and modify the picture to generate media for display. The media can be created on a mobile electronic device of the user, such as a portable computer or Smart phone.

Display devices (e.g., wearable devices) of the present disclosure can include various features. A display device can have a display with a touchscreen (e.g., capacitive touchscreen), a GPS, and an accelerometer. The accelerometer may be used, for example, for movement detection and power management, as well as making sure that an image (or expression) on the display is always properly oriented (e.g., north/south or up/down). The display can be for customizable self-expression and connecting to a platform to allow for connection options. The display device may be readily mountable on the user or other object, and may be readily removable from the user or other object. The display device may be mountable with a magnet, which can allow the user to mount and remove the display device without having to take of the magnets. The display device can have an energy storage unit, such as a battery. The display device may be at least partially or fully powered by solar energy. In such a case, the display device can include solar cells. The display device may have an electronic paper display ("E ink") which may have electrophoretic ink. Such a display may be a bistable display that may be usable for reduced or low power consumption.

Reference will now be made to the figures, wherein like numerals refer to like parts throughout. It will be appreciated that the figures and features therein are not necessarily drawn to scale.

FIG. 1 shows a display device 100 with a display screen 101. The display device 100 can be as described above. The display screen 101 can have various shapes and sizes. For example, the display screen 101 can be curvilinear (e.g., circular or oval). The display device 100 and the display screen 101 can have various form factors. For example, the display device 100 can be in the form of a pin or button.

Figure 2:
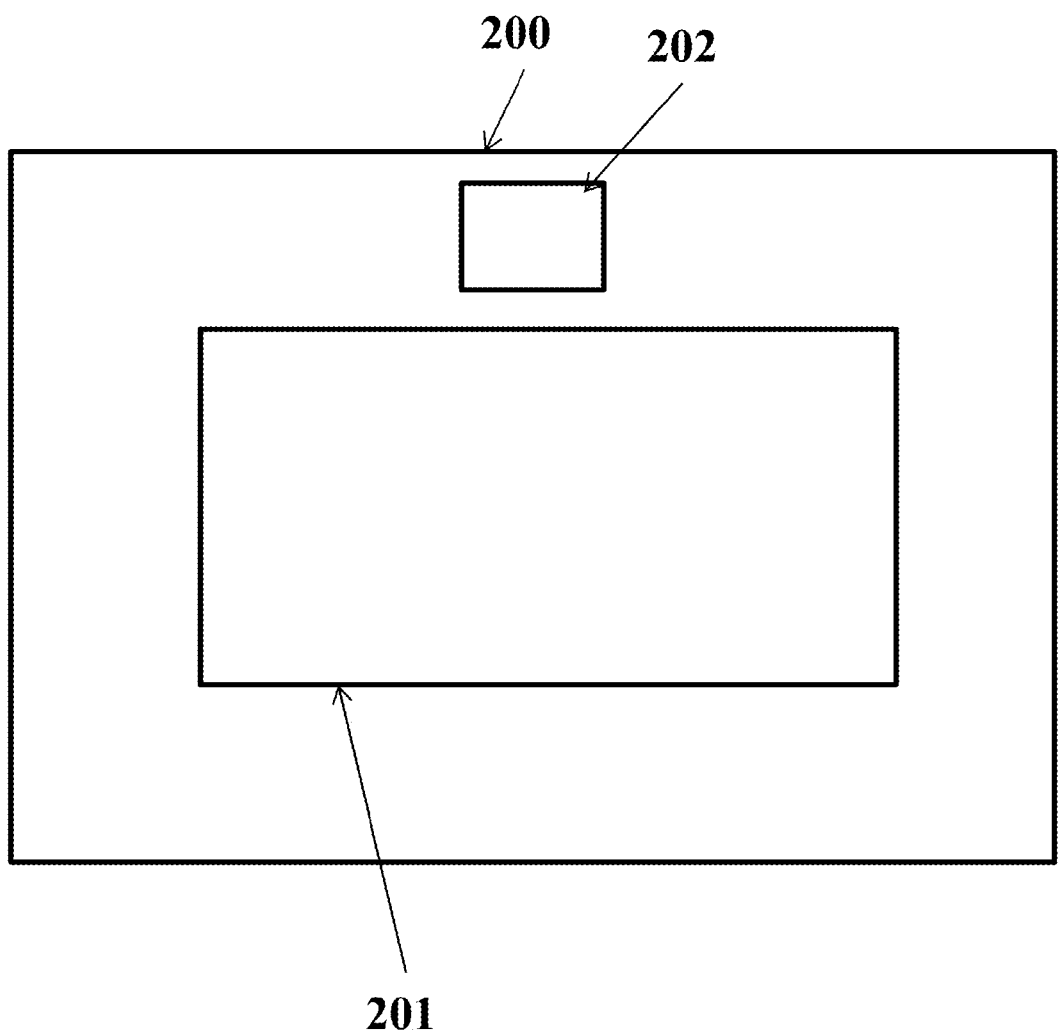
FIG. 2 shows another display device with a display screen.

FIG. 2 shows a display device 200 with a display screen 201. The display device 200 can be as described above. The display screen 201 can have various shapes and sizes. For example, the display screen 201 can be curvilinear (e.g., circular or oval). The display device 200 further includes a sensor 202. The sensor 202 can capture various signals from the user or an environment of the user, such as light or sound. The sensor 202 can be a camera, which can capture images or video from the user or other objects, such as other individuals. The display device 200 and the display screen 201 can have various form factors. For example, the display device 200 can be in the form of a pin or button.

The present disclosure provides a wearable device that can provide the ability to have self-expression, with the self-expression being changeable, and is in the form of words, images and combinations thereof.

In an embodiment, the wearable device provides the ability to have individual creative self-expression, with the self-expression being changeable, and is in the form of words, images and combinations thereof.

In another embodiment, the wearable device provides the ability to have dynamic individual creative self-expression, in the form of words, images and combinations thereof, and enables connection.

In another embodiment, the present disclosure provides a wearable device that provides an ability to have dynamic individual creative self-expression, in the form of words, images and combinations thereof, and enables manifestation in a variety of different forms.

In one embodiment, the present disclosure provides a wearable, customizable digital display device that combines technology and fashion to offer the user an opportunity for creative self-expression, connection and manifestation. A wearable device of the present disclosure can provide a tangible delivery system of a message and/or figure to create expression.

The wearable device can display images, complex words and messages, and text, uploads, displays, ends wirelessly. The wearable device can use a user's or a third party's mobile device to communicate. The wearable device is in communication with the mobile device.

In one embodiment the wearable device is a crown that may change color based on information received. Sensors can be included in the wearable device.

In various embodiments the wearable device can include a display or screen that can be flexible. In other embodiments the wearable device can be utilized by a wearable device user with an ability to impact positive social and environmental change through intentionally and expression from personal to global. In one embodiment the wearable distal is a customizable worn for the purpose of self-expression and the greater good. It can be used to express, connect and manifest positive change.

Display devices of the present disclosure can provide individuals with the opportunity to voice and express what is important to them via wearable devices, and in their vehicles, mini customizable billboards. Display devices of the present disclosure can provide individuals with the opportunity to be heard, counted and has their opinions and intentions mean something through creative customizable self-expression which they can wear or use in their vehicles.

Display devices of the present disclosure can support individuals collectively creating outcomes for their lives. Such devices can also enable individuals to have positive experiences and create all kinds of intentions and expressions which yield different energies and results that effect and impact what their experience of life is like, the results of how they feel and what they accomplish throughout their day, week, month and lifetime. Some intentions, expressions and energies are powerful and easily recognizable, while others are more subtle and often only intuitively felt.

Wearable devices of the present disclosure can provide the opportunity to support connection, being counted, in an aggregate dashboard of all the users of our device to reflect the collective mood and different expressions of the users. In one embodiment users of the device connect with potential revenue streams based on what they are expressing on their devices, including but not limited to a walking or traveling billboard. Organizations may be able to connect with users of wearable devices for the purpose of communal expressions.

The present disclosure provides a digital LED, nanotechnology and other related display technology-based button that can combine technology and fashion to offer the user an opportunity for creative self-expression, connection and manifestation. The user has the ability to impact positive social and environmental change through intentionally and expression from personal to global. In one embodiment the digital LED, nanotechnology and other related display technology based wrist band is a customizable digital cap worn for the purpose of self-expression and the greater good. It can be used to express, connect and manifest positive change.

The present disclosure provides a digital LED, nanotechnology and other related display technology-based button that can provide: (i) a tangible delivery system of a message and the psychological spiritual intention of the messenger him/herself; (ii) a sense of identity, a pride, uniqueness, a cool factor and the like, (iii) a sense of self, belonging, connection, meaning, purpose, fulfillment, being heard and considered; and (iv) an ability to impact the outcomes that serve their lives and the greater community in which they live.

The digital LED, nanotechnology and other related display technology based wrist band displays images and text, uploads, displays, ends wirelessly. The digital LED, nanotechnology and other related display technology based wrist band can use a user's or a third party's mobile device to communicate. The digital LED, nanotechnology and other related display technology based wrist band is in communication with the mobile device.

Sensors can be included in the digital LED, nanotechnology and other related display technology based wrist band. In one embodiment color codes are utilized with the wristband that are displayed to reflect what causes the user is affiliated with and cares about.

The wristband can be uploaded with mobile devices, desktop computers, other devices including but not limited to BEAM devices.

As non-limiting examples, the wristband can display a variety of different messages, cause-based intentions such as a breast cancer ribbon, rainbow GLTG, and the like.

The present disclosure provides a digital LED, nanotechnology and other related display technology-based wrist band that can combine technology and fashion to offer the user an opportunity for creative self-expression, connection and manifestation. The user has the ability to impact positive social and environmental change through intentionally and expression from personal to global. In one embodiment the digital LED, nanotechnology and other related display technology based wrist band is a customizable digital cap worn for the purpose of self-expression and the greater good. It can be used to express, connect and manifest positive change.

The present disclosure provides a digital LED, nanotechnology and other related display technology-based wrist band that provides: (i) a tangible delivery system of a message and the psychological spiritual intention of the messenger him/herself; (ii) a sense of identity, a pride, uniqueness, a cool factor and the like, (iii) a sense of self, belonging, connection, meaning, purpose, fulfillment, being heard and considered; and (iv) an ability to impact the outcomes that serve their lives and the greater community in which they live.

The digital LED, nanotechnology and other related display technology based wrist band displays images and text, uploads, displays, ends wirelessly. The digital LED, nanotechnology and other related display technology based wrist band can use a user's or a third party's mobile device to communicate. The digital LED, nanotechnology and other related display technology based wrist band is in communication with the mobile device.

Sensors can be included in the digital LED, nanotechnology and other related display technology based wrist band.

In one embodiment color codes are utilized with the wristband that are displayed to reflect what causes the user is affiliated with and cares about.

The wristband can be uploaded with mobile devices, desktop computers, other devices including but not limited to BEAM devices.

As non-limiting examples, the wristband can display a variety of different messages, cause based intentions such as a breast cancer ribbon, rainbow GLTG, and the like.

In another aspect, a method for displaying or projecting media selected by a user comprises providing a display device that comprises (i) a support member that is removably mounted on a body of a user, and (ii) a display mounted on the support member, wherein the display is configured to display or project the media selected by the user in a manner that is viewable by one or more observers, which media includes at least one of text, image and video. Next, a display and/or location preference or schedule of the user is accessed in computer memory. The display can then be used to display or project the media according to the display and/or location preference or schedule of the user.

The media can be oriented such that it is displayed or projected through the display at an orientation selected by the user. The median can be oriented such that it is displayed or projected through the display along a direction that is parallel to the gravitational acceleration vector.

The method can include receiving input from the user to display or project the media. The input can be received on the display or an electronic device of the user.

The method can include receiving the display and/or location preference or schedule from the user. The display and/or location preference or schedule can be stored in the computer memory. The display and/or location preference or schedule can be received from a mobile electronic device of the user.

The method can include detecting motion of the user. The media can be displayed or projected upon detecting the motion.

Flexible Displays

The flexible displays may be composed of one or more flexible layers and may be mounted on top of or under a cover layer. For example, a flexible display may be mounted on top of a rigid support member or may be mounted on the underside of a rigid cover layer. The display may be mounted on a rigid surface or a surface that is not rigid.

Electronic devices may also be provided with user interface components (input-output components) such as buttons, microphones, speakers, piezoelectric actuators (for receiving electrical input from a user or tactile feedback to users), or other actuators such as vibrators, pressure sensors, and other components. These components may be mounted under portions of a flexible display.

During operation of the electronic device, the flexibility of the display may allow a user to interact with the component through the display. For example, sound waves from a speaker or localized vibrations from an actuator in an electronic device may pass through the flexible display. The flexible display may also allow an internal microphone, pressure sensor, or force sensor (or other internal components) to receive external input. For example, a user may deflect a flexible display using a finger or other external object, barometric pressure may be monitored through the flexible display, or sound waves may be received through the flexible display.

Components may receive input or may supply output through a physically deformed portion of the flexible display (e.g., a deformation that occurs when a user presses on the display to compress the component). In some configurations, a portion of the flexible display may serve as a membrane that forms part of a microphone, speaker, pressure sensor, or other electronic component.

The ability of a user to compress a component such as a button switch by deforming the flexible display may allow the area of a device available for visual display to be enlarged. For example, the active area of a flexible display may overlap a component such as a button or speaker.

If desired, a flexible display may be deformed by an internal component to provide audio or tactile feedback to a user. For example, structures inside an electronic device may be pressed against portions of a flexible display to temporarily create an outline for a virtual on-screen button or to temporarily create a grid of ridges that serve to delineate the locations of keys in a keyboard (keypad).

Display Components

In another aspect, a system for analyzing response to media from a user can comprise a support member that is removably mountable on a body of a user, and a display member mounted on the support member, wherein the display member is configured to display or project the media selected by the user, which media includes at least one of text, image and video. The system can include a sensor that collects one or more signals that are indicative of a response of at least one individual to the media displayed or projected by the display member. The system can include a controller in communication with the display member and the sensor, wherein the controller is programmed to (i) direct the display member to display or project the media, (ii) receive the one or more signals from the sensor and (iii) determine the response based at least in part on the one or more signals received from the sensor. The at least one individual can include the user.

The support member can be removably mountable on a hat or a shirt of the user. The display member can be a display screen. The display screen can be curvilinear or flexible.

The system can include a camera in communication with the controller. The controller can be programmed to determine a score indicative of a quality of a relationship value between the user and the at least one other individual based at least in part on the response. The controller can be programmed to determine one or more waypoints between transitions from one quality of relationship value to another quality of relationship value. The quality of relationship value can be selected from the group consisting of trust, confidence, engagement, value creation, breakdown, lethargy, apathy and compliance. The controller can be programmed with a relationship analysis engine that determines or quantifies a quality of one or more relationships between the user and one or more other persons or entities.

In another aspect, a method for analyzing response to media from a user can comprise providing (i) a support member that is removably mounted on a body of a user, (ii) a display member mounted on the support member, wherein the display member is configured to display or project the media selected by the user, which media includes at least one of text, image and video, and (iii) a sensor that collects one or more signals that are indicative of a response of at least one individual to the media displayed or projected by the display member. Next, the display member can be used to display or project the media. The one or more signals can be received from the sensor and the response can be determined based at least in part on the one or more signals received from the sensor.

The method can include determining a score indicative of a quality of a relationship value between the user and the at least one individual based at least in part on the response. One or more waypoints can be determined between transitions from one quality of relationship value to another quality of relationship value.

The present disclosure provides various displays for use with systems and methods of the present disclosure. In one embodiment, the display includes an electronic circuit stratum with signal transmitting components for transmitting user input signals to a display signal generating device for controlling display information transmitted from the display signal generating device. Signal receiving components receive the display information transmitted from the display signal generating device. Display driving components drive the display layer according to the received display information. A user input receives user input and generates the user input signals. A battery provides electrical energy to the electronic circuit stratum, the user input and display components. The signal receiving components may include first radio frequency receiving components for receiving a first display signal having first display information carried on a first radio frequency and second radio frequency receiving components for receiving a second display signal having second display information carried on a second radio frequency. The display driving components may include signal processor components for receiving the first display signal and the second display signal and generating a display driving signal for simultaneously displaying the first display information at a first location on the display and the second display information at a second location on the display stratum. At least some of the components in the battery, display, user input and electronic circuit stratums are formed by printing electrically active material to form circuit elements including resistors, capacitors, inductors, antennas, conductors and semiconductor devices.

The battery may comprise a first current collector layer; an anode layer; an electrolyte layer; a cathode layer and a second current collector layer. The electrolyte material may be microencapsulated, which may make the battery particularly suitable for formation by a printing method, such as inkjet printing, laser printing, magnetically reactive printing, electrostatically reactive printing, or other printing methods that are adaptable to the use of microencapsulated materials. The battery is formed substantially over the entire top surface of the flexible substrate. By this construction, the inventive wireless display device may be formed as thin as possible, while having suitable battery power density, and while being provided with the advantageous electronic shielding qualities provided by the battery layers. The user input may comprise a grid of conductive elements each conductive elements for inducing a detectable electrical signal in response to a moving magnetic field. The user input may comprise a touch screen formed by printing pressure sensitive or capacitance sensitive elements on an insulating layer.

The display may include conductive leads connected with each light emitting pixel for applying the electrical energy selectively to each light emitting pixel under the control of the display driving components.

The signal receiving components may include first radio frequency receiving components for receiving a first display signal having first display information carried on a first radio frequency and second radio frequency receiving components for receiving a second display signal having second display information carried on a second radio frequency. The display driving components may include signal processor components for receiving the first display signal and the second display signal and generating a display driving signal for simultaneously displaying the first display information at a first location on the display and the second display information at a second location on the display stratum.

At least some of the components in the electronic circuit are formed by printing electrically active material to form circuit elements including resistors, capacitors, inductors, antennas, conductors and semiconductor devices.

A content formatting method of formatting substantially static display content is disclosed that greatly reduces the onboard processing capacity required by the wireless display. This content formatting method is effective for enabling a large number of simultaneous users. The source computer composes the substantially static display content into a video frame of information. The wireless display only needs as much memory as is needed to store the desired number of single frames of video information.

In one embodiment the display includes light emitting pixels for displaying information. In one embodiment the light emitting pixels are formed by printing a pixel layer of light-emitting conductive polymer.

In one embodiment, a user's displayed expression, connection and manifest for positive change. profile is received by one or more processors at the back-end where one or more of the following are performed: (i) extraction of unique features of the expression, connection and manifestation, and being counted as part of an aggregate dashboard reflection; (ii) enhances distinguishing aspects of the expression, connection and manifestation; and (iii) compression of data related to the expression, connection and manifestation. The one or more processors can compare received data from the wearable device with that in a database.

In one embodiment the display/screen is made larger through the use of optical components and creates a projection exterior to the display/screen. In one embodiment the display/screen can project out in front of the wearer's head. The screen may be clear in color, black, white or change colors when not being used.

In one embodiment colors are used for the wearable device as a key code for wearable devices that provide individual creative self-expression, connection, and manifestation. The wearable device can include add-ons, a GPS camera and the like.

The wearable device can have dimensionality to hold a display or screen coupled or included with it. The display or screen may be removable from the wearable device.

As non-limiting examples, the wearable device can be made of a variety of materials including but not limited to: recycled materials, cloth from different things; plastics; natural materials, an eco-friendly material and the like.

In one embodiment the wearable device houses the components, including electronics that drives the display. An energy source, including but limited to one or more batteries, can be included. As non-limiting examples, other energy sources can be utilized including but not limited to: solar; walking or other motion; wind and the like. The wearable can be chargeable, e.g., plugged in. In one embodiment the wearable device is powered via mesh technology.

The display can be positioned on the front, back, side and the like and can be detachable. The display can be made of flexible and non-flexible materials including but not limited to glass, plastics and the like.

The display can be different sizes and shapes. In one embodiment the display is light sensitive and change color relative to light. In one embodiment the display includes a frame to help protect it from sun reflection. In one embodiment the frame is up-loadable to change color. The display can be flat, protrude out to some degree, and be a visor and the like to make it more viewable.

The wearable device can adjust to different sizes. The wearable device can be module and also morph into a different product worn in a different way.

In one embodiment the wearable device and/or display/screen can change colors. This can be achieved through the use of LED's and the like. All or a portion of the wearable device can change color. In one embodiment, the wearable device includes one or more sensors that pick up different aspects of the wear's energy, brain function, heartbeat, level of stress and busy thinking, and the like.

In one embodiment the wearable device it can change colors both at the screen level and the entire wearable device or embodiment adjacent to the screen which can be based on sound, and other extremities which can influence the user. This may be identical or similar to a sound responsive sculpture.

The wearable device can include additional electronic components including but not limited to, a camera, in or behind the screen, GPS functionality and the like, and can do everything that a mobile device can do. In one embodiment, the wearable device does not need the full power of a mobile device.

The wearable device can communicate with a telemetry site with a backend. The telemetry site can include a database of identification references, including user activity, performance and reference information for each user, and/or for each sensor and location. The user activity, performance metrics, data and the like captured by system can be recorded into standard relational databases SQL server, and/or other formats and can be exported in real-time. All communication is done wirelessly.

The telemetry system provides a vehicle for a user to: (i) set up its profile which can include their basic information, use wearable devices that provide, individual creative self-expression, connection, manifestation intentions; (ii) create and upload what the user wants to upload such as images, pictures, text and combinations thereof; and (ii) look at third parties self-expression, connections and manifestations.

It is noted that when something has political fire or interest they often change their social network profiles. Wearable devices of the present disclosure may be used for such purposes and as a supplement. Wearable devices of the present disclosure may be used to join a communal expression, political or social, etc.

The present disclosure provides an aggregate dashboard of what people are sharing; takes this natural behavior and implement it in the virtual and physical world; uploads social media information, pictures, messages and images; provides a mechanism to communicate with organizations; and connects all of this to different organizations that can then take action.

Individuals may join community organizations that share similar values and goals, participate in an eco-system of shared expressions, be part of an aggregate dashboard that sees all of this and determines the mood derived from the expressions of users. This may be reflected back into social networks.

Wearable devices of the present disclosure can be used to create revenue streams for the user by logging into and sharing personal information with companies that will pay for their message to be worn for periods of time based no exposure. Walking billboards and revenue flow based on wearers impact for advertiser. This may provide the opportunity for paid and unpaid communal expression and advertising for revenue.

Mobile Devices

Figure 4:
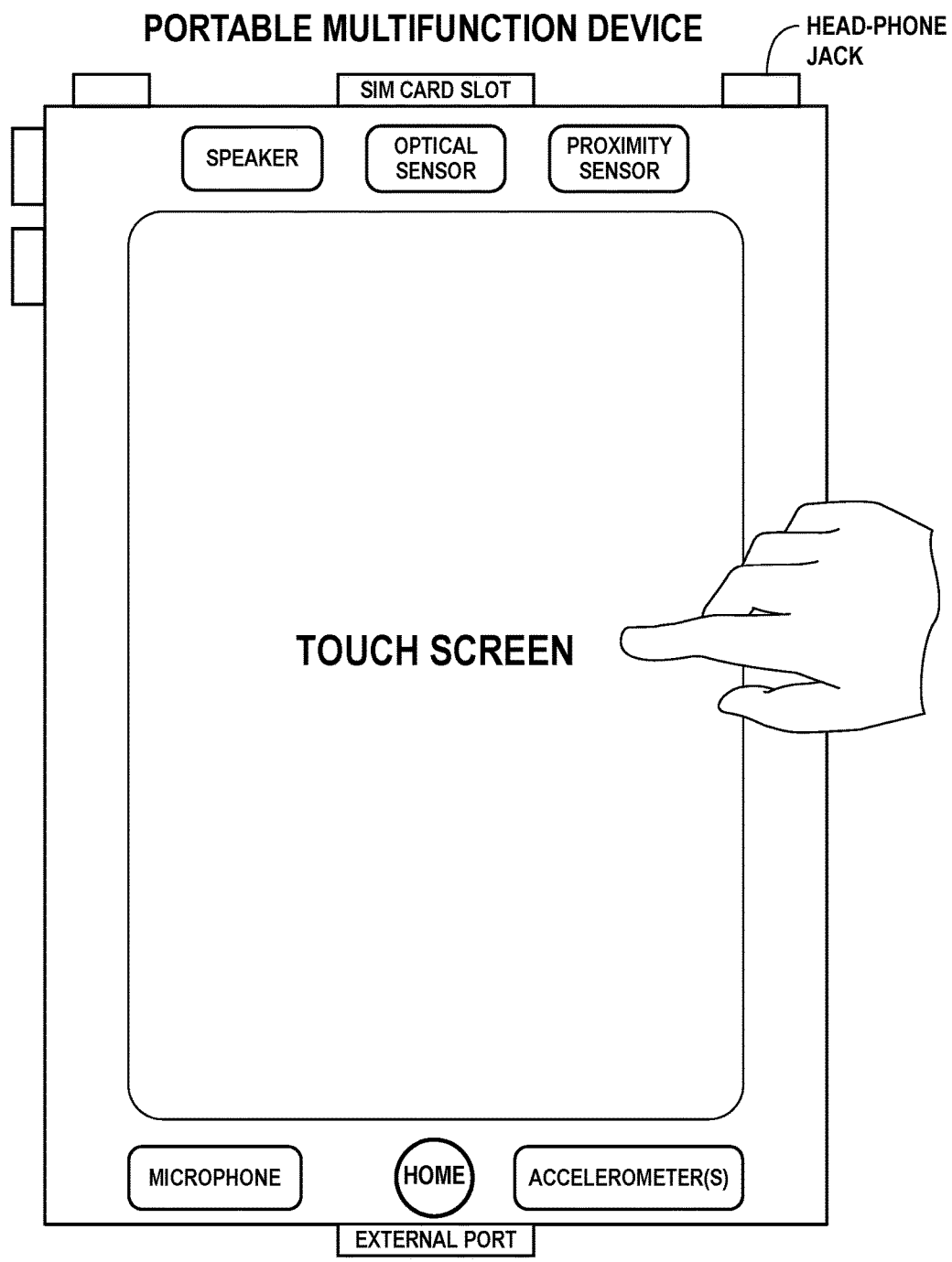
FIG. 4 schematically illustrates a mobile or computing device that can be used with the wearable device of the present disclosure.
Figure 5:
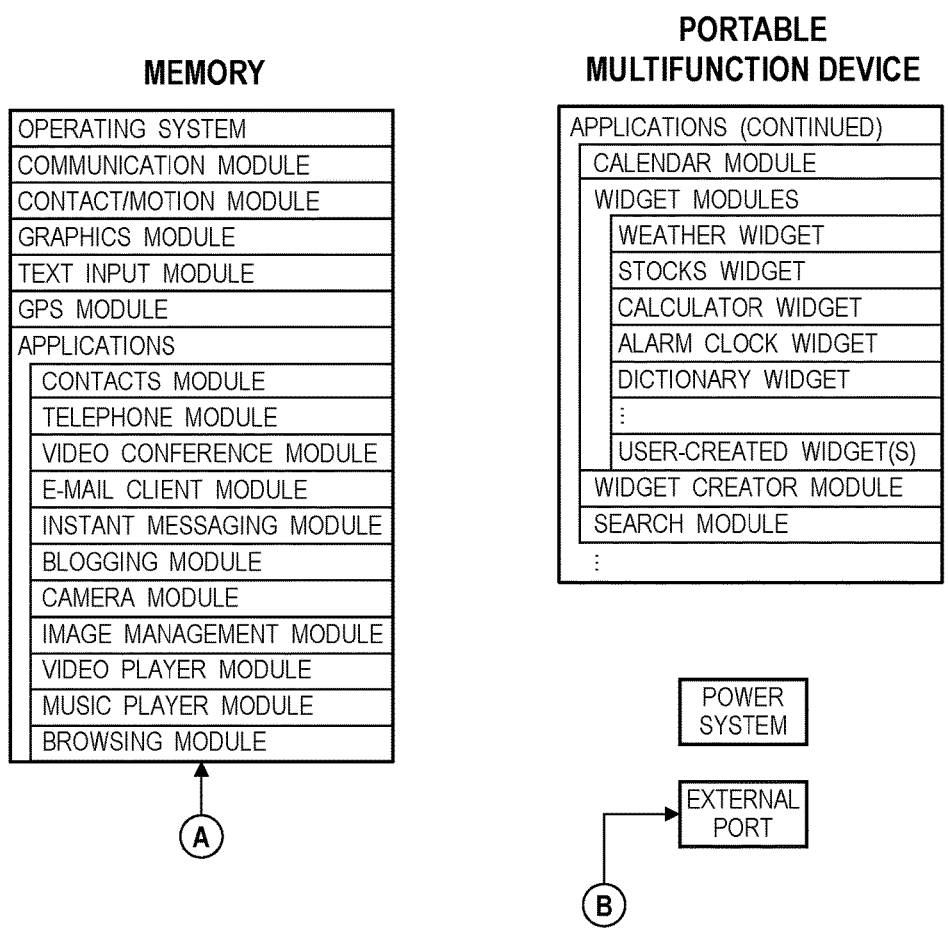
FIG. 5 schematically illustrates a memory and various other modules of a mobile device.
Figure 6:
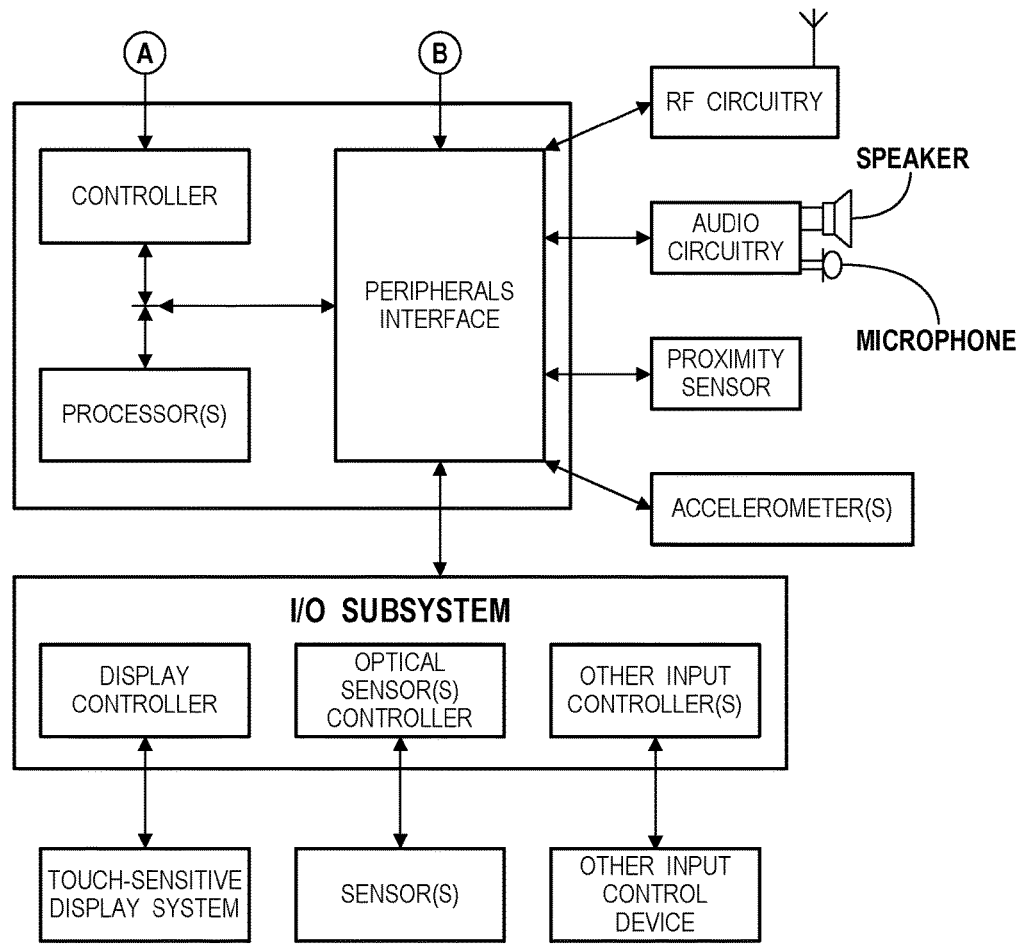
FIG. 6 schematically illustrates an I/O system of a mobile device and how an optical sensor coupled to an optical sensor controller in the I/O subsystem.

Referring to FIGS. 4, 5 and 6, diagrams are provided illustrating a mobile or computing device that can be used with wearable devices of the present disclosure.

Referring to FIG. 4, the mobile or computing device can include a display that can be a touch sensitive display. The touch-sensitive display is sometimes called a "touch screen" for convenience, and may also be known as or called a touch-sensitive display system. Referring to FIG. 5, the mobile or computing device may include a memory (which may include one or more computer readable storage mediums), a memory controller, one or more processing units (CPU's), a peripherals interface, Network Systems circuitry, including but not limited to RF circuitry, audio circuitry, a speaker, a microphone, an input/output (I/O) subsystem, other input or control devices, and an external port. In some examples, the touch-sensitive display is a capacitive or resistive display. The mobile or computing device may include one or more optical sensors. These components may communicate over one or more communication buses or signal lines.

It will be appreciated that the mobile or computing device is only one example of a portable multifunction mobile or computing device, and that the mobile or computing device may have more or fewer components than shown, may combine two or more components, or a may have a different configuration or arrangement of the components. The various components shown in FIG. 4 may be implemented in hardware, software or a combination of hardware and software, including one or more signal processing and/or application specific integrated circuits.

Memory may include high-speed random access memory and may also include non-volatile memory, such as one or more magnetic disk storage devices, flash memory devices, or other non-volatile solid-state memory devices. Access to memory by other components of the mobile or computing device, such as the CPU and the peripherals interface, may be controlled by the memory controller.

The peripherals interface couples the input and output peripherals of the device to the CPU and memory. The one or more processors run or execute various software programs and/or sets of instructions stored in memory to perform various functions for the mobile or computing device and to process data.

In some embodiments, the peripherals interface, the CPU, and the memory controller may be implemented on a single chip, such as a chip. In some other embodiments, they may be implemented on separate chips.

The Network System circuitry receives and sends signals, including but not limited to RF, also called electromagnetic signals. The Network System circuitry converts electrical signals to/from electromagnetic signals and communicates with communications Network Systems and other communications devices via the electromagnetic signals. The Network Systems circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry may communicate with Network Systems and other devices by wireless communication.

The wireless communication may use any of a plurality of communications standards, protocols and technologies, including but not limited to Long Term Evolution (LTE), Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry, the speaker, and the microphone provide an audio interface between a user and the mobile or computing device. The audio circuitry receives audio data from the peripherals interface, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data to the peripherals interface for processing. Audio data may be retrieved from and/or transmitted to memory and/or the Network Systems circuitry by the peripherals interface. In some embodiments, the audio circuitry can also include a headset jack (FIG. 4). The headset jack provides an interface between the audio circuitry and removable audio input/output peripherals, such as output-only headphones or a headset with both output (e.g., a headphone for one or both ears) and input (e.g., a microphone).

Referring to FIG. 6, the I/O subsystem couples input/output peripherals on the mobile or computing device, such as the touch screen and other input/control devices, to the peripherals interface. The I/O subsystem may include a display controller and one or more input controllers for other input or control devices. The one or more input controllers receive/send electrical signals from/to other input or control devices. The other input/control devices may include physical buttons (e.g., push buttons, rocker buttons, etc.), dials, slider switches, and joysticks, click wheels, and so forth. In some alternate embodiments, input controller(s) may be coupled to any (or none) of the following: a keyboard, infrared port, USB port, and a pointer device such as a mouse. The one or more buttons may include an up/down button for volume control of the speaker and/or the microphone. An infrared port, infrared receiver or infrared controller, for example, may enable a display device of the present disclosure to be controlled or receive content remotely, such as, for example, in a social event, entertainment event (e.g., theater or concert) or sporting event. The one or more buttons may include a push button. A quick press of the push button may disengage a lock of the touch screen or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile or computing device on or off. The user may be able to customize a functionality of one or more of the buttons. The touch screen is used to implement virtual or soft buttons and one or more soft keyboards.

The touch-sensitive touch screen provides an input interface and an output interface between the device and a user. The display controller receives and/or sends electrical signals from/to the touch screen. The touch screen displays visual output to the user. The visual output may include graphics, text, icons, video, and any combination thereof (collectively termed "graphics"). In some embodiments, some or all of the visual output may correspond to user-interface objects, further details of which are described below.

A touch screen has a touch-sensitive surface, sensor or set of sensors that accepts input from the user based on haptic and/or tactile contact. The touch screen and the display controller (along with any associated modules and/or sets of instructions in memory) detect contact (and any movement or breaking of the contact) on the touch screen and converts the detected contact into interaction with user-interface objects (e.g., one or more soft keys, icons, web pages or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

A touch-sensitive display in some embodiments of the touch screen may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen displays visual output from the portable mobile or computing device, whereas touch sensitive tablets do not provide visual output.

A touch-sensitive display in some embodiments of the touch screen may be as described in the following applications: (1) U.S. patent application Ser. No. 11/381,313, "Multipoint Touch Surface Controller," filed May 12, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen may have a resolution in excess of 1000 dpi. In an exemplary embodiment, the touch screen has a resolution of approximately 1060 dpi. The user may make contact with the touch screen using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the mobile or computing device may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen or an extension of the touch-sensitive surface formed by the touch screen.

In some embodiments, the mobile or computing device may include a physical or virtual click wheel as an input control device. A user may navigate among and interact with one or more graphical objects (henceforth referred to as icons) displayed in the touch screen by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller as well as one or more of the modules and/or sets of instructions in memory. For a virtual click wheel, the click wheel and click wheel controller may be part of the touch screen and the display controller, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The mobile or computing device also includes a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The mobile or computing device may also include one or more sensors, including, but not limited to, optical sensors. FIG. 6 illustrates how an optical sensor coupled to an optical sensor controller in I/O subsystem. The optical sensor may include charge-coupled device (CCD) or complementary metal-oxide semiconductor (CMOS) phototransistors. The optical sensor receives light from the environment, projected through one or more lens, and converts the light to data representing an image. In conjunction with an imaging module 58 (also called a camera module); the optical sensor may capture still images or video. In some embodiments, an optical sensor is located on the back of the mobile or computing device, opposite the touch screen display on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor can be changed by the user (e.g., by rotating the lens and the sensor in the device housing) so that a single optical sensor may be used along with the touch screen display for both video conferencing and still and/or video image acquisition.

The mobile or computing device may also include one or more proximity sensors. In one embodiment, the proximity sensor is coupled to the peripherals interface. Alternately, the proximity sensor may be coupled to an input controller in the I/O subsystem. The proximity sensor may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 13/096,386, "Using Ambient Light Sensor To Augment Proximity Sensor Output"; Ser. No. 13/096,386, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory may include an operating system, a communication module (or set of instructions), a contact/motion module (or set of instructions), a graphics module (or set of instructions), a text input module (or set of instructions), a Global Positioning System (GPS) module (or set of instructions), and applications (or set of instructions).

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module facilitates communication with other devices over one or more external ports and also includes various software components for handling data received by the Network Systems circuitry and/or the external port. The external port (e.g., Universal Serial Bus (USB), FIREWIRE, etc.) is adapted for coupling directly to other devices or indirectly over Network System. In some embodiments, the external port is a multi-pin (e.g., 30-pin) connector that is the same as, or similar to and/or compatible with the 30-pin connector used on iPod (trademark of Apple Computer, Inc.) devices.

The contact/motion module may detect contact with the touch screen (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module and the display controller also detect contact on a touchpad. In some embodiments, the contact/motion module and the controller detects contact on a click wheel.

Examples of other applications that may be stored in memory include other word processing applications, JAVA-enabled applications, encryption, digital rights management, voice recognition, and voice replication.

In conjunction with touch screen, display controller, contact module, graphics module, and text input module, a contacts module may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone, video conference, e-mail, or IM; and so forth.

Wearable Device Positioned at the Mobile Device

Figure 9:
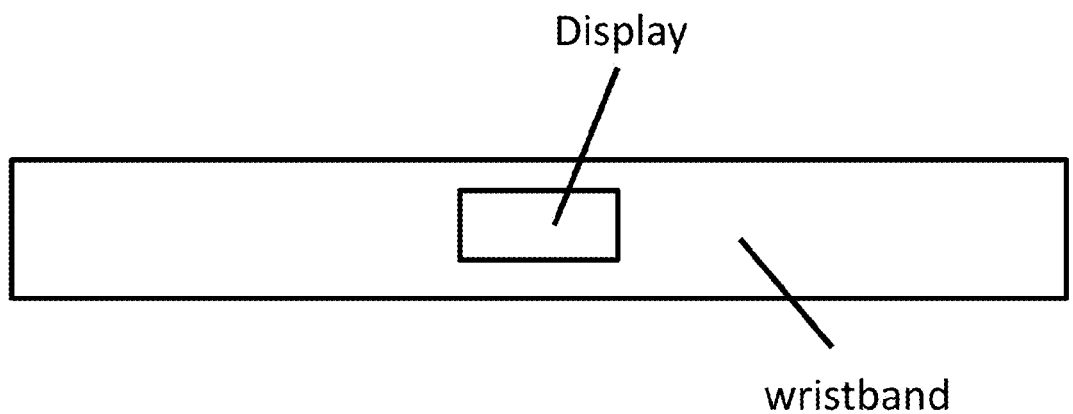
FIG. 9 shows a display mounted on a wristband.

Displays of the present disclosure can be used in various settings. For example, a display can be mounted on a wrist band, as shown in FIG. 9. As another example, a display can be mounted on a mobile device, an article of clothing or other object. FIGS. 10A-10K show a wearable device that can be mounted on various objects, such as a mobile device. In FIGS. 10A-10E, the display device can be mountable on a mobile device as a case. As a non-limiting example the wearable device fits like a case that wraps around and is then coupled to the mobile device, similar to that of a regular mobile device protective case. The case has an OLED and/or flexible OLED. The wearable device communicates with the mobile device. In one embodiment the wearable devices are simple screens expressing photos, images, words just like those displayed on a wearable device.

Figure 10A:
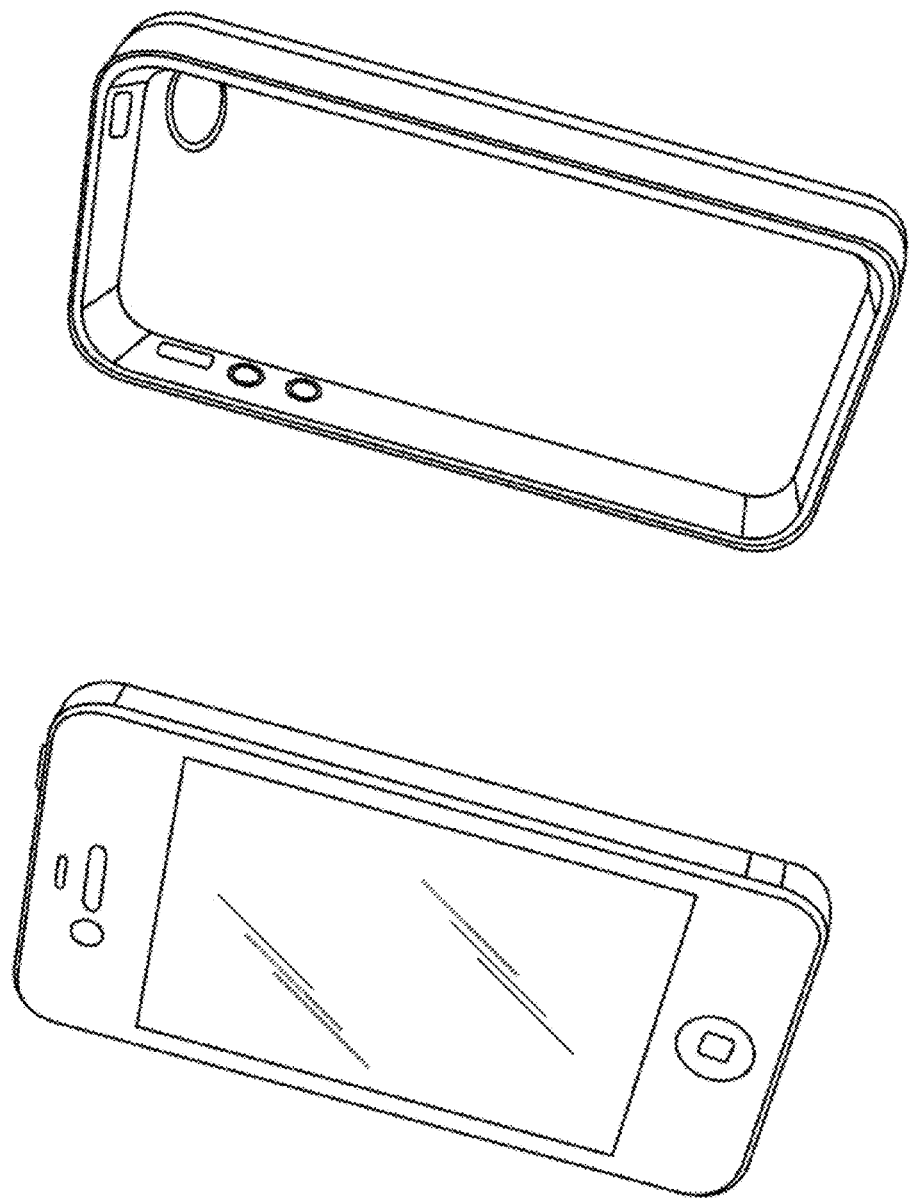
FIG. 10A shows a perspective view of a wearable device that can be mounted on a mobile device.
Figure 10C:
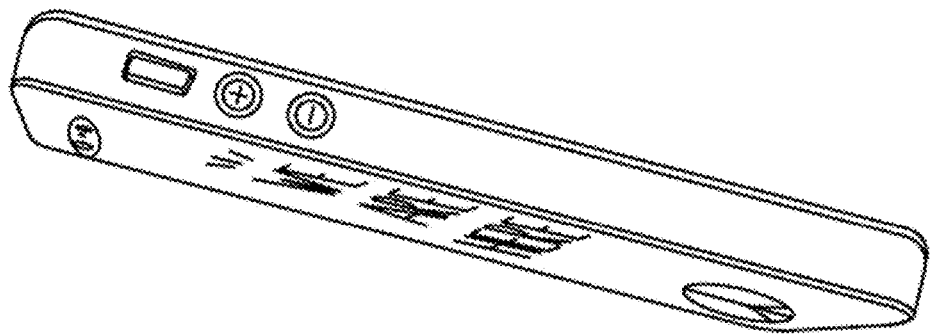
FIG. 10C shows an elevational side view of the wearable device.
Figure 10B:
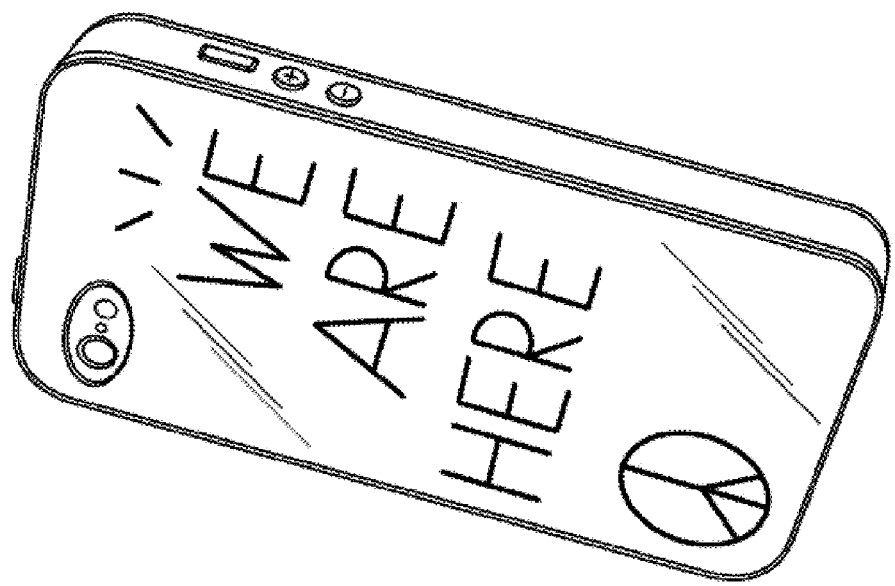
FIG. 10B shows a rear view of the wearable device.
Figure 10E:
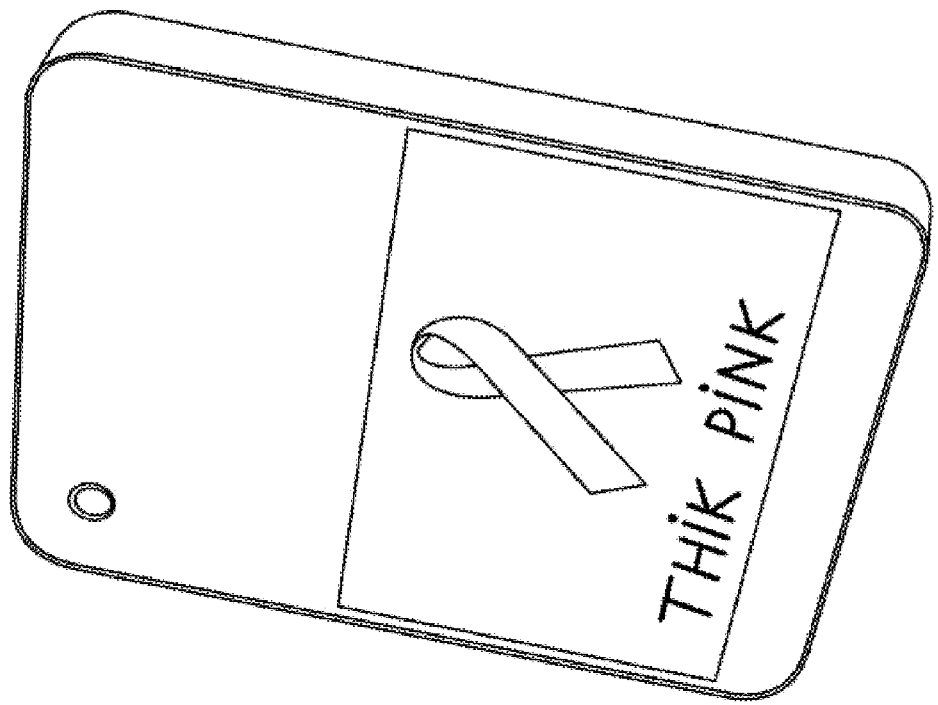
FIG. 10E shows another example of a wearable device that can be mounted on a mobile device.
Figure 10D:
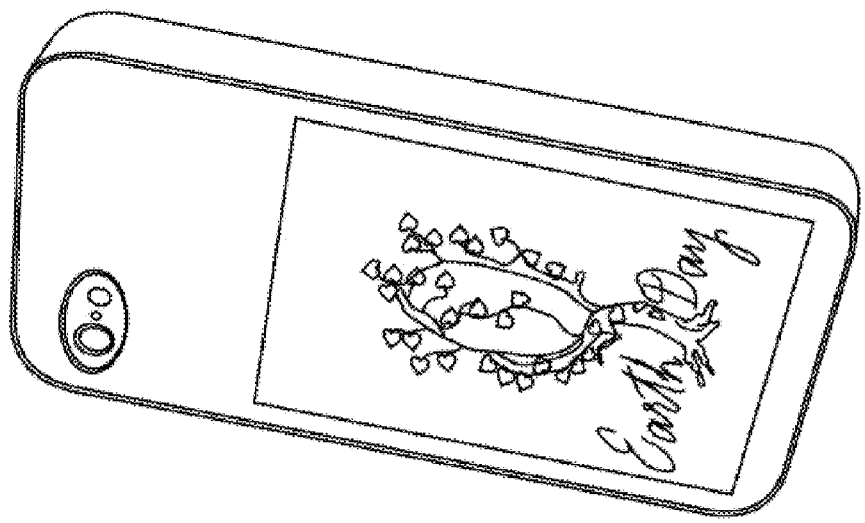
FIG. 10D shows a rear view of a wearable device displaying an exemplary media.
Figure 10G:
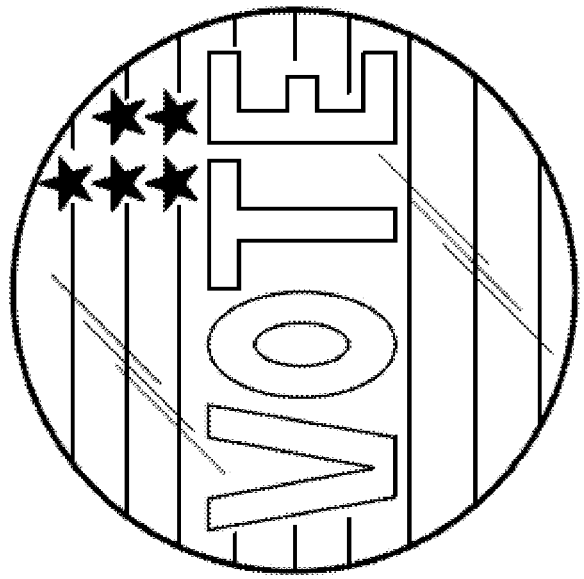
FIG. 10G shows another view of the display device has a curved or non-linear profile.
Figure 10F:
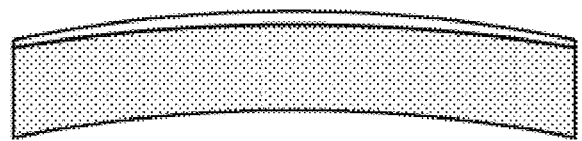
FIG. 10F shows a display device has a curved or non-linear profile.

The display device can have a curved or non-linear profile. The display device can be flexible. FIGS. 10F and 10G show a display device that is curvilinear. From a side, the display device has a non-linear profile.

Figure 10H:
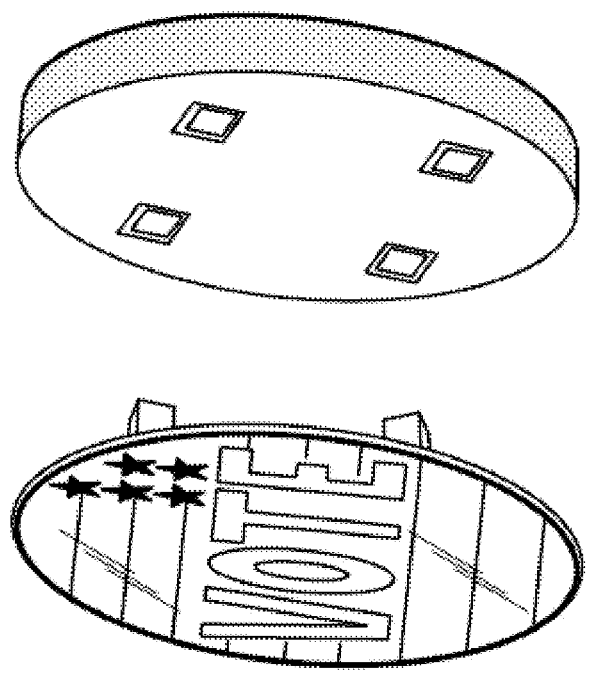
FIG. 10H shows a display device with a display that is removable from a support member.
Figure 10J:
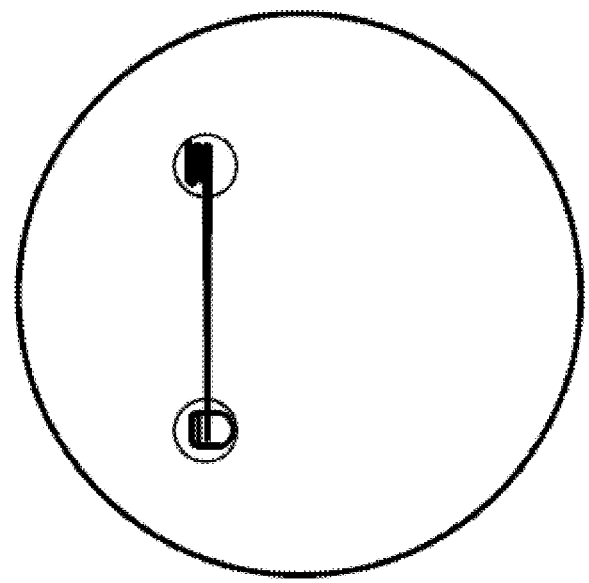
FIG. 10J shows an example of a support member that allows the display device to be mountable on an article of cloth or other fabrics.
Figure 10I:
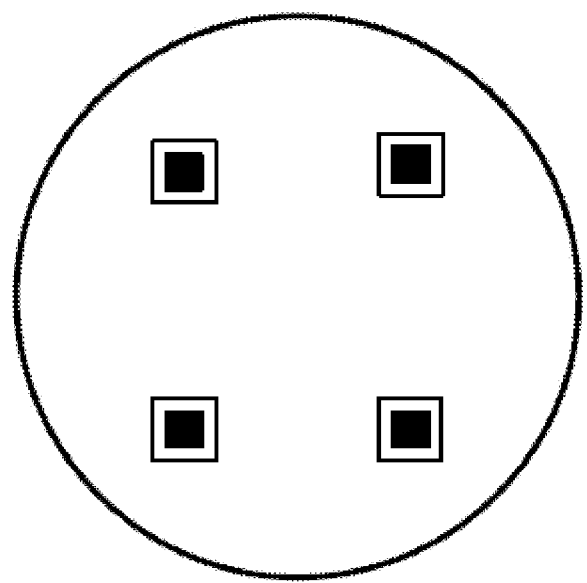
FIG. 10I shows an example of a support member.

FIGS. 10H-10J shows a display device with a display that is removable from a support member. The display can have mating pins that enable the display to securely mate with the support member. The support member can have a pin that allows the support member to be mounted on an article of clothing, as shown in FIG. 10K.

In one embodiment the mobile device uses Bluetooth® and/or WiFi to interact and communication with the wearable device screen.

In one embodiment the wearable device is configured to interpret certain Bluetooth profiles, which are definitions of possible applications and specify general behaviors that Bluetooth enabled devices use to communicate with other Bluetooth devices. These profiles include settings to parametrize and to control the communication from start. Adherence to profiles saves the time for transmitting the parameters anew before the bi-directional link becomes effective. There are a wide range of Bluetooth profiles that describe many different types of applications or use cases for devices In various embodiments the mobile device and the wearable device are able to have the following: wireless control of and communication between a mobile phone and a wearable device; wireless networking between wearable devices in a confined space and where little bandwidth is required; transfer of files, contact details, calendar appointments, and reminders between devices with OBEX; replacement of previous wired RS-232 serial communications; for low bandwidth applications where higher USB bandwidth is not required and cable-free connection desired; sending small advertisements from Bluetooth-enabled wearable device advertising hoardings to other, discoverable, Bluetooth devices; dial-up internet access on wearable devices using the mobile device; short range transmission of health sensor data from wearable devices; real-time location systems (RTLS) for wearable devices; and personal security applications. Wi-Fi can also be utilized with similar applications for the wearable device.

In one embodiment the wearable device can be coupled to a Bluetooth adapter that enables the wearable device to communicate with the mobile device.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

Computer Control Systems

Figure 11:
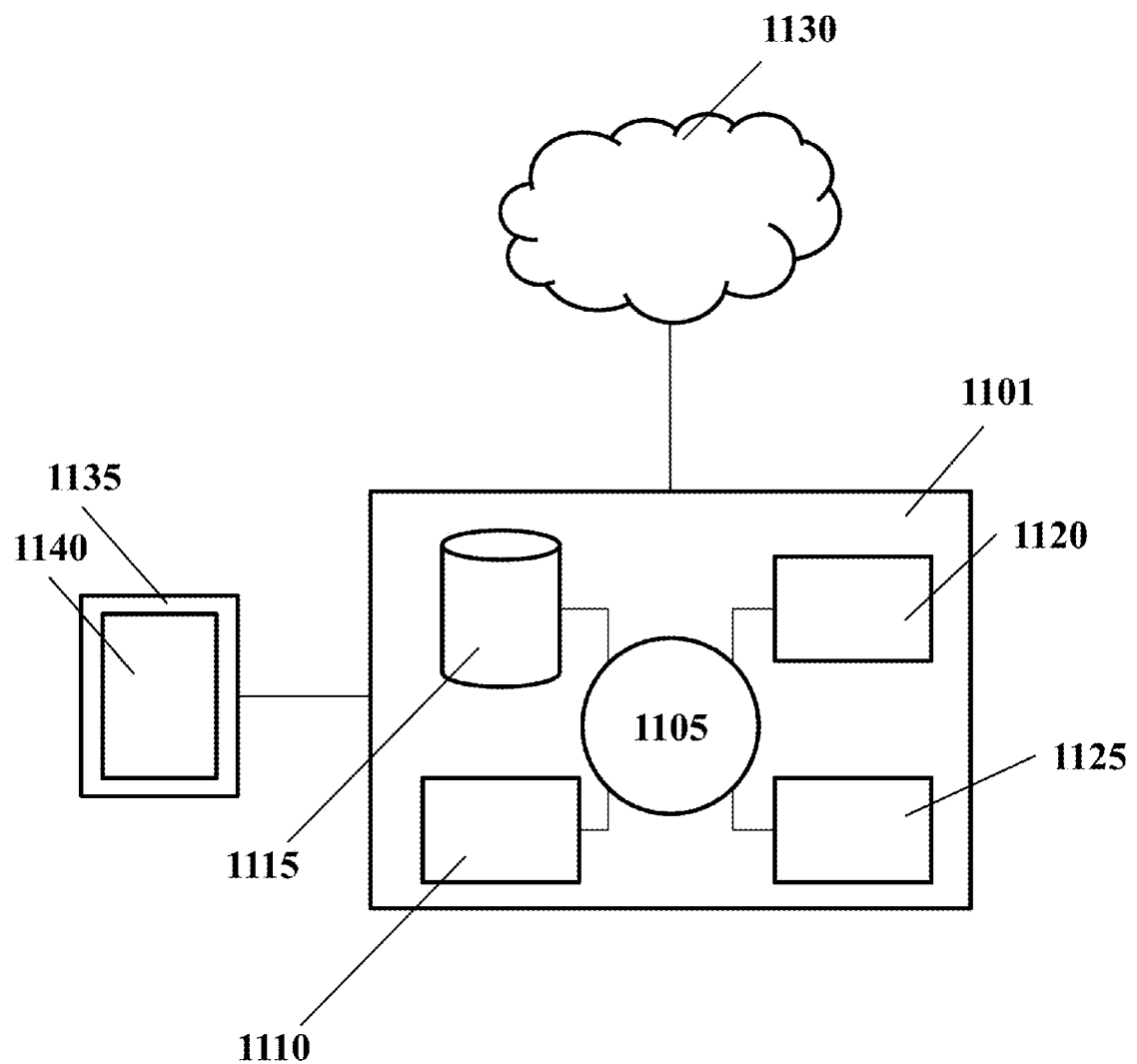
FIG. 11 shows a computer control system that is programmed or otherwise configured to implement methods provided herein.

The present disclosure provides computer control systems that are programmed to implement methods of the disclosure. FIG. 11 shows a computer system 1001 that is programmed or otherwise configured to implement methods of the present disclosure. The computer system 1001 includes a central processing unit (CPU, also "processor" and "computer processor" herein) 1005, which can be a single core or multi core processor, or a plurality of processors for parallel processing. The computer system 1001 also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1025, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 2030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the computer system 1001, can implement a peer-to-peer network, which may enable devices coupled to the computer system 1001 to behave as a client or a server.

The CPU 1005 can execute a sequence of machine-readable instructions, which can be embodied in a program or software. The instructions may be stored in a memory location, such as the memory 1010. The instructions can be directed to the CPU 1005, which can subsequently program or otherwise configure the CPU 1005 to implement methods of the present disclosure. Examples of operations performed by the CPU 1005 can include fetch, decode, execute, and writeback.

The CPU 1005 can be part of a circuit, such as an integrated circuit. One or more other components of the system 1001 can be included in the circuit. In some cases, the circuit is an application specific integrated circuit (ASIC).

The storage unit 1015 can store files, such as drivers, libraries and saved programs. The storage unit 1015 can store user data, e.g., user preferences and user programs. The computer system 1001 in some cases can include one or more additional data storage units that are external to the computer system 1001, such as located on a remote server that is in communication with the computer system 2001 through an intranet or the Internet.

The computer system 1001 can communicate with one or more remote computer systems through the network 1030. For instance, the computer system 1001 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1001 via the network 1030.

Methods as described herein can be implemented by way of machine (e.g., computer processor) executable code stored on an electronic storage location of the computer system 1001, such as, for example, on the memory 1010 or electronic storage unit 1015. The machine executable or machine readable code can be provided in the form of software. During use, the code can be executed by the processor 1005. In some cases, the code can be retrieved from the storage unit 1015 and stored on the memory 1010 for ready access by the processor 1005. In some situations, the electronic storage unit 1015 can be precluded, and machine-executable instructions are stored on memory 1010.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 2001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display 1035 that comprises a user interface (UI) 1040 for providing, for example, an application (app) to permit a user to select media for display. Examples of UI's include, without limitation, a graphical user interface (GUI) and web-based user interface.

Apps of the present disclosure can provide various features and enable various benefits. An app may be about expressing what a user cares about, learning about causes and connecting to others and creating a social experience around causes, philanthropy and self-expression. The user may wear and share what the user cares about, connect and take action to make a social impact. The app may be a visual social network, enabling the user to provide an expression to other individuals. This may be to create awareness, flow resources and create movements around social impact. The app may allow a user to set monthly or other time frame goals around learning, donating, and educating others, about new charities and organizations, causes and opportunities (e.g., philanthropic opportunities). The app may enable a user to express what the user cares about, learning, connecting around various interests of the user.

The app can be used to create expression, share existing expressions, buy and sell expressions, connect and donate to charities, meet and connect with people who share similar interests around causes, such as causes that may benefit society and the world. The app can focus on causes that may positively impact humanity, from improving education to minimizing or addressing various social issues (e.g., animal rights, human rights, pollution, etc.).

The app can provide a marketplace for expressions. The app can enable various experiences. In some examples, the app can allow users in a stadium to be part of a light show; the app can allow GPS to guide individuals to meet based on proximity and shared interests; the app can allow for a user to create a moderated slide-show of expressions; and the app can enable and stimulate global and local conversations around various topics and interests.

The app can be used with a display device (e.g., wearable device) of the present disclosure. Alternatively, the app can be used without the display device. The app can allow the user to connect to a display device so that the user can wear and share one or more expressions that the user is "expressing" on the app. The app can allow the user to invite friends to join an expression, movement, or cause (e.g., philanthropic cause), and can allow the user to post on social media.

Methods and systems of the present disclosure can be implemented by way of one or more algorithms. An algorithm can be implemented by way of software upon execution by the central processing unit 1005.

Figure 12A:
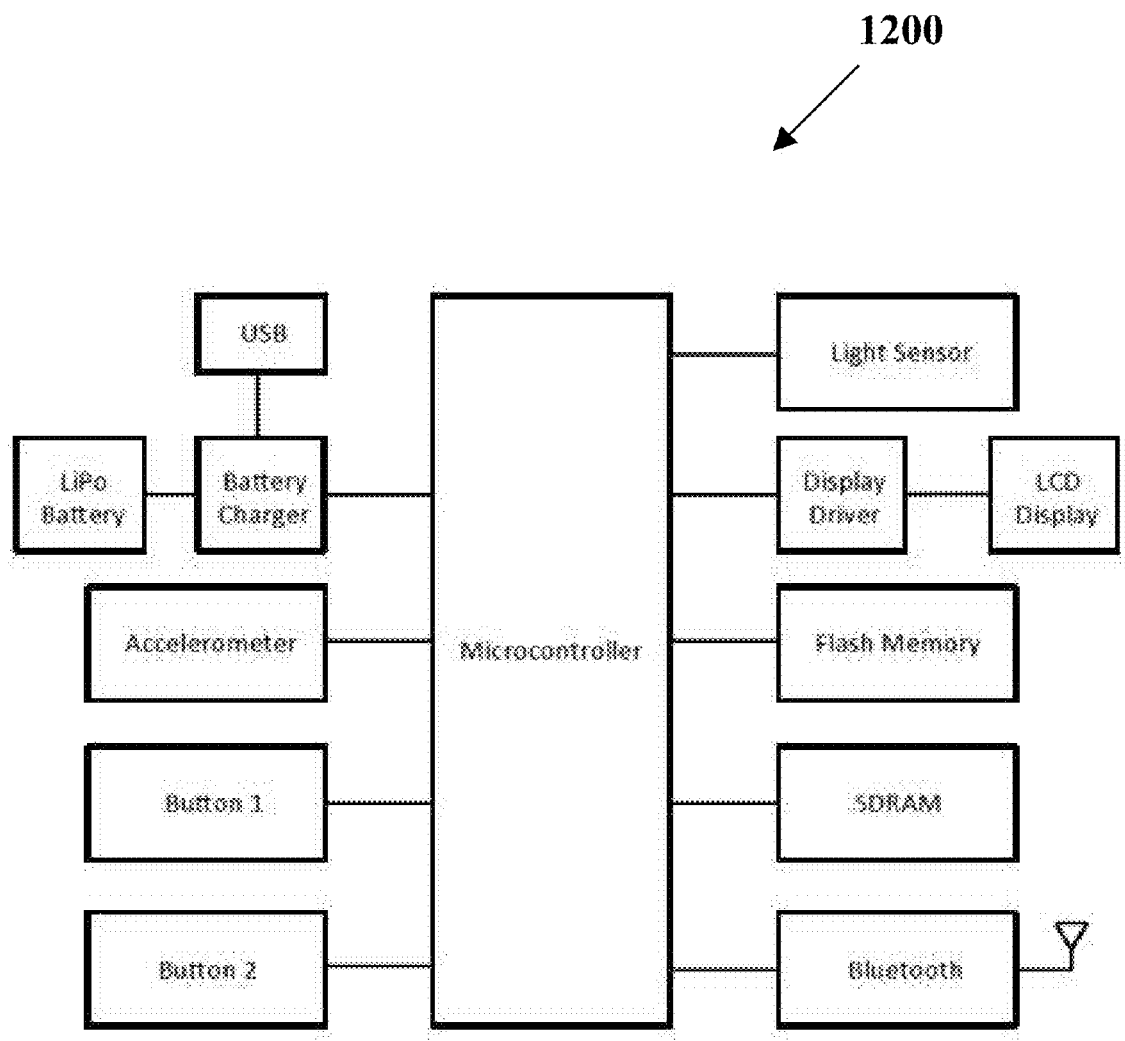
FIG. 12A shows a control unit for wireless charging.

FIG. 12A shows a control unit 1200. The control unit 1200 includes a microcontroller that is in communication with various other units, including a battery (e.g., lithium ion polymer battery), a battery charger (e.g., the inductive charger or the wireless charger) that is in communication with a universal serial bus (USB) port, a coil coupled to the inductive charger, an accelerometer, a first button, a second button, Bluetooth, a first memory (e.g., synchronous dynamic random access memory, or SDRAM), a second memory (e.g., flash memory), a display driver, liquid crystal display (LCD), and a light sensor. The control unit 2100 can be integrated with a display device or system of the present disclosure. For example, the control unit 2100 can be integrated as a circuit board of a display device (e.g., button display).

Figure 12B:
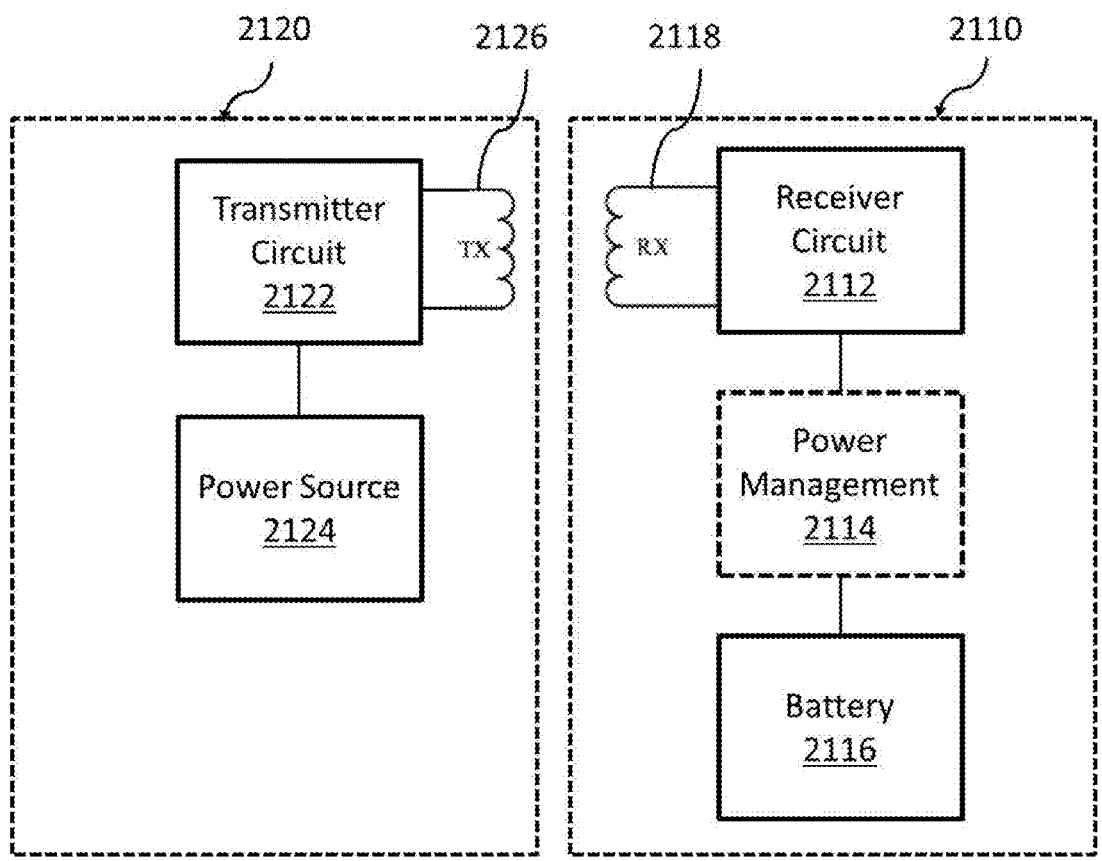
FIG. 12B illustrates a schematic diagram for wireless charging a wearable device.
Figure 22:
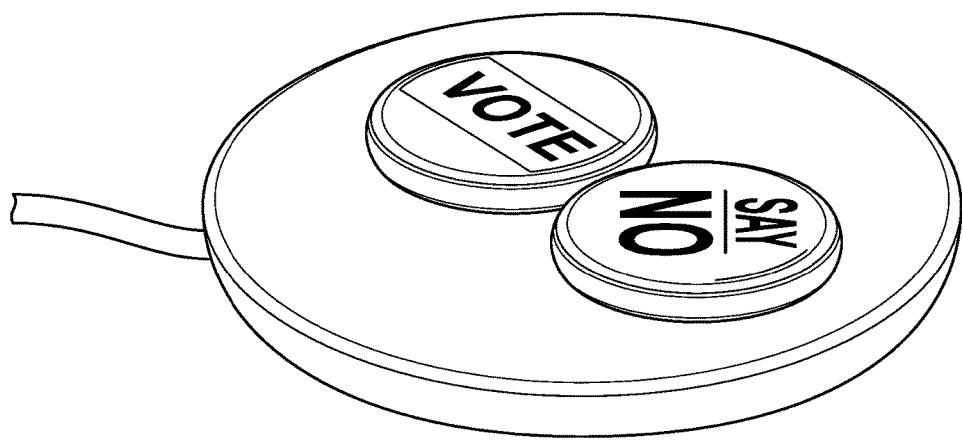
FIG. 22 shows a charger for wirelessly charging a wearable device.

FIG. 12B illustrates a schematic diagram for inductive charging a display device 2110 (e.g., a wearable device, a button display as discussed in the present disclosure) in an inductive charging area 2120 (e.g., a charging station, a charging platform).). In some embodiments, the inductive charging area can be the same charging area 3100 as shown in FIG. 22. In some embodiments, the display device 2110 may comprise a receiver circuit 2112 connected to a receiver coil 2118, and a battery 2116 for providing power to the display device 2110. Optionally, a power management unit 2114 may be coupled between the receiver circuit and the battery to provide various functionalities. For example, the power management unit may comprise circuitries configured to detect the charging status of the battery. The power management unit may direct current to charge the battery when the capacity is low. The power management unit may not direct current to the battery when the capacity is above a predetermined threshold value. The inductive charging area 2120 may comprise a transmitter circuit 2122 connected to a power source 2124 and a transmitter coil 2126.

In some examples, the voltage from the power source may be converted into alternating current (AC). The AC is sent to the transmitter coil by the transmitter circuit. The AC may generate/induce a magnetic field in the transmitter coil. The magnetic field may extend to the receiver coil and generate current within the receiver coil. The current flowing within the receiver coil is converted into direct current (DC) by the receiver circuit. The DC can be used to charge the battery. In some examples, the inductive charging may include resonant wireless charging to charge the display device at a greater distance from the charging area. The receiver coil and the transmitter coil may resonate at the same frequency.

FIG. 22 shows a charger with an inductive charging area 3100 for charging a wearable device 3102. The user may deposit the wearable device in the charging area for automatic charging. In some examples, the charging area can simultaneously charge a plurality of display devices. In some instances, the charging area 3100 or charging pad may have a substantially planar profile. Alternatively, the profile may comprise curvature surfaces and/or one or more tapered facets. The charging area or charging pad may have various shapes such as circular, rectangular, square, oval, triangular, polygonal shapes and the like. The charging area or charging pad may or may not be portable.

EXAMPLE 1

FIGS. 13A-13D show a display device 2200 that is configured to display media selected by a user. FIG. 22A shows an exploded side view of the display device. The display device includes a circular display, printed circuit board assembly (PCBA), battery, a back housing (or carrier) and steel cover. The display device has a thickness of about 13.48 millimeter. The internal components (i.e., display, PCBA and battery) have a thickness of about 9.88 mm.

Figure 13A:
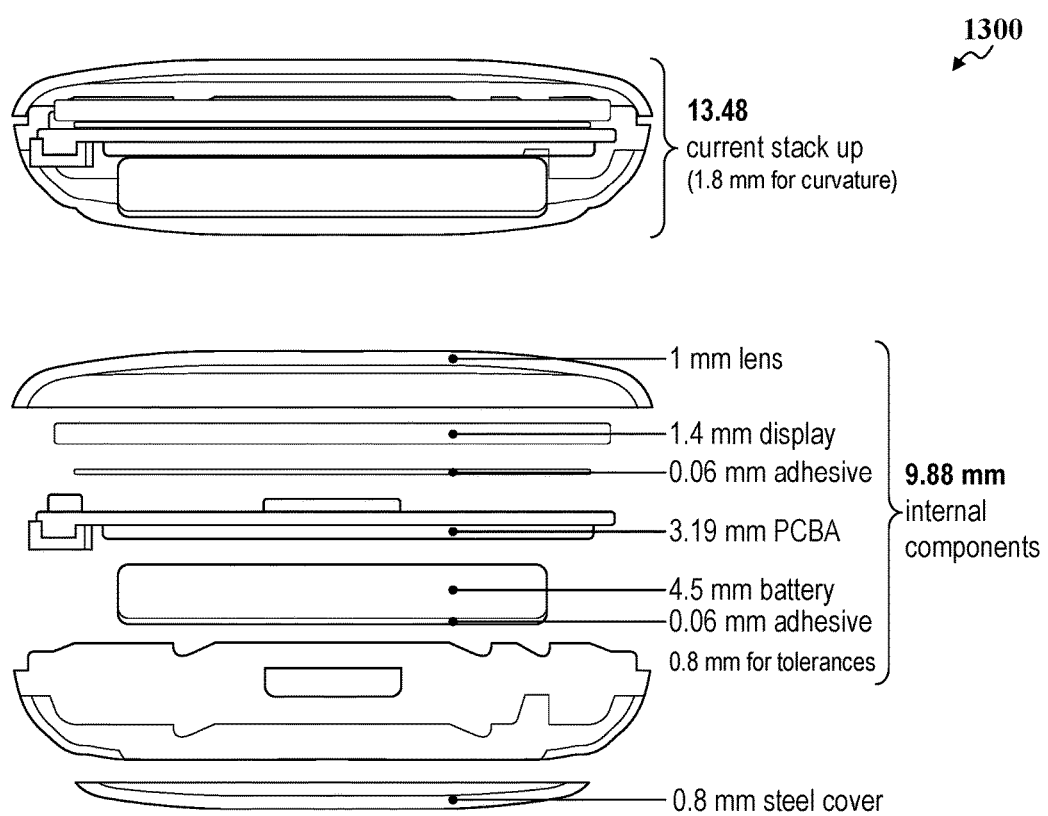
FIG. 13A shows a display device that is configured to display media selected by a user.
Figure 13B:
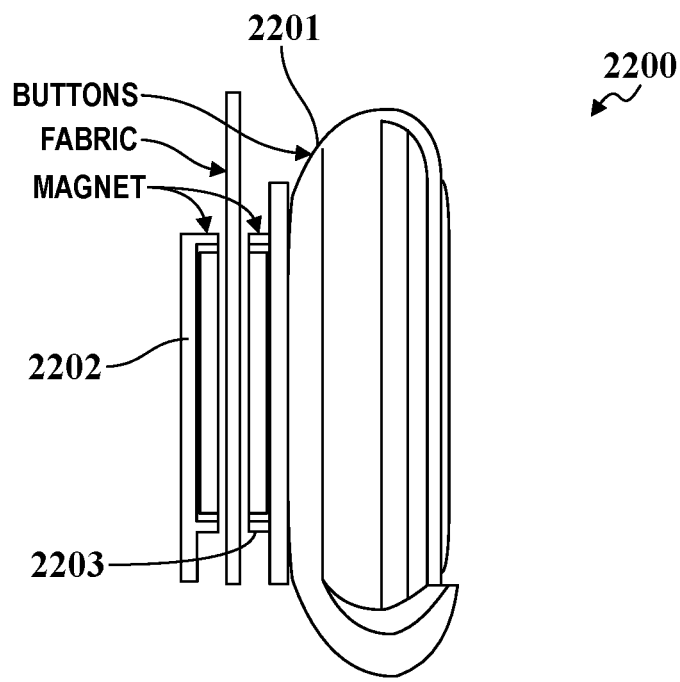
FIG. 13B shows a display device that is configured to display media selected by a user and can be mounted on other objects.
Figure 13C:
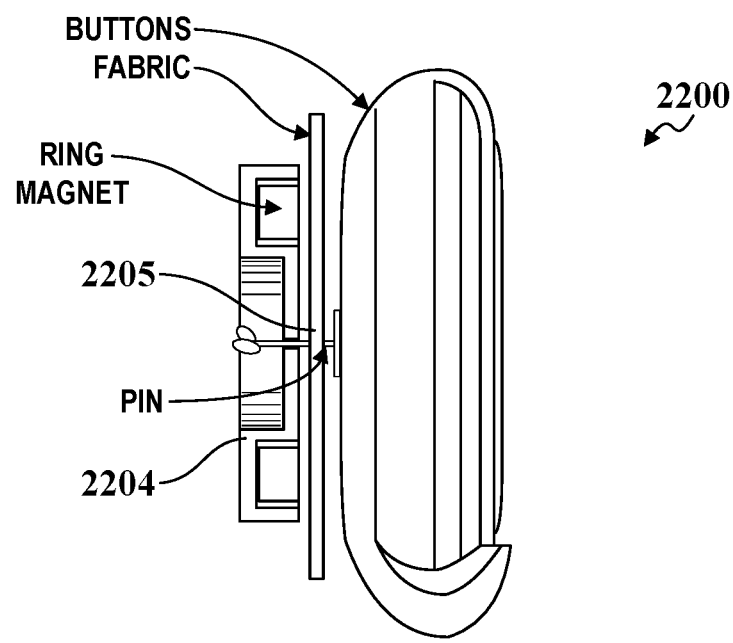
FIG. 13C shows another view of the display device.

With reference to FIGS. 13B and 13C, the display device 2200 includes a button 2201, a first magnet 2202 and second magnet 2203. The first magnet 2202 and second magnet 2203 have opposite polarities, which can enable the display device 2200 to be secured against an object, such as a fabric. As an alternative, the display device 2200 can include a ring 2204 that mates with a pin 2205, which can enable the display device 2200 to be secured against the object.

Figure 13D:
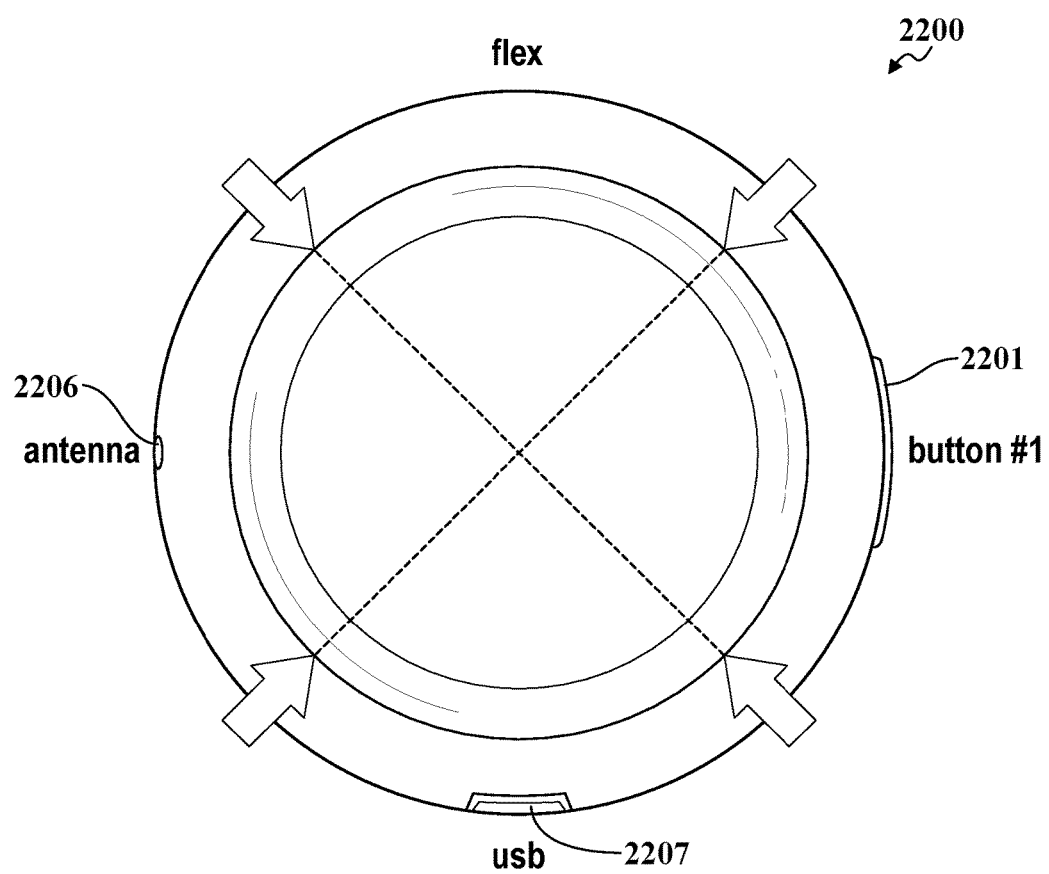
FIG. 13D shows various components of the display device.

FIG. 13D shows various components of the display device 2200. The display device 2200 includes the button 2201, an antenna 2206 and USB port 2207. The USB port 2207 can be used to charge the battery of the display device 2200.

Figure 14A:
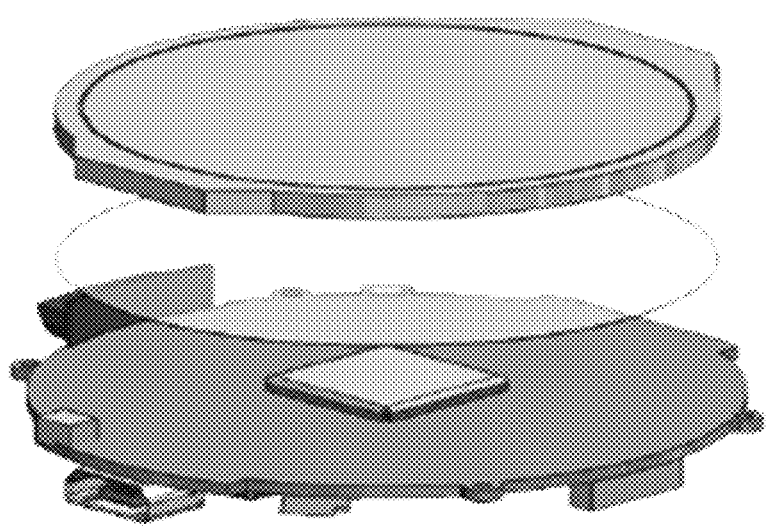
FIG. 14A shows a stage of construction of a display device.
Figure 14B:
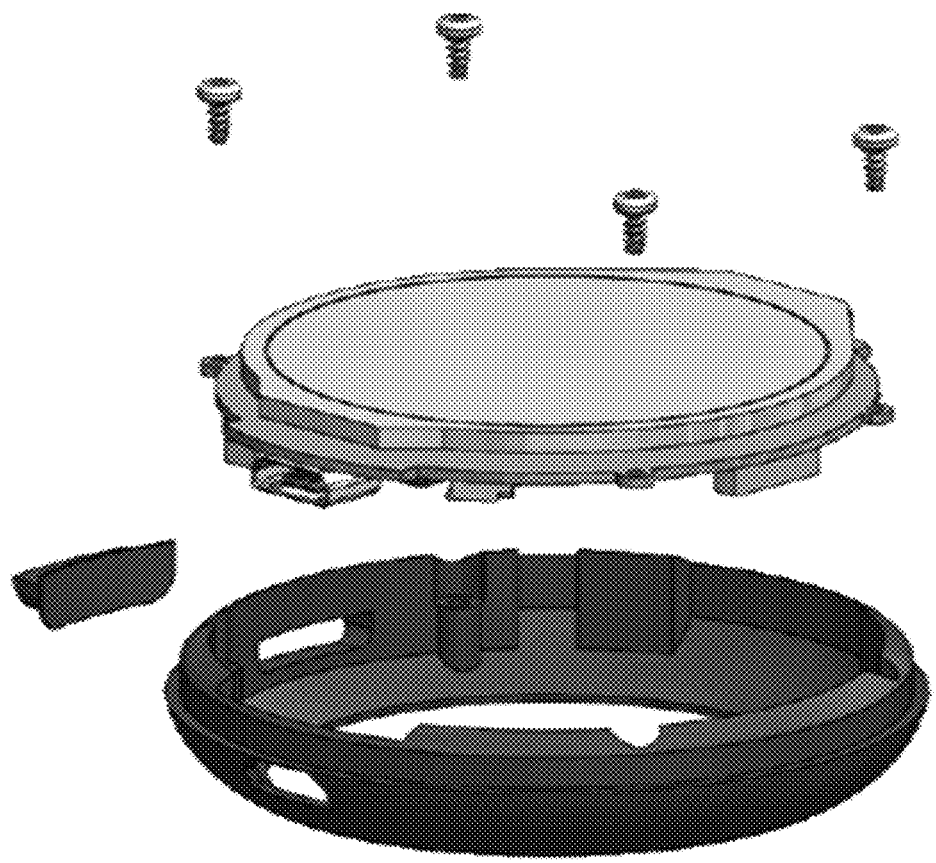
FIG. 14B shows another stage of construction of a display device.

FIGS. 14A-14E show various stages of construction of a display device, such as the display device 2200. FIG. 14A shows a circular display screen of the display device 2200. As shown in FIG. 14B, the display screen can be secured in the back housing of the display device 2200.

Figure 14C:
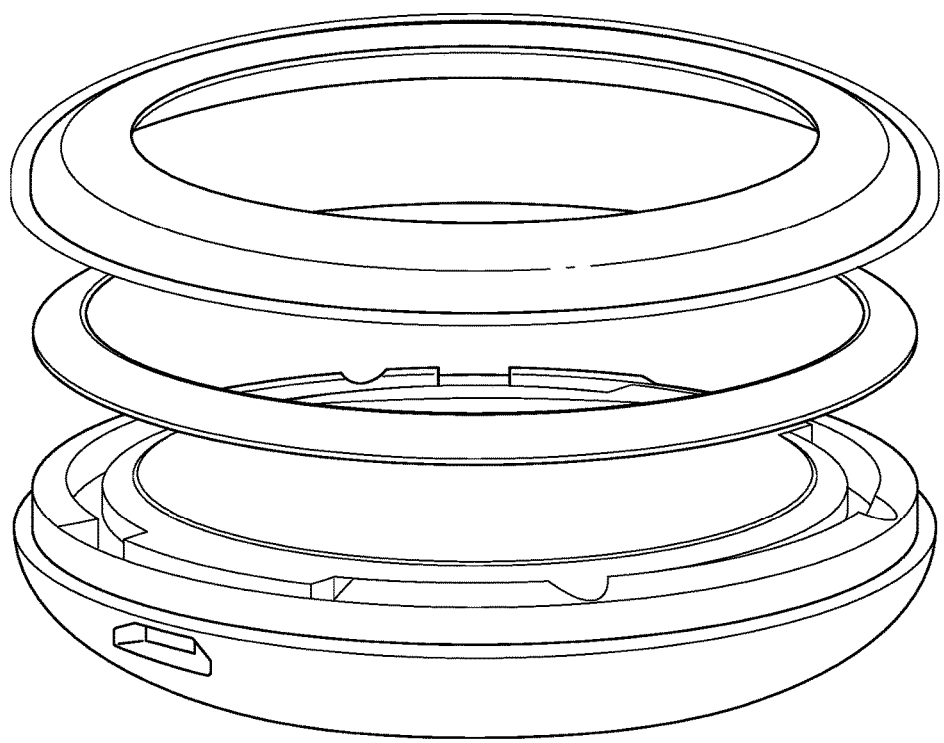
FIG. 14C shows another stage of construction of a display device.
Figure 14D:
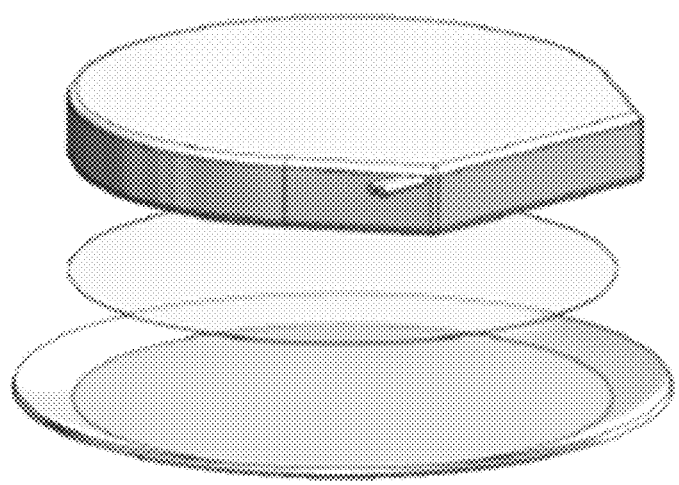
FIG. 14D shows another stage of construction of a display device.
Figure 14E:
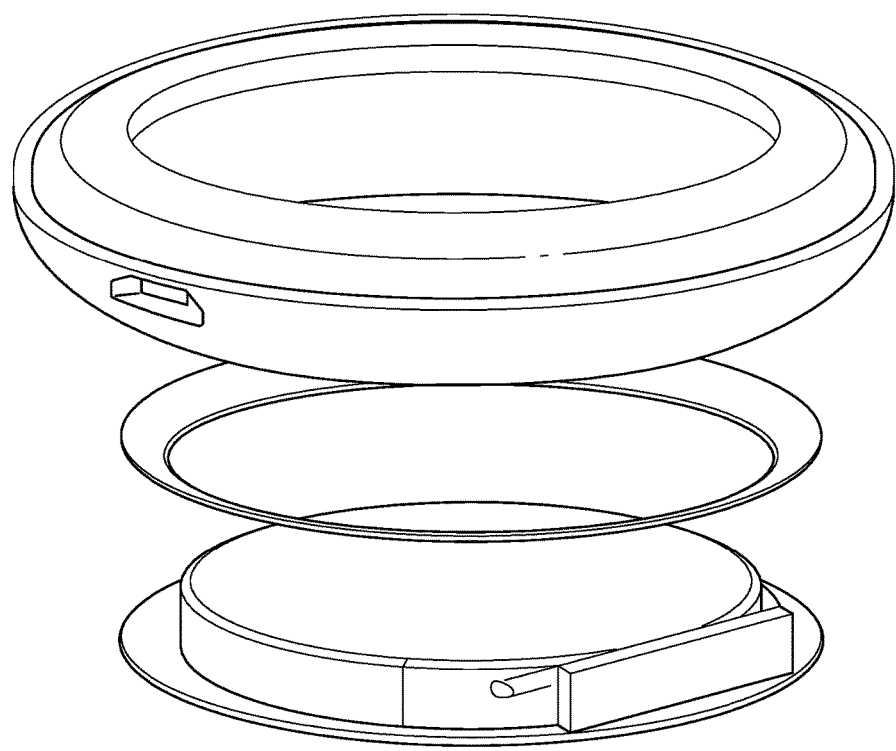
FIG. 14E shows another stage of construction of a display device.

With reference to FIG. 14A, the display screen is connected to the PCBA. A bottom surface of the display screen is coupled to the top of the PCBA. In FIG. 14B, the button is inserted into the carrier and the PCBA is secured to the carrier using screws. In FIG. 14C, a lens is secured to a top surface of the carrier using adhesive. In FIG. 14D, the battery is secured to the top surface of the steel bottom cover. The assembly is completed by securing the steel plate to the lip on the bottom surface of the carrier, as shown in FIG. 14E.

Figure 15:
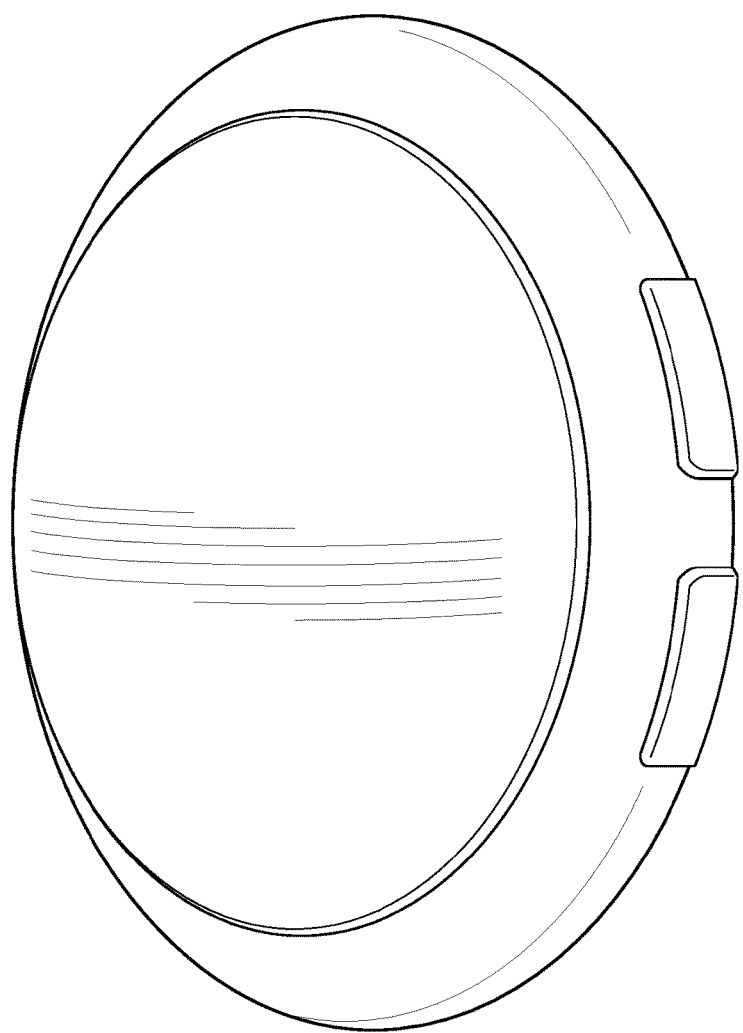
FIG. 15 shows a display device with a display screen.

FIG. 15 shows another display device with a display screen. The display device also includes two side buttons.

Figure 16:
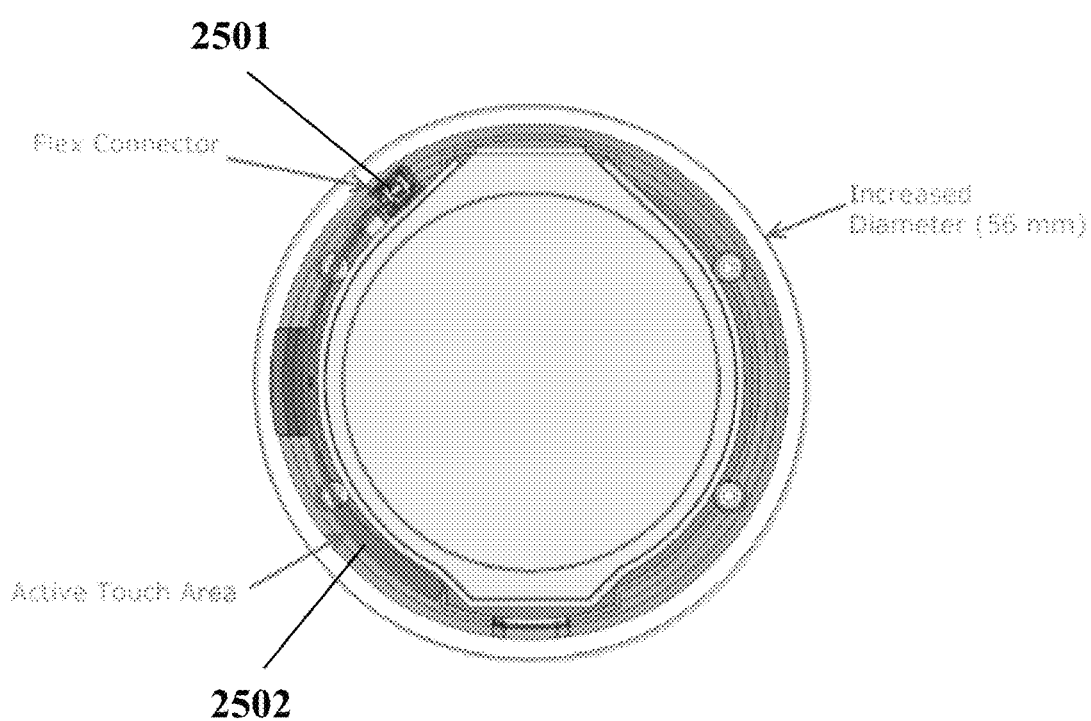
FIG. 16 shows a display device with a flex connector and active touch area.

As another example, FIG. 16 shows a display device with a flex connector 2501 and active touch area 2502. This display device may be suitable for use with a display screen that is a touchscreen, such as a capacitive touchscreen.

The display screens of the present disclosure may be configured for use with gestures, such as swiping across a display screen. For example, media may be selected by a user by swiping on the display screen. As another example, the user may scroll through media by swiping from left to right, right to left, top to bottom, or bottom to top.

EXAMPLE 2

Figure 17:
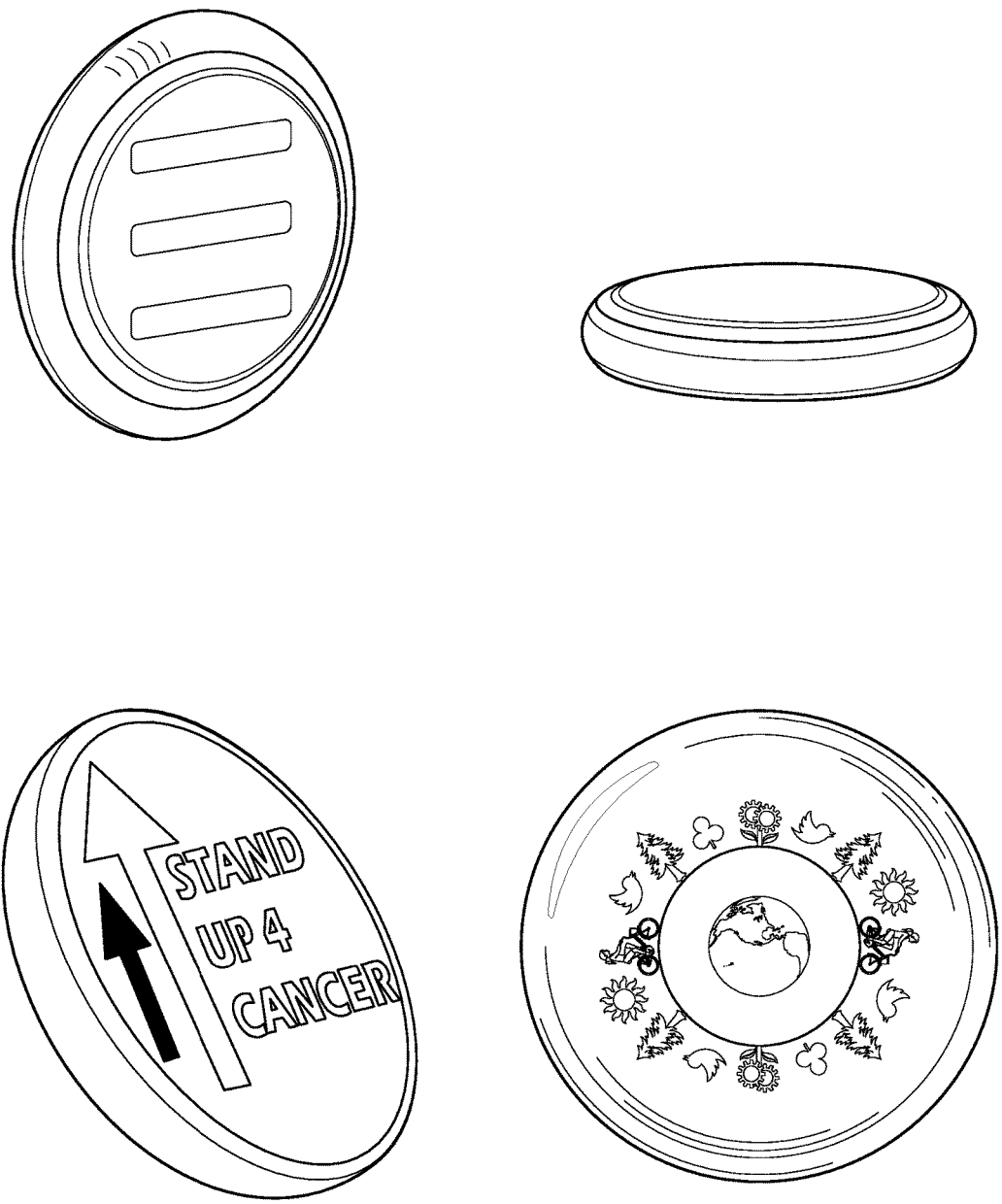
FIG. 17 shows an example of a wearable device that is a button.

The present disclosure provides various non-limiting examples of wearable devices. FIG. 17 shows examples of a wearable device of a user that is in the form of a button. A display screen of the wearable device shows expressions (e.g., three bands or "STAND UP TO CANCER" with arrows, and "Save the Planet"), including media (e.g., arrows, trees and bicycle). The expressions may be retrieved from an electronic device of the user. The expressions may be created on the electronic device or downloaded from another system or device, such as a server.

Figure 21:
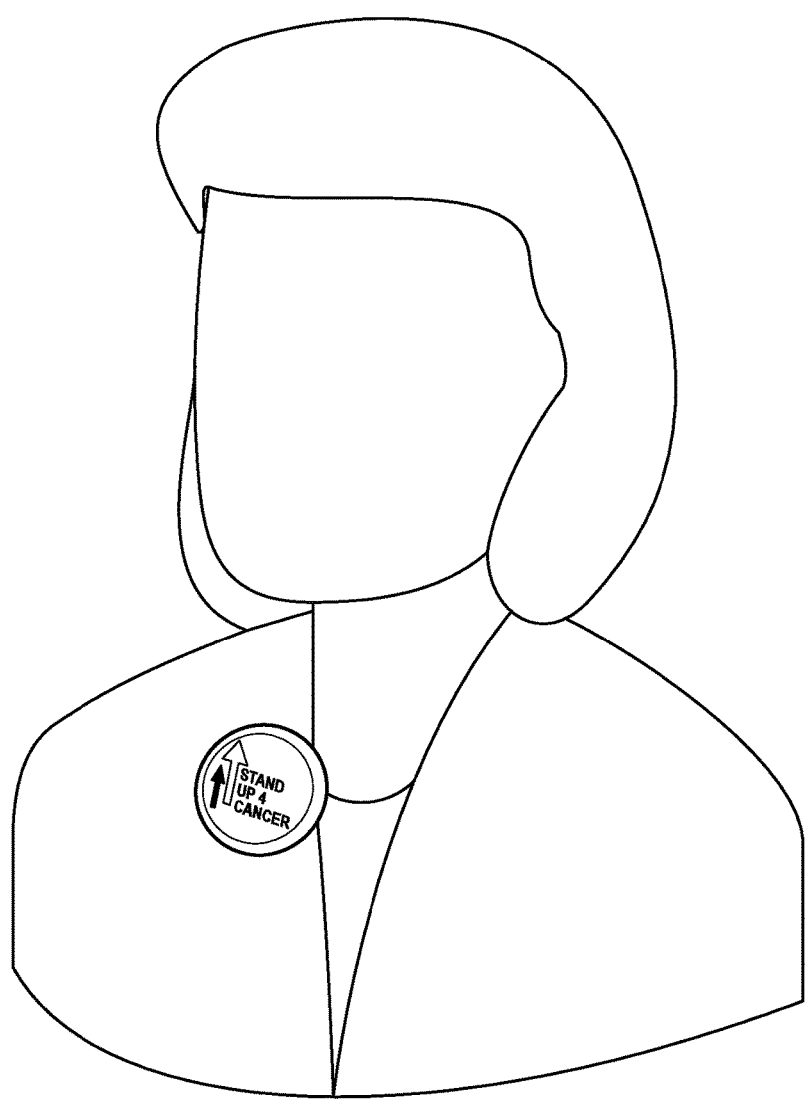
FIG. 21 shows a user wearing a wearable device on a shirt of the user.

FIG. 21 shows the user wearing the wearable device on a shirt of the user. In some embodiments, the wearable device may include a microphone and/or a speaker, such that when the wearable device is paired with a user's phone, the user may directly use the wearable device to make and/or answer phone calls. For example, when there is an incoming call received on the phone, one or more indicators on the wearable device may blink or show a certain color to notify the user of the incoming call. Alternatively or additionally, the wearable device may vibrate or make certain sound through the speaker for notifying the user. The user may hit a button on the wearable device to accept the call and talk to the caller via the microphone on the wearable device. As another example, when the user wants to make a phone call, the user may directly press a button on the wearable device to initiate a phone call. This mode may be included in a default setting. Alternatively or additionally, this may require pre-setting from the user, for example, to define which button or how to press the button(s) on the wearable device to initiate a phone call, and/or how to select contact from the user's phone. The microphone and/or the speaker on the wearable device may also be used for sending voice command from the wearable device to the user's phone, for performing various activities, such as searching, making calendar events, etc. This may provide convenience to the user because the user can directly interact with the wearable device without having to reach to the phone every time.

Figure 18:
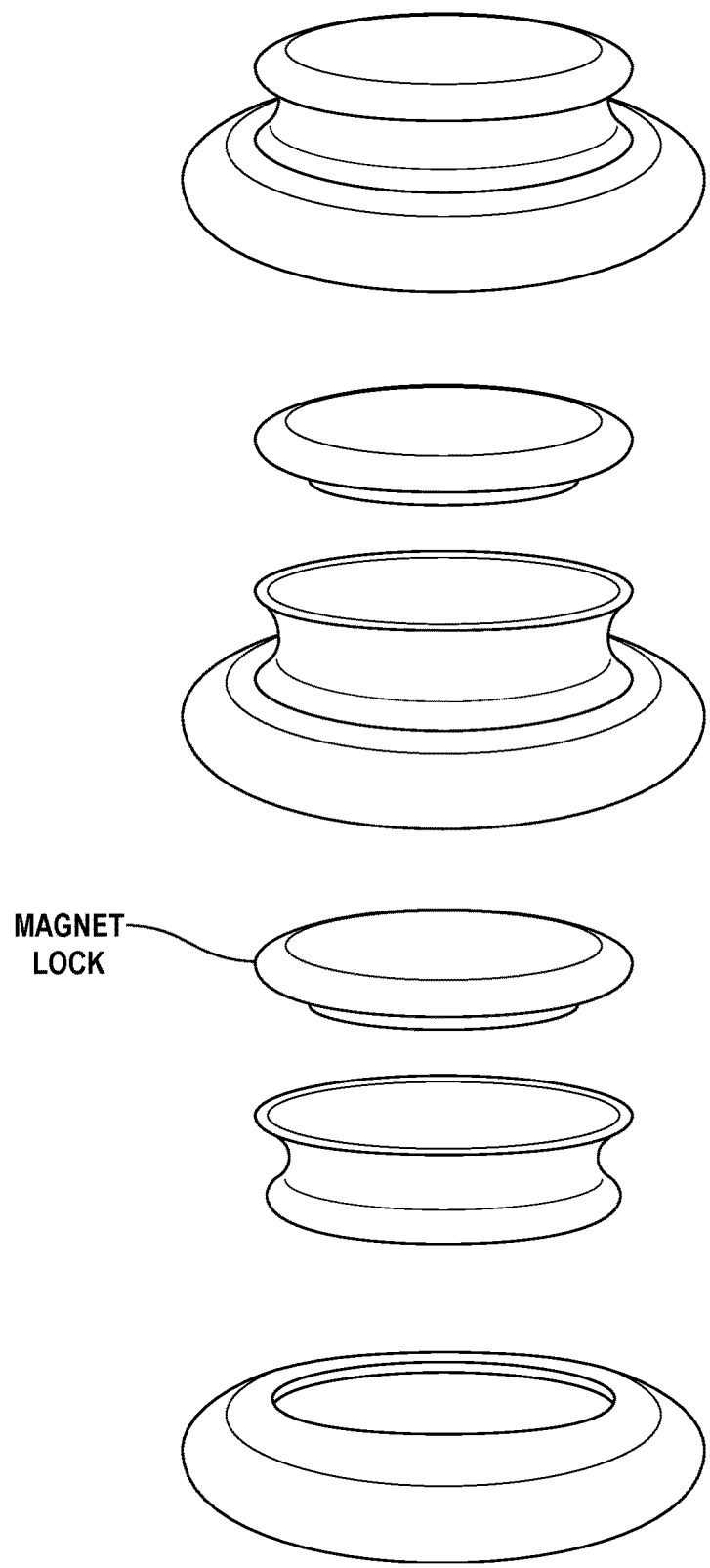
FIG. 18 shows an example of a wearable device with a magnetic attachment.

FIG. 18 shows a wearable device with a magnetic attachment, including a magnetic lock. The magnetic attachment can permit the wearable device to be secured against an article of clothing of the user.

Figure 19:
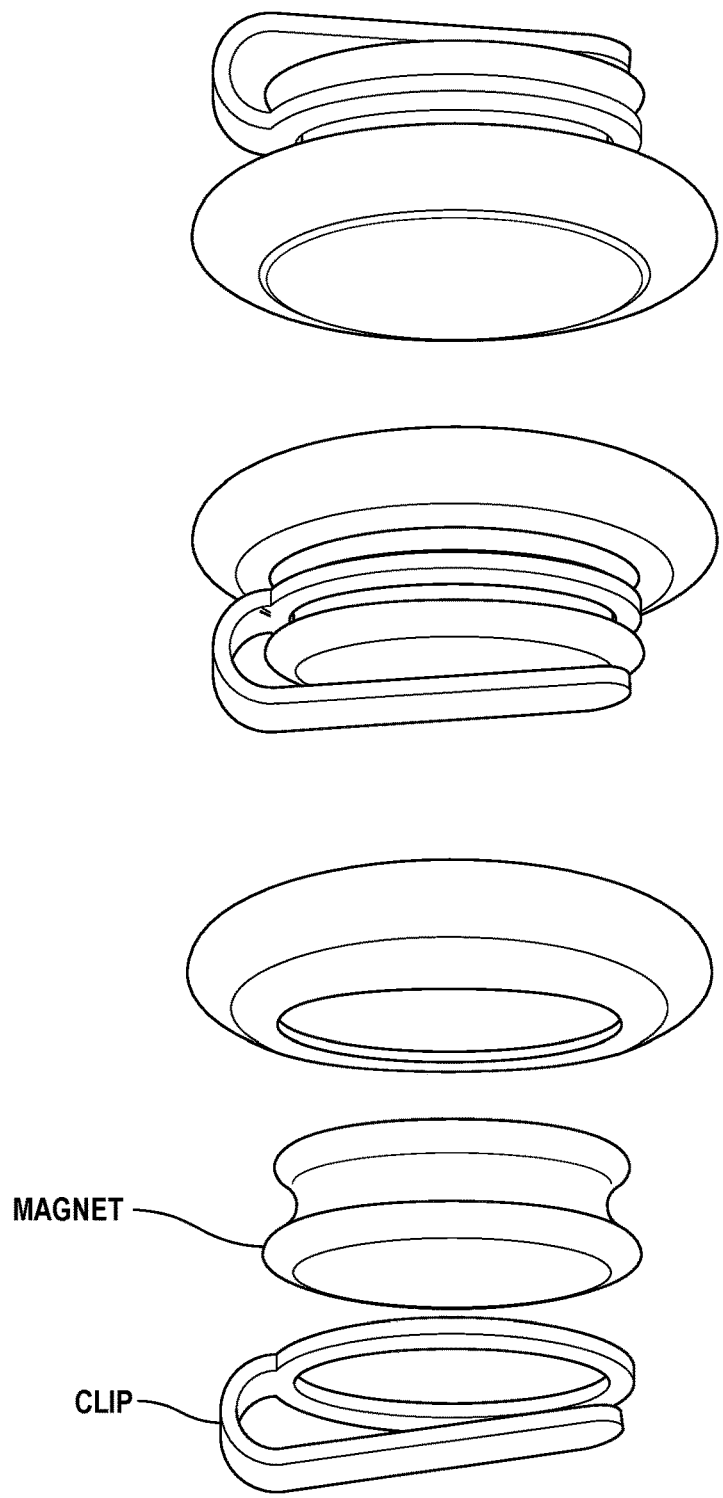
FIG. 19 shows an example of a wearable device with a clip.

FIG. 19 shows a wearable device with a clip. The clip can permit the wearable device to be secured against an article of clothing of the user, or another object (e.g., bag).

Figure 20:
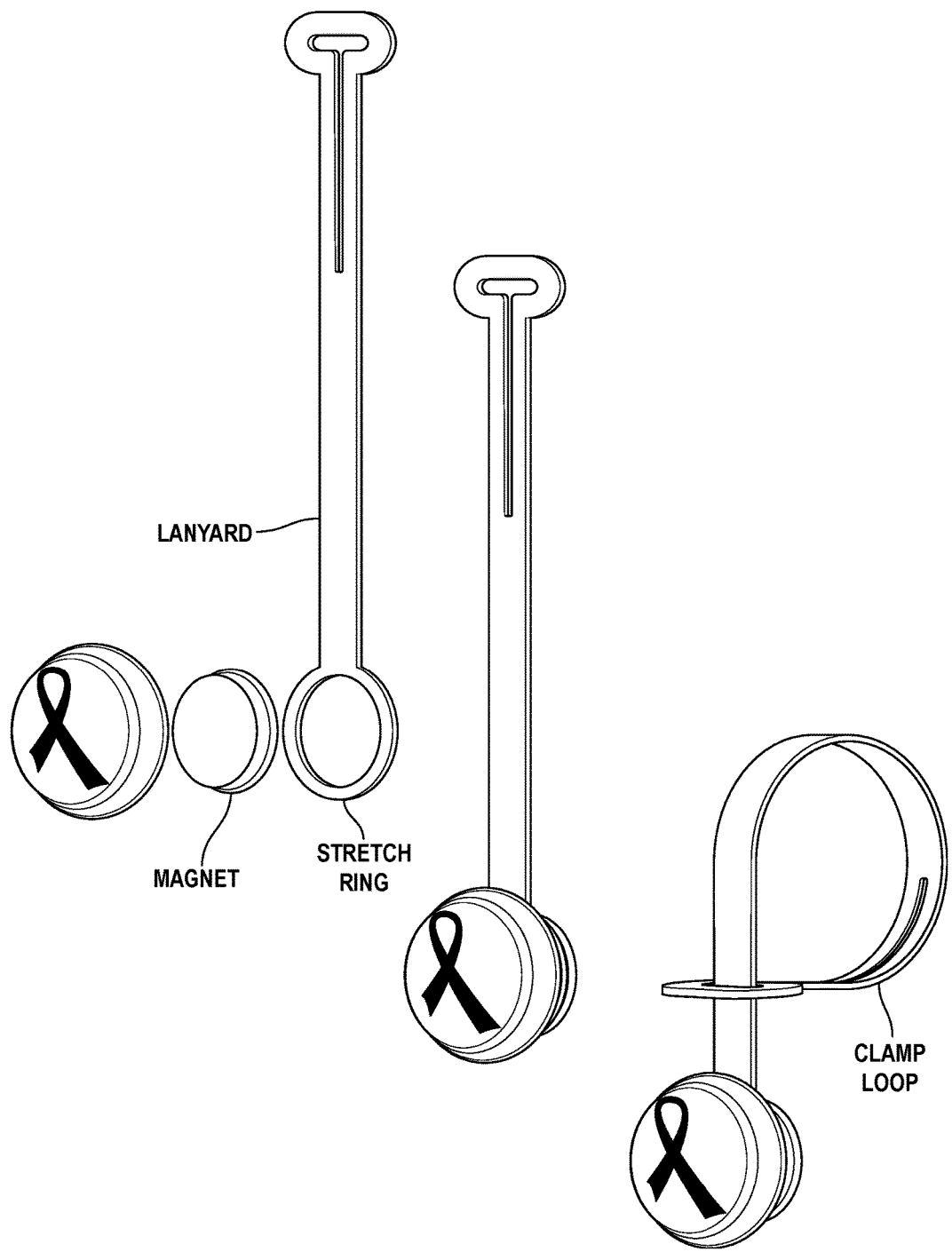
FIG. 20 shows an example of a wearable device with a lanyard.

FIG. 20 shows a wearable device with a lanyard. The lanyard can permit the wearable device to be secured against the user or another object (e.g., bag).

Figure 23A:
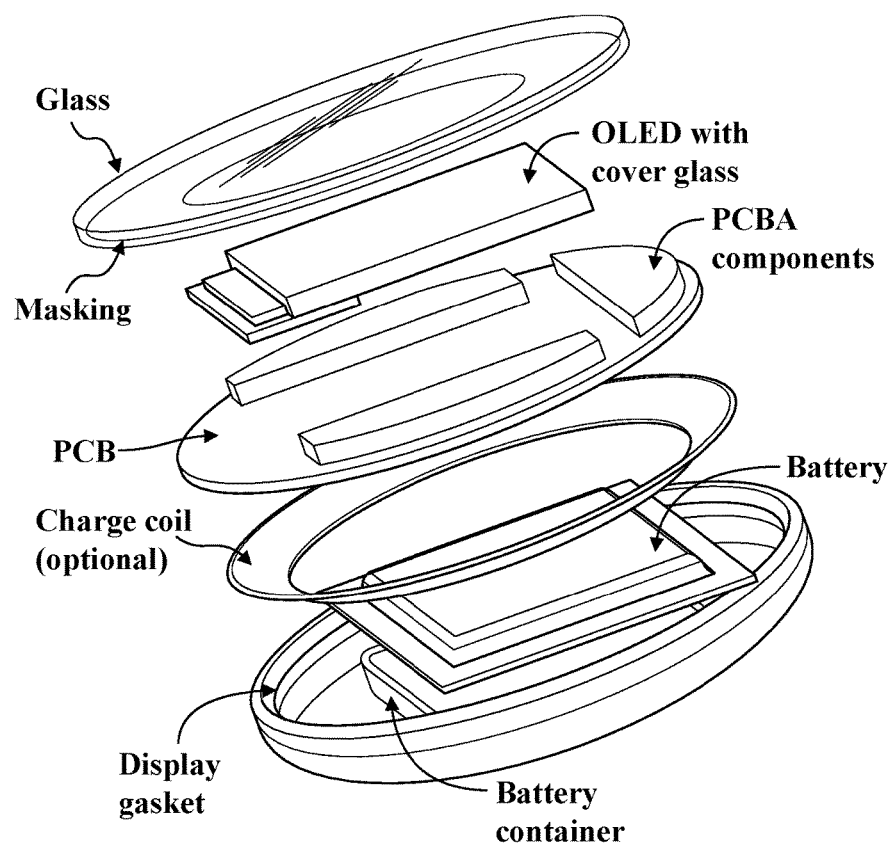
FIGS. 23A and 23B show exploded views of another example of a wearable device.
Figure 23B:
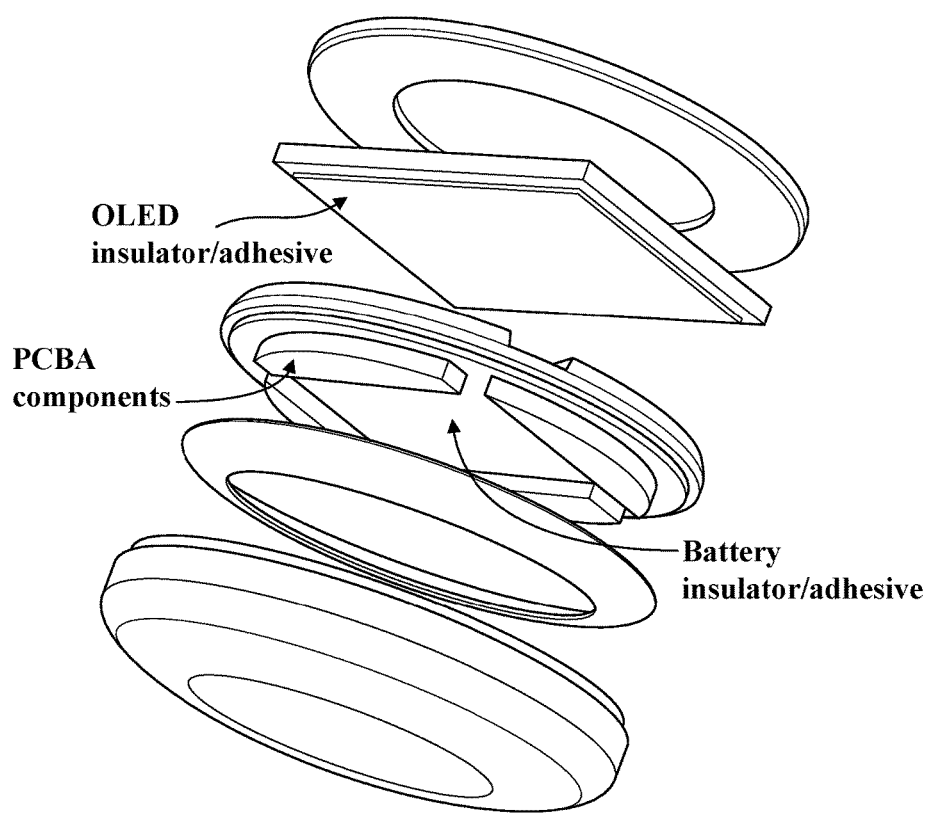

FIGS. 23A and 23B show exploded views of another example of a wearable device. The wearable device includes a light emitting diode (LED) display, which can be an OLED. The wearable device can include a charge coil for inductive charging.

Figure 24A:
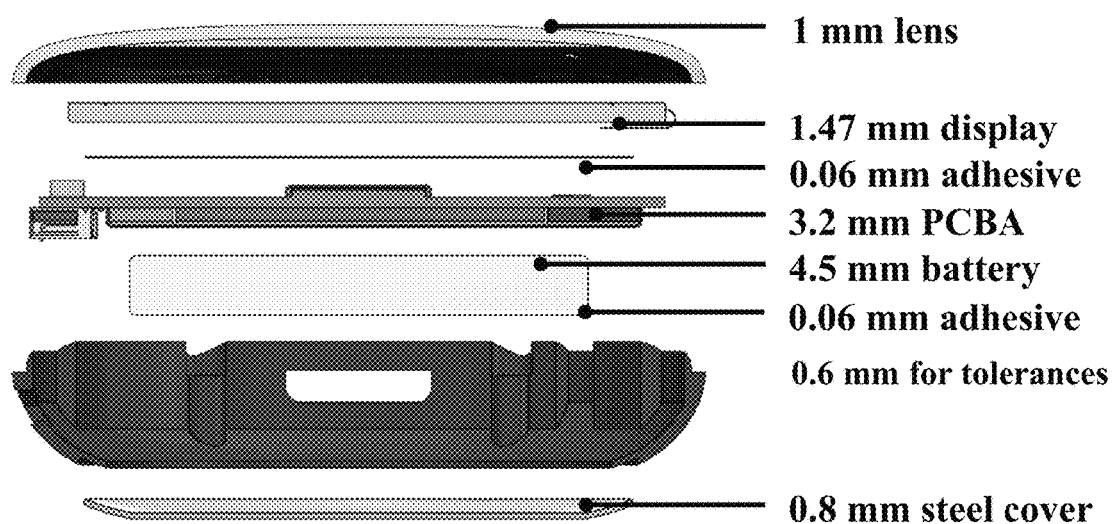
FIGS. 24A and 24B show exploded side and cross-section views, respectively, of another example of a wearable device.
Figure 24B:
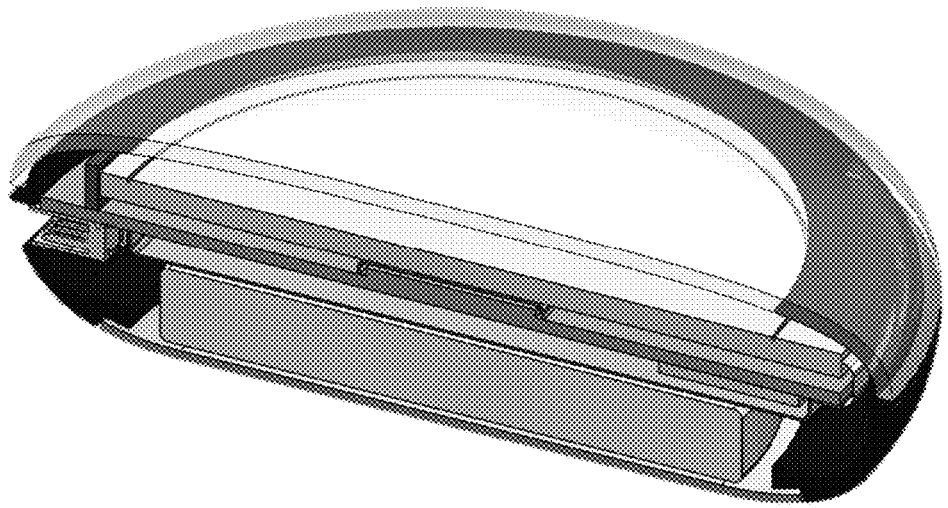

FIGS. 24A and 24B show exploded side and cross-section views, respectively, of another example of a wearable device. The wearable device includes a 1 millimeter (mm) lens adjacent to a 1.47 mm display.

Figure 25A:
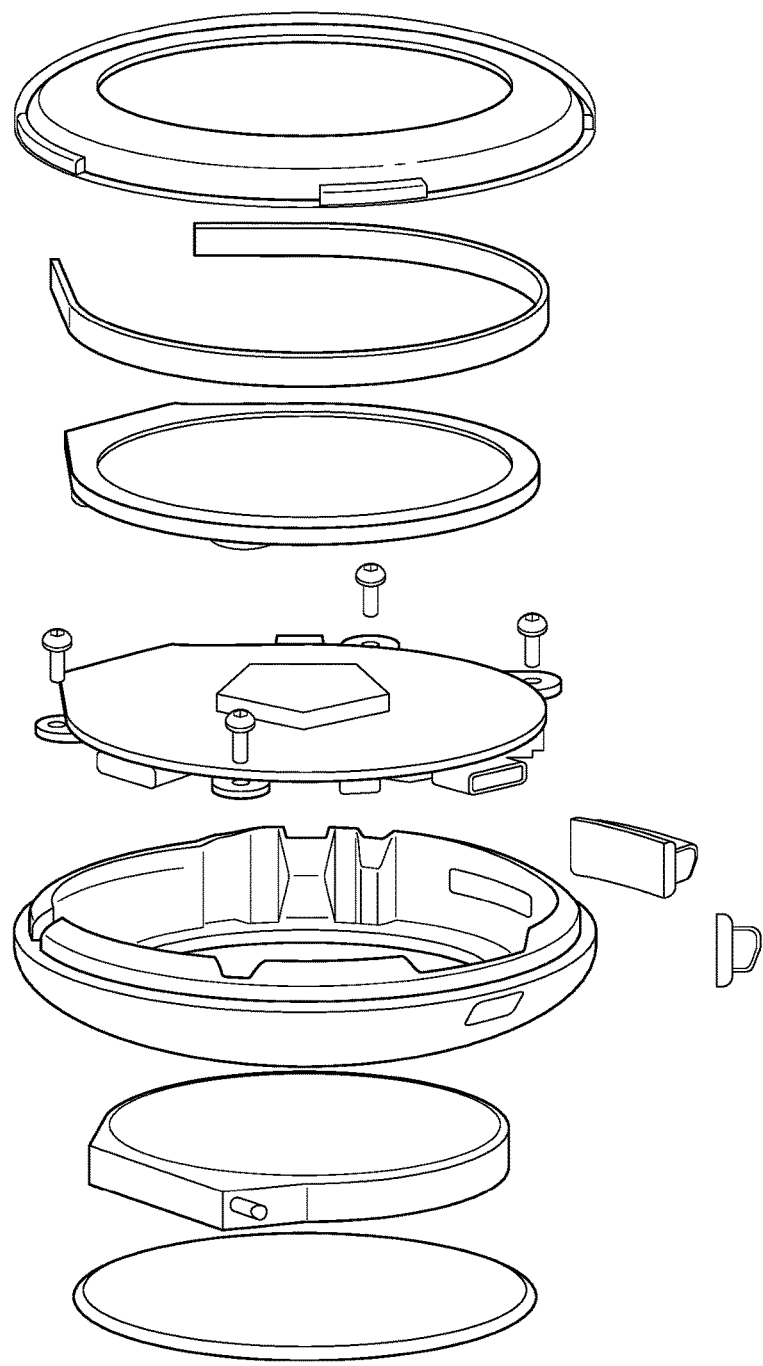
FIGS. 25A and 25B show schematics of another example of a wearable device.
Figure 25B:
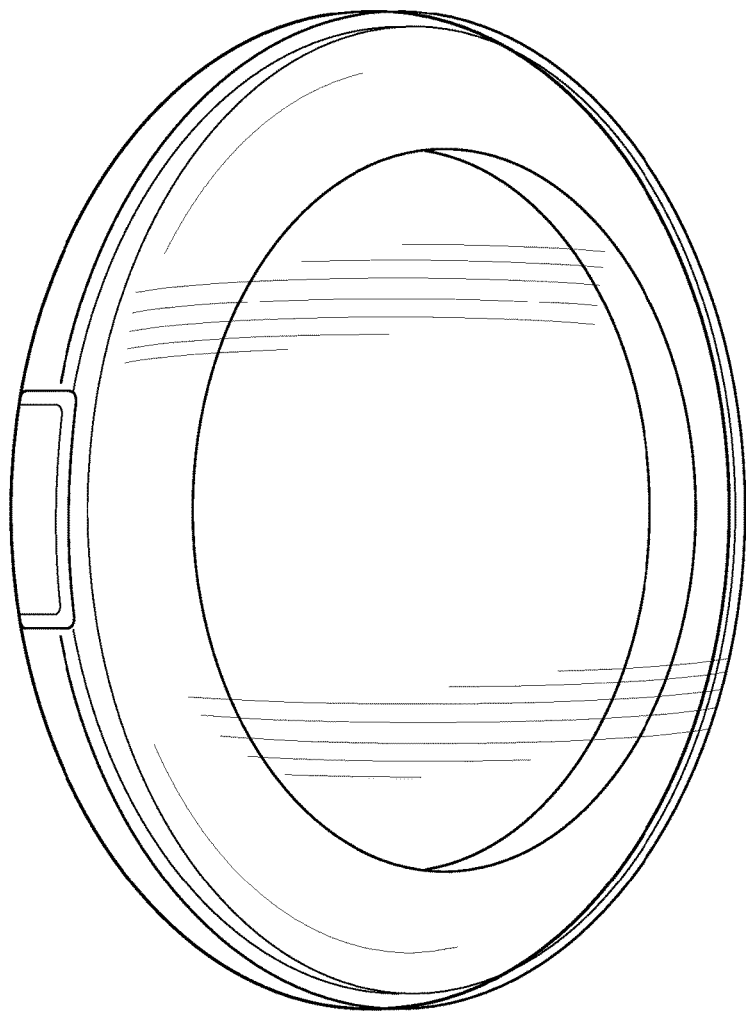

FIGS. 25A and 25B show another example of a wearable device. FIG. 25A is an exploded side view of the wearable device. FIG. 25B is an angled view of the wearable device. The wearable device is in the form of a round button, though other shapes may be used.

EXAMPLE 3

Figure 26:
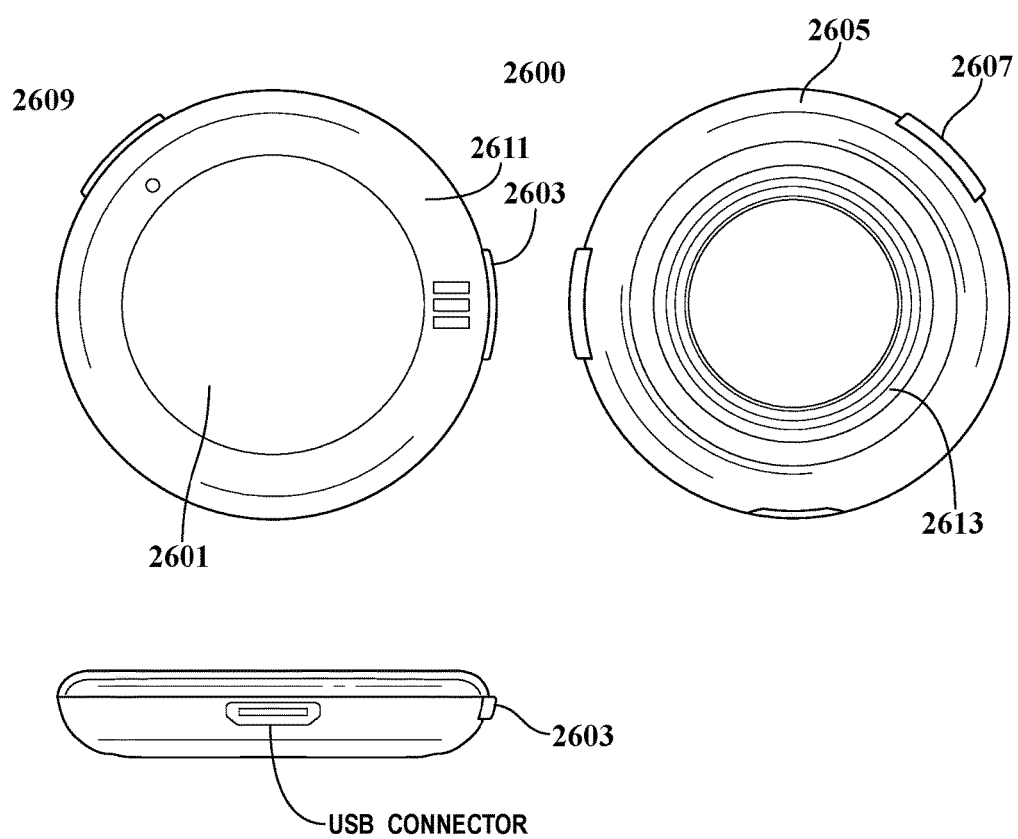
FIG. 26 shows schematics of another example of a wearable device.

FIG. 26 shows a display device 2600 that is configured to display media selected by a user. The display device includes a circular display 2601, printed circuit board assembly (PCBA), battery, a back housing (or carrier) and steel cover. The circular display 2601 may be continuously circular and substantial planar. The display device has a thickness of about 10 millimeter or less. The display device may be in the form of a button and the overall thickness of the button may be less than 5 mm, 10 mm, 15 mm, 20 mm, and so forth. The button may have a diameter no more than 30 mm, 40 mm, 50 mm, 60 mm, 70 mm, 80 mm, 90 mm, 100 mm, and the so forth. The display device may include a light emitting diode (LED) display. The display can be an OLED and/or flexible OLED that defines an effective area for displaying images. The effective area may be the same area of a front side of the button such that the effective area may have the same diameter as the button. In some cases, the effective area for displaying images may be surrounded by an encircling region where one or more components may be located (e.g., logos, IR sensor 2609 or speaker 2611). As illustrated in the figure, the button has a substantially planar surface. Alternatively, the surface may have a curved profile.

The display device includes one or more function buttons 2603, 2607. The one or more function buttons may be located on a side of the display device. The one or more function buttons may include a power button. For example, a user may push the power button 2607 to turn on/off the device, activate the display screen or put the device to a sleep mode. The one or more function buttons can have various other functions. For example, the user may hit a button 2603 on the display device to accept a call and talk to the caller via the microphone on the display device. As another example, when the user wants to make a phone call, the user may directly press a button on the wearable device to initiate a phone call. This mode may be included in a default setting. Alternatively or additionally, this may require pre-setting from the user, for example, to define which button or how to press the button(s) on the display device to initiate a phone call, and/or how to select contact from the user's phone. The microphone and/or the speaker on the wearable device may also be used for sending voice command from the display device to the user's phone, for performing various activities, such as searching, making calendar events, etc. This may provide convenience to the user because the user can directly interact with the display device without having to reach to the phone every time.

The display device 2600 may include communication component for receiving data or signals remotely. The communication may be wireless communication. In the depicted example, the display device can include an infrared port or infrared receiver that may enable the display device to be controlled or receive content remotely via wireless infrared communications. For example, in a social event, entertainment event (e.g., theater or concert) or sporting event, one or more display devices may be controlled to display images in response to infrared control signals. The display device can include an input controller coupled with the infrared port or infrared receiver, which may enable the display device to communicate with one or more infrared emitters, in some cases to display one or more media on the display device concurrently. In some examples, a plurality of display devices can receive content or be controller concurrently, such as, for example, in a social event, entertainment event (e.g., theater or concert) or sporting event. This may be implemented using an infrared receiver on each of the display devices and one or more remote infrared emitters. In another instance, the plurality of display devices may be coordinated to display images or other media in response to wireless control signals such that the media displayed by the plurality of display devices may altogether form a pattern. The images or other media displayed on the plurality of display devices may or may not be the same across different display devices, the images may or may not be displayed concurrently across the different display devices. In some cases, the plurality of display devices are controlled to display images in response to a set of control signals generated from a central coordinator such as a central controller in a stadium or a concert. The plurality of display devices may be coordinated to display images without communication with each other. Alternatively, the plurality of display devices may be internal communications with each other. In some cases, the plurality of display devices may form a mesh network such that media and data may hop from one device to another across a large space.

The display device may also comprise one or more sensors for saving a battery power. In the depicted example, the display device may include an ambient light sensor 2609. The ambient light sensor is used to automatically adjust the display screen (e.g., LCD) brightness via backlighting controls so as to save battery energy. In some cases, when the display screen is OLED, no backlight is required such that the ambient light sensor may not be necessary. The one or more sensors may also include one or more motion sensors for detecting a motion of the display device. In some cases, brightness of the display screen may be adjusted based on the detected motion. For instance, when the display device is detected to be stationary for a threshold of time, the brightness of the display screen may be lowed to save battery power. In some cases, the brightness of a power saving mode may be set up by a user. Various motion sensors may be included for motion detection such as gyroscope, accelerometer, and the like. The display device may also comprise various other components such as an antenna and USB port as described elsewhere herein. The USB port can be used to charge the battery of the display device or used for data transmission.

The display device is capable to control an orientation of the media displayed on the screen with respect to a ground reference frame. Media may be displayed with an orientation regardless of the orientation of the display device. For example, the media may be always displayed along a direction that is parallel to the gravitational acceleration vector no matter how the display device rotates. In some cases, an accelerometer may be used to measure an attitude angle of the display device with respect to the ground/gravitational acceleration vector. The media may be rotated relative to the display device such that the orientation of the media can be controlled with respect to the ground surface or gravitational acceleration vector. The rotational adjustment of the media can be at any step size, such as from 1 degree to 90 degree. In some cases, the step size can be set by a user via an application provided on a mobile device coupled to the display device or via function buttons on the display device.

As illustrated in the figure, the display device comprises a bottom cover 2605. The bottom cover can be made of any suitable materials. In some cases, the bottom cover is made of metal such as steel. This may be advantageous for coupling the button/display device to a magnetic attachment. In some cases, the bottom cover may be formed with one or more concentric grooves 2613 or other concentric structures. The grooves may be beneficial to ensure an alignment between the display device and the magnetic attachment.

Figure 27:
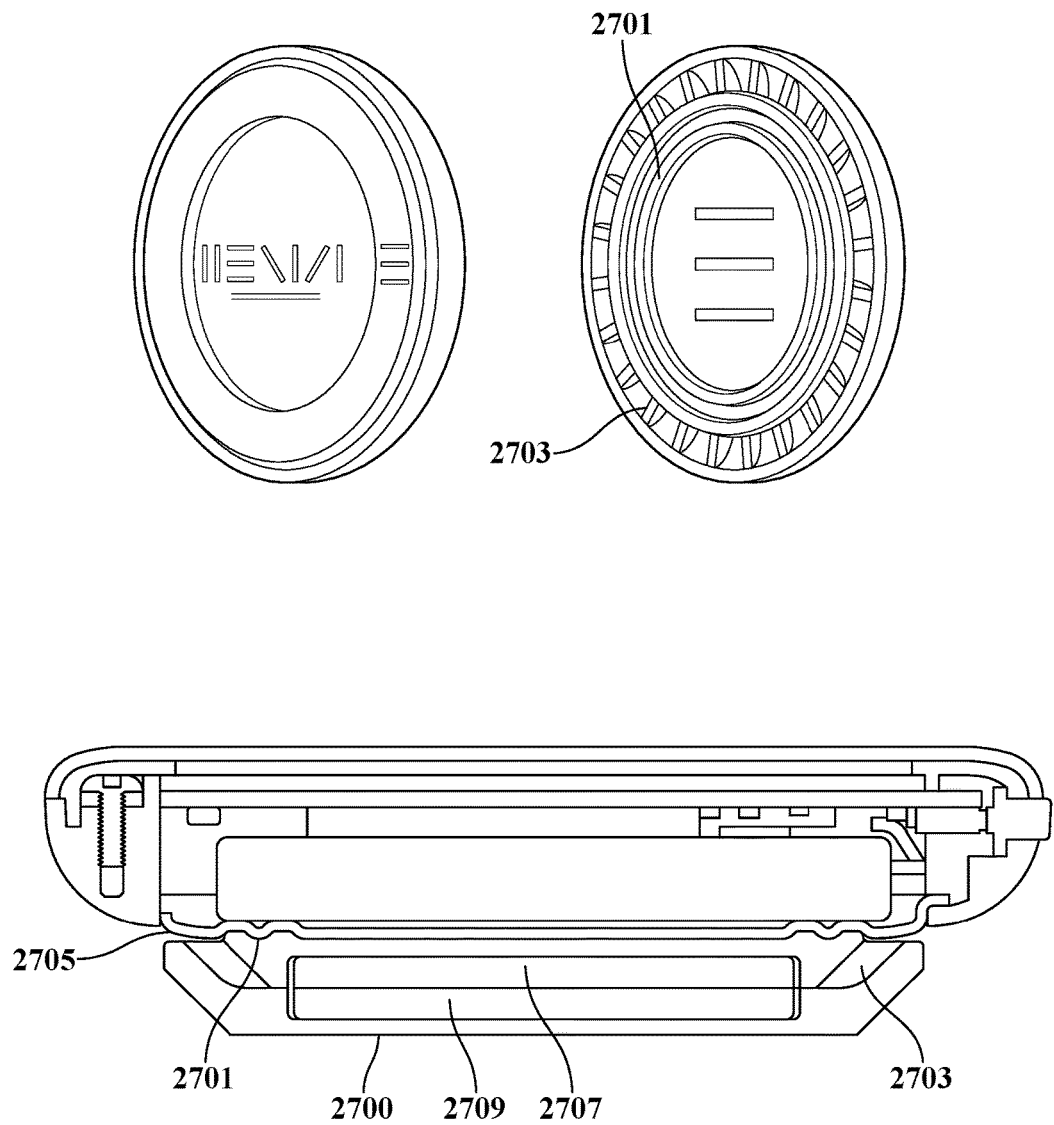
FIG. 27 shows an example of a wearable device with magnetic attachment.

FIG. 27 illustrates an example of the display device coupled to a magnetic attachment 2700. The display device can be the same device as described in FIG. 26. The magnetic attachment may have a top surface formed with grooves or ridges 2701 to mate with the grooves structure of the bottom cover 2705 of the display device. The concentric grooves 2701 are the side view of the same grooves as shown in FIG. 26. The concentric circular shaped grooves may be useful to ensure alignment when the display device is secured to the magnetic attachment. The concentric grooves may prevent the display device sliding off from the magnetic attachment. The grooves may hold the display device in place such that it does not have lateral movement relative to the magnetic attachment. The display device is allowed to rotate relative to the magnetic attachment. When the display device is rotated, the media displayed on the display screen may or may not rotate with respect to a ground reference frame.

The magnetic attachment includes a first magnetic assembly comprising a magnet 2707 and second magnetic assembly comprising a magnet 2709 The first magnet 2707 and second magnet 2709 have opposite polarities, which can enable the display device to be secured against an object, such as a fabric. In some cases, the magnetic attachment includes structures such as raised grooves 2703 to increase the attachment to the object it is secured against, such as a fabric. It should be noted that the magnetic attachment can be a separate element to the display device. Alternatively, the magnetic attachment can be integral to the display device. For instance, the first magnetic assembly may be formed with the bottom cover of the display device.

Figure 28A:
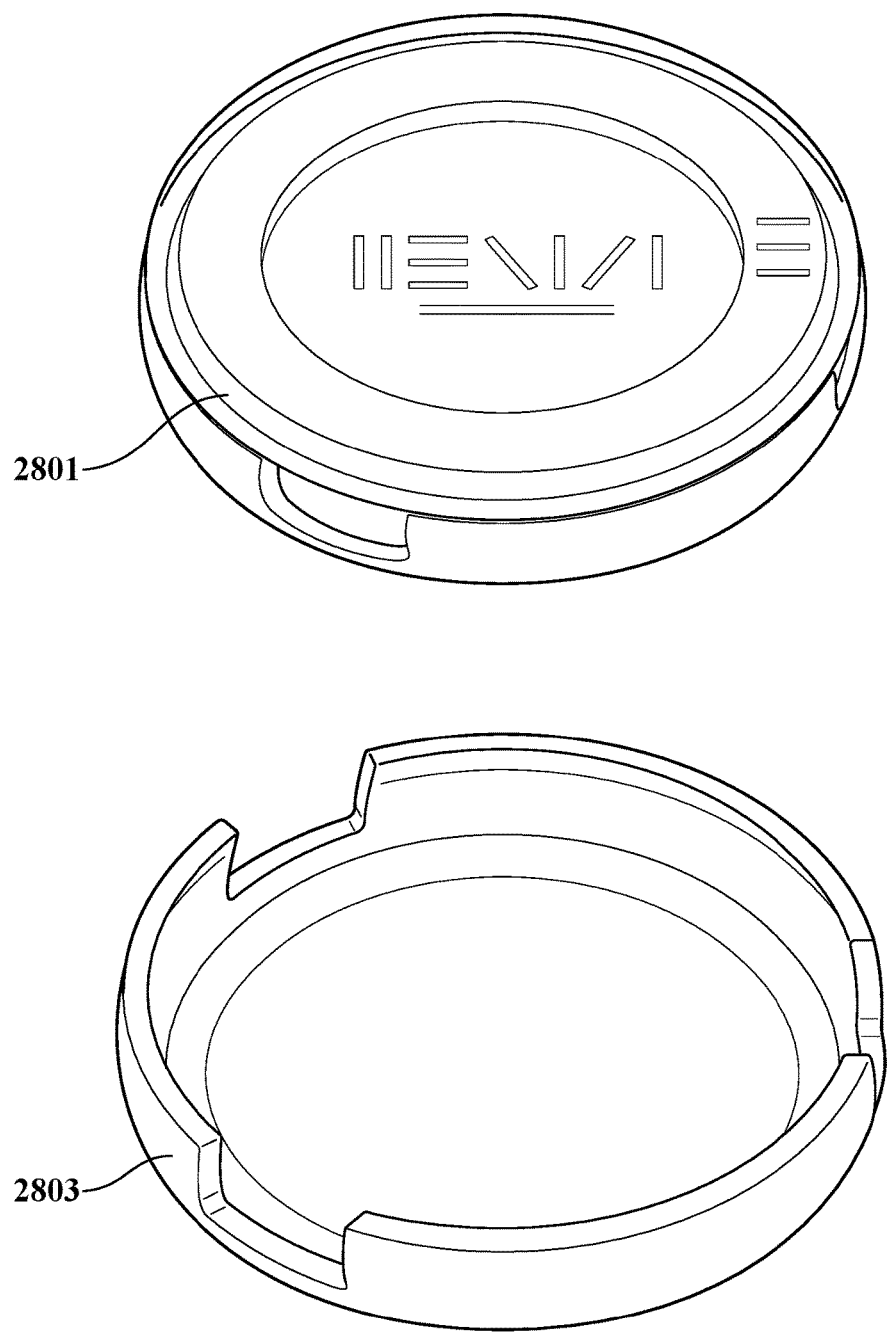
FIGS. 28A and 28B show examples of a wearable device with various other attachments.
Figure 28B:
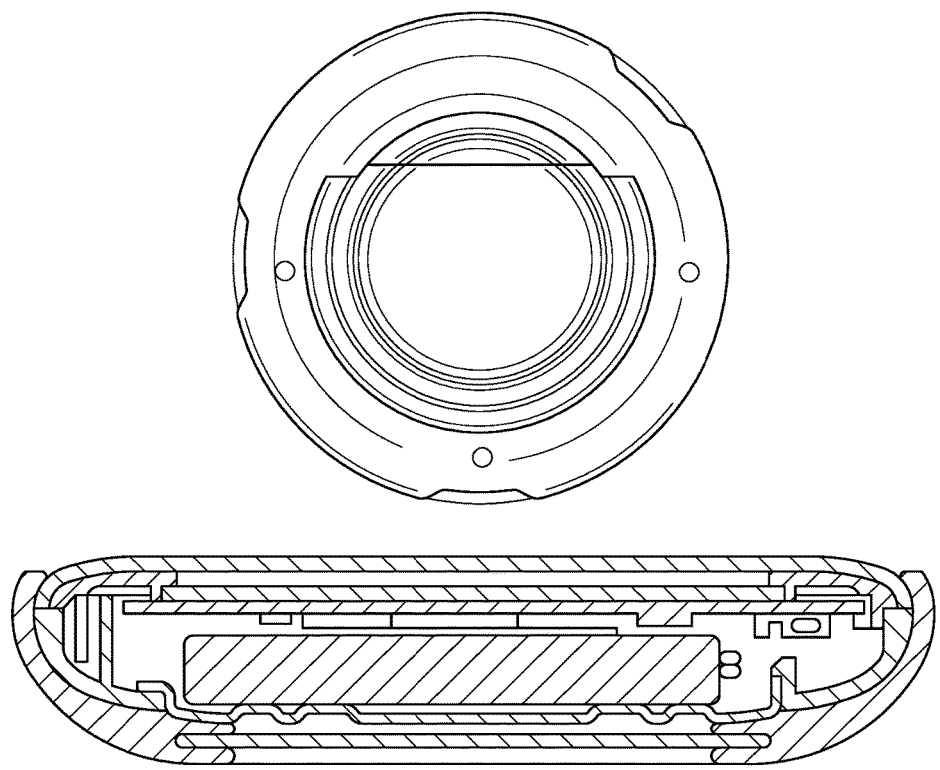
Figure 28C:
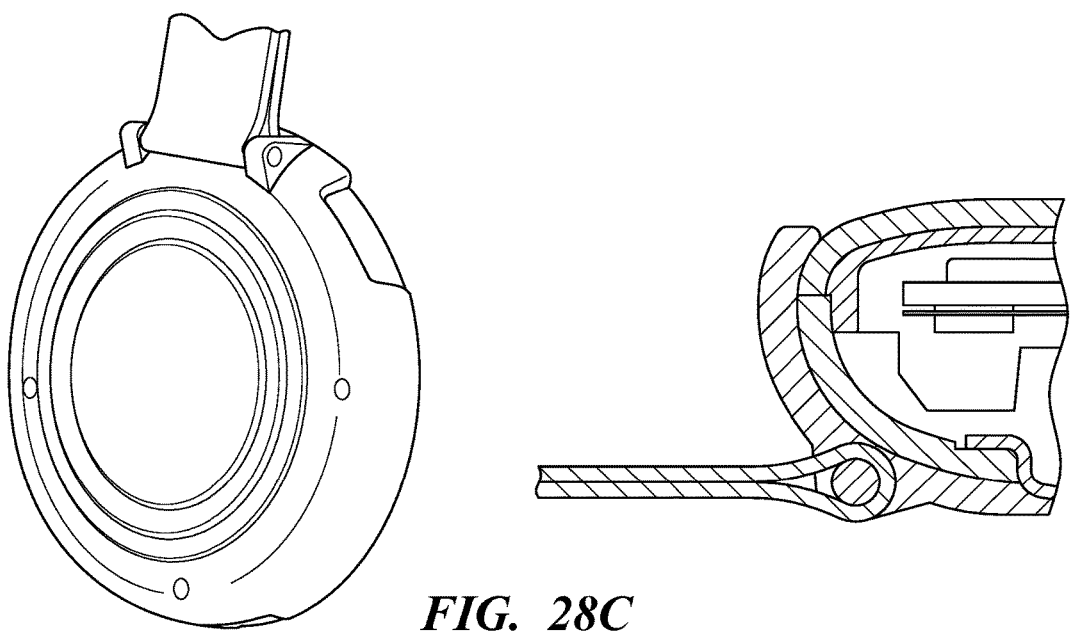
FIG. 28C shows another example of a wearable device with an attachment.
Figure 29:
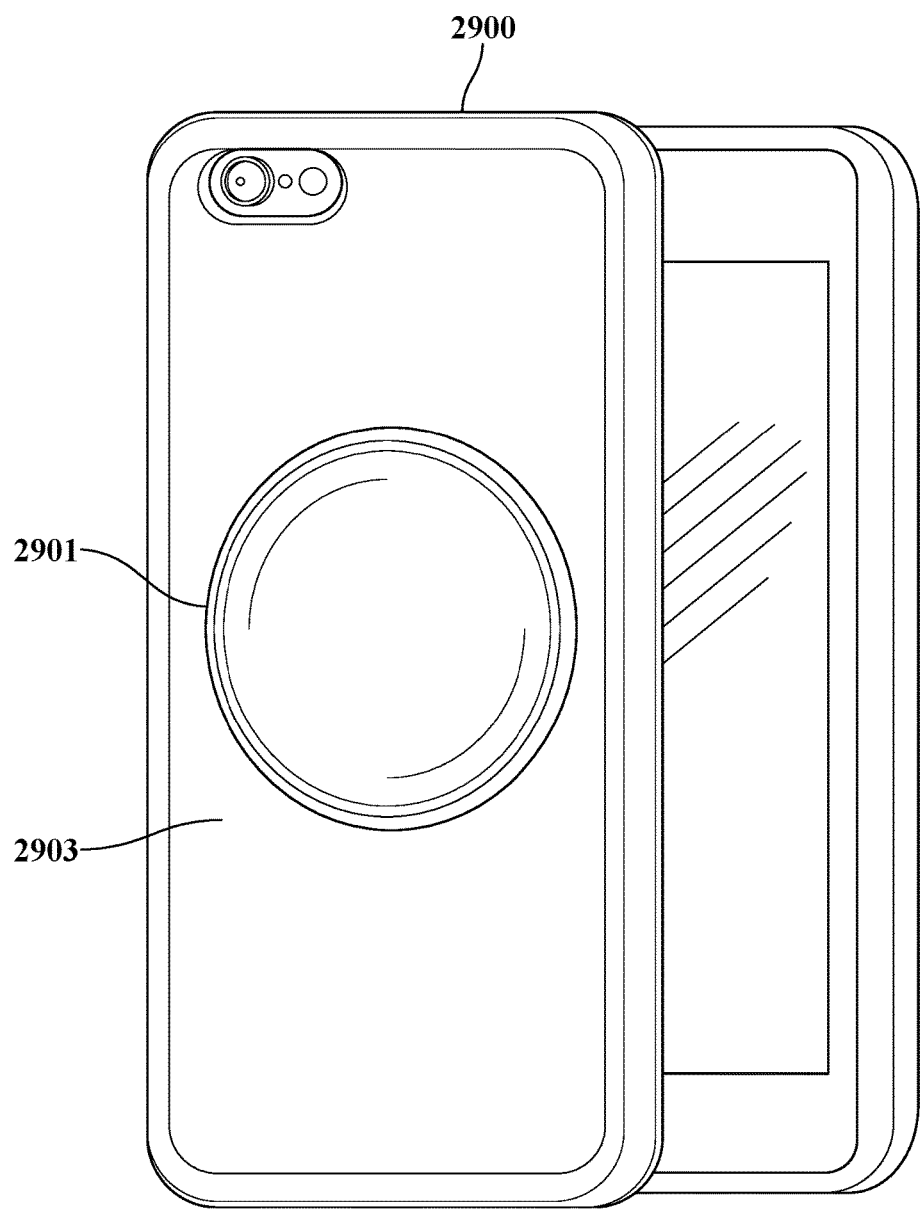
FIG. 29 shows a mobile device case for holding a display device.

FIGS. 28A-28C illustrates various other exemplary attachments components for the display. In some embodiments, an additional cover 2803 may be provided for integrating other attachment components to the display device/button 2801. The cover 2803 may be formed of a metallic or metal-containing, composite or polymeric material, such as plastic. The cover may be formed with a shape and dimensional to mate with an outer shape of the button. The cover may have a thickness less than 0.5 millimeters (mm), 1 mm, 2 mm, 3 mm, 5 mm or 10 mm. With respect to FIG. 28B and FIG. 28C, attachments such as pin and lanyard can be integrated to the cover therefore used to attach or couple the display device to an object.

EXAMPLE 4

FIGS. 29 and 30A-F show a mobile device case 2900 comprising a display device 2901. The mobile device case can be mounted on various objects, such as a mobile phone (e.g., Smart phone), laptop, tablet and the like. The display device can be mountable on a mobile device. The mobile device case may have geometries and dimensions allowing it to wrap around a mobile device similar to that of a regular mobile device protective case. In some cases, the display device is in communication with the mobile device. For instance, a user may be allowed to input location preference or schedule for displaying media on the display device through the mobile device. The mobile device can be the same mobile device as described elsewhere herein. In some embodiments, the mobile device is in electrical communication with a battery provided on the mobile device case. In some cases, the mobile device may be charged by a battery provided on the mobile device case. The mobile device may be connected to the battery via suitable connection unit, such as a wire, cable, ribbon, or contact charging component.

The display device 2901 may include the same components as described elsewhere herein. For instance, the display device may include a circular display, printed circuit board assembly (PCBA), battery, a back housing (or carrier) and steel cover. The display device may have a thickness of about 10 millimeter or less. The display device may be in the form of a button and the overall thickness of the button may be less than 5 mm, 10 mm, 15 mm, 20 mm, and so forth. The button may have a diameter no more than 30 mm, 40 mm, 50 mm, 60 mm, 70 mm, 80 mm, 90 mm, 100 mm, and the so forth. The display device may include a light emitting diode (LED) display. The display can be an OLED and/or flexible OLED that defines an effective area for displaying images. The effective area may be the same area of a front side of the button such that the effective area may have the same diameter as the button. In some cases, the effective area for displaying images may be surrounded by an encircling region where one or more components may be located (e.g., logos, IR sensor or speaker). The button may have a substantially planar surface. Alternatively, the surface may have a curved profile. The button may not comprise function buttons located along the peripheral of the display device.

The display device is capable to control an orientation of the media displayed on the screen with respect to a ground reference frame. Media may be displayed with an orientation regardless of the orientation of the display device. For example, the media may be always displayed along a direction that is parallel to the gravitational acceleration vector no matter how the display device rotates. In some cases, an accelerometer may be used to measure an attitude angle of the display device with respect to the ground/gravitational acceleration vector. The media may be rotated relative to the display device such that the orientation of the media can be controlled with respect to the ground surface or gravitational acceleration vector. The rotational adjustment of the media can be at any step size, such as from 1 degree to 90 degree. Alternatively, the orientation of the media may be controlled to be aligned with the orientation of the mobile device. For instance, the display device may be in communication with the mobile device to obtain the orientation of the mobile device such that the media may be displayed in alignment with the mobile device orientation. In some cases, when the display device is coupled to the mobile device, the orientation of the media is calibrated against the orientation of the mobile device. In other cases, the orientation of the media displayed on the display device is regardless of the orientation of the mobile device.

The display device 2901 may or may not be coupled to the mobile device. The display device may be operably coupled to the mobile device. In some cases, the display device 2901 communicates with the mobile device. For example, the display devices may be controlled to display media such as images, texts and visual contents where the media are transmitted from the mobile device to the display device. The media may be displayed according to a schedule set up by a user through the mobile device. In another example, one or more functions such as power on/off, switch mode, and the like of the display device can be controlled by a user via an application provided on the mobile device. The one or more functions may be performed by a user via a touch-sensitive screen of the display device. Alternatively or additionally, the one or more functions may be performed via control mechanisms provided on the mobile device case such as buttons, dials, sliders or switches on the mobile device case 2900. For instance, the mobile device case may comprise one or more buttons such as a power button that a user may push the power button to turn on/off the display device, activate the display screen or put the device to a sleep mode.

The mobile device case 2900 comprises a shell 2903 that may fit to the dimension and shape of the mobile device. The shell 2903 can be formed of any suitable material, such as a polymeric material, one or more metals (e.g., aluminum) or a composite material. In an example, the shell 2903 is formed of rubber, an elastic material, polymer, or metal. The material of the shell 2903 may be flexible, rigid, or semi-rigid. In some cases, the mobile device case 2900 may comprise a battery such that the display device 2901 is in electrical communication with the shell 2903. The battery may provide power source to the display device. The battery can be any type, such as a solid state or polymer battery (e.g., lithium or lithium polymer battery). In some embodiments, the battery can be rechargeable. The battery can be connected to a power source through a port with a micro-USB cable, USB cable, or any type of power cable or connection, such that the battery charges when connected to a power source or outlet. Alternatively or additionally, the shell may comprise one or more circuits to enable wireless charging of the battery. In some embodiments, the shell may comprise a receiver circuit connected to a receiver coil, and the battery for providing power to the display device.

The display device may be connected to the battery via suitable connection means such as wires, cables, contact charging components and the like. The battery and/or the connection means may be located within the walls of the shell, located to an inner surface of the shell, or at any other location. Alternatively or additionally, the display device may be wirelessly charged by a power source provided within the shell or an external power source. The wireless charging circuits and mechanism can be the same mechanism as described in FIG. 12B.

Figure 30A:
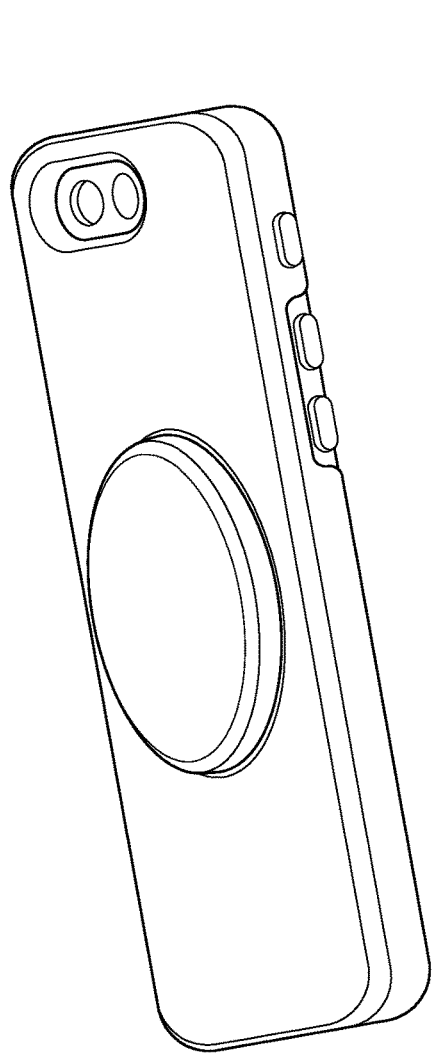
FIG. 30A schematically illustrates a mobile device case for holding a display device.
Figure 30B:
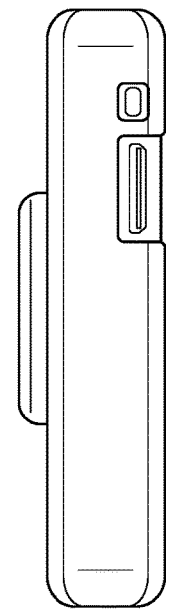
FIG. 30B schematically illustrates another view of the mobile device case.
Figure 30C:
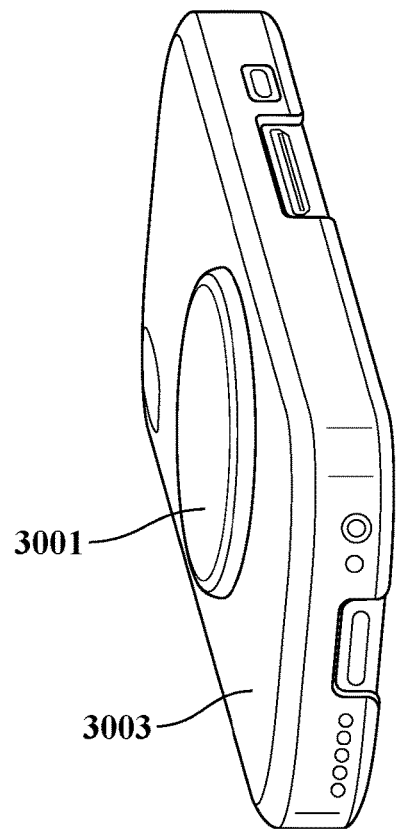
FIG. 30C schematically illustrates another view of the mobile device case.
Figure 30:
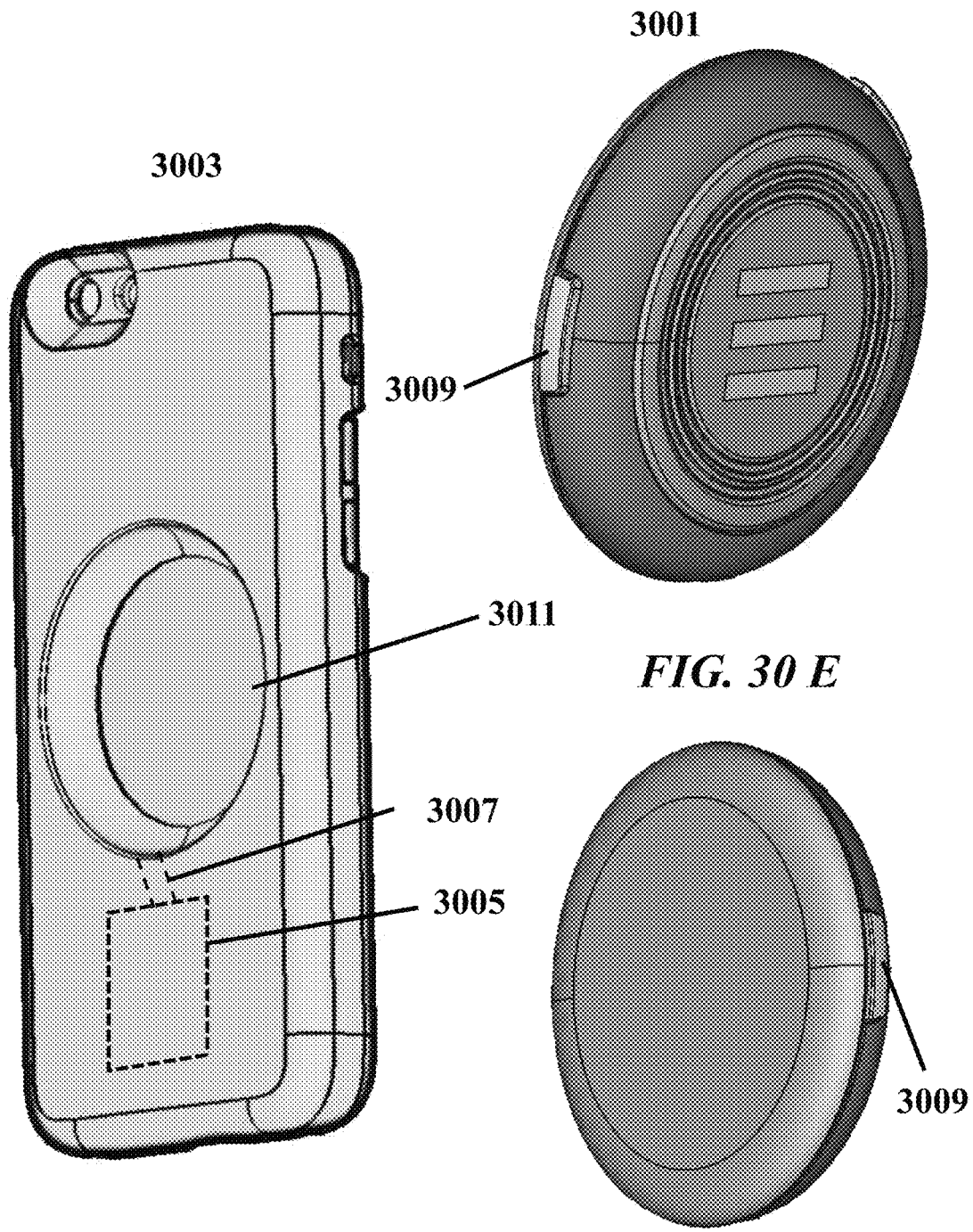
FIG. 30D schematically illustrates a mobile device case.
FIG. 30E schematically illustrates a display device that can be coupled to a mobile device case.
FIG. 30F schematically illustrates another view of the display device.

Referring to FIGS. 30A-30C, the display device 3001 may be removable from the shell 3003. The display device 3001 may be releasably coupled to the mobile device case. In some cases, the display device can be removed from a mobile device case and attached to a different mobile device case. In some cases, the display device can be removed from the mobile device case and mounted to another object via suitable supporting member as described elsewhere herein. Alternatively, the display device 3001 may be non-removable from the shell. The display device may be located at a center of the shell, or any other location of the shell. The display device may or may not have a thickness greater than the shell. The surface of the display device may or may not be in alignment with a surface of the shell. In some cases, the display device may be aligned with a surface of the shell such that a smooth surface is formed. In other cases, the display device and the shell may form a step surface.

FIG. 30D shows a mobile device case for holding a display device. The mobile device case can be same as described above. The mobile device case may comprise at least a shell 3003. In some embodiments, the shell 3003 may comprise a structure 3011 such as a hole to mate with a shape of display device. The display device be embedded into the shell. In some cases, additional coupling means such as glues, screws, snap-on features and the like may be required to fix the display device to the shell. Alternatively, the shell may not comprise a special structure to accommodate the shape of the display device. The display device may be attached to an outer surface of the shell via suitable means such as magnetic attachment. In some cases, the display device may be removed from the shell without requiring a tool.

In some embodiments, the shell 3003 or the mobile device case may comprise a battery 3005 such that a display device is in electrical communication with the shell. The battery may provide power source to the display device. In some cases, the battery 3005 can also provide power source to the mobile device. The battery may be configured to provide power source to the display device or the mobile device. The battery can be any type, such as a solid state or polymer battery (e.g., lithium or lithium polymer battery). In some embodiments, the battery can be rechargeable. The battery can be connected to a power source through a port of the case with a micro-USB cable, USB cable, or any type of power cable or connection, such that the battery charges when connected to a power source or outlet. Alternatively or additionally, the shell may comprise circuits to enable wireless charging of the battery. For instance, the circuits may comprise a receiver circuit connected to a receiver coil for receiving energy from a power source. The display device may be connected to the battery via suitable connection unit 3007, such as a wire, cable, ribbon, or contact charging component. The battery 3005 and/or the connection unit 3007 may be located within the walls of the shell, located to an inner surface of the shell, or at any other location. Alternatively or additionally, the display device may be wirelessly charged by a power source provided within the shell or an external power source. The wireless charging circuits and mechanism can be the same mechanism as described in FIG. 12B. Similarly, the mobile device may be connected to the battery via suitable connection unit, such as a wire, cable, ribbon, or contact charging component.

FIGS. 30E and 30F show a display device 3001 that can be coupled to a mobile device case. In some embodiments, the display device 3001 may comprise one or more function buttons 3009. The function buttons may perform the same functions such as power on/off, switch mode as described elsewhere herein. The function buttons 3009 may be located on the peripheral side of the display device 3001. In some cases, when the display device is fit into the shell, the function buttons are pressed down in order to fit into the structure of the case 3011 as shown in FIG. 30F. In this case, the function buttons may be disabled. Once the display device is removed from the shell, the function buttons may spring back in position to function again as shown in FIG. 30E. This may allow the display device to be interchangeably coupled to other support members such as a button, a pin, clip, hook, loop, lanyard or magnetically attractable lock that may enable the display device to be mountable on a head or torso of a user.

Devices, systems and methods of the present disclosure may be combined with or modified by other devices, systems or methods, such as those (e.g., displays) described in U.S. Patent Publication Nos. 2016/0026423, 2016/0018846, 2016/0018978, 2016/0048370 and 2016/0048369, each of which is entirely incorporated herein by reference.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system comprising:
    a mobile device case configured to at least partially enclose a mobile device within an opening on a first surface of the mobile device case;
    a display coupled to a second surface of the mobile device case, the display comprising a function button, wherein the function button of the display is compressed and disabled when the display is coupled to the mobile device case, wherein the function button protrudes outwards from a peripheral side of the display, and wherein the function button is compressed against a wall of the second surface of the mobile device case when the display is coupled to the mobile device case;
    a memory storing one or more media objects comprising digital text, images, or videos; and
    a controller coupled to the display and the memory, the controller configured to, based on one or more user preferences, retrieve one or more of the stored media objects from the memory and display the retrieved media objects on the display.

2. The system of claim 1, wherein the display is removably coupled to the mobile device case.

3. The system of claim 1, wherein the function button is non-compressed and enabled when the display is decoupled from the mobile device case.

4. The system of claim 1, wherein the mobile device case further comprises a battery, wherein the battery is in electrical communication with the display for providing power to the display.

5. The system of claim 1, wherein a portion of the display protrudes from the second surface of the mobile device case.

6. The system of claim 1, wherein the display resides within a hole of the second surface of the mobile device case.

7. The system of claim 1, wherein the display is magnetically coupled to the second surface of the mobile device case.

8. The system of claim 1, wherein the mobile device case comprises one or more control mechanisms, each of the one or more control mechanisms configured to control functions of the display.

9. The system of claim 1, wherein the display is a circular display.

10. The system of claim 1, wherein the display is a touchscreen display.

11. The system of claim 1, wherein the display further comprises an accelerometer, the accelerometer communicatively coupled to the controller.

12. The system of claim 11, wherein the display is configured to display the retrieved media objects based on an orientation of the display as determined by the accelerometer.

13. The system of claim 12, wherein the display is configured to display the retrieved media objects further based on an orientation of the mobile device case.

14. The system of claim 1, wherein the display is configured to display the retrieved media objects based on an orientation indicated by the one or more user preferences.

15. The system of claim 1, wherein the controller is configured to display the retrieved media objects on the display according to a schedule indicated by the one or more user preferences.

16. The system of claim 1, wherein the controller is configured to display the retrieved media objects on the display according to a power mode indicated by the one or more user preferences.

* * * * *